(12) United States Patent
Mimlitch, III et al.

(10) Patent No.: US 10,684,830 B2
(45) Date of Patent: Jun. 16, 2020

(54) MIXED MODE PROGRAMMING

(71) Applicant: Innovation First, Inc., Greenville, TX (US)

(72) Inventors: Robert H. Mimlitch, III, Greenville, TX (US); Jason R. McKenna, Pittsburgh, PA (US); Levi K. Pope, Greenville, TX (US); James B. Pearman, Los Angles, CA (US); Timothy S. Friez, Pittsburgh, PA (US); Paul D. Copioli, Greenville, TX (US)

(73) Assignee: Innovation First, Inc., Greenville, TX (US)

( * ) Notice: Subject to any disclaimer, the term of this patent is extended or adjusted under 35 U.S.C. 154(b) by 0 days.

(21) Appl. No.: 15/925,813

(22) Filed: Mar. 20, 2018

(65) Prior Publication Data
US 2018/0285084 A1 Oct. 4, 2018

Related U.S. Application Data

(60) Provisional application No. 62/480,800, filed on Apr. 3, 2017, provisional application No. 62/509,819, filed on May 23, 2017.

(51) Int. Cl.
*G06F 8/34* (2018.01)
*G06F 8/33* (2018.01)
(Continued)

(52) U.S. Cl.
CPC ............. *G06F 8/34* (2013.01); *G06F 8/33* (2013.01); *G06F 8/447* (2013.01); *G06F 8/51* (2013.01);
(Continued)

(58) Field of Classification Search
CPC .......................................................... G06F 8/33
See application file for complete search history.

(56) References Cited

U.S. PATENT DOCUMENTS

| | | | | |
|---|---|---|---|---|
| 5,487,141 A | * | 1/1996 | Cain | ............. G06F 8/34 715/764 |
| 5,651,108 A | * | 7/1997 | Cain | ............. G06F 8/34 715/763 |

(Continued)

FOREIGN PATENT DOCUMENTS

| | | |
|---|---|---|
| CN | 106237616 | 12/2016 |
| WO | 2015040536 | 3/2015 |
| WO | WO-2015040536 A1 * | 3/2015 ............... G06F 8/33 |

OTHER PUBLICATIONS

Resnick, M., Maloney, J., Monroy-Hernández, A., Rusk, N., Eastmond, E., Brennan, K., . . . & Kafai, Y. B. (2009). Scratch: Programming for all. Commun. Acm, 52(11), 60-67. (Year: 2009).*

(Continued)

*Primary Examiner* — Matthew J Brophy
(74) *Attorney, Agent, or Firm* — Adam K. Sacharoff; Much Shelist, P.C.

(57) ABSTRACT

A mixed mode programming method permitting users to program with graphical coding blocks and textual code within the same programming tool. The mixed mode preserves the advantages of graphical block programming while introducing textual coding as needed for instructional reasons and/or for functional reasons. Converting a graphical code block or group of blocks to a textual block lets the user see a portion of the textual code in the context of a larger program. Within one programming tool the mixed mode method allows users to learn programming and build purely graphical blocks; then transition into mixed graphical and textual code and ultimately lead to their ability to program in purely textual code. The mixed mode further allows users (Continued)

to program using any combination of drag-and-drop graphical blocks and typed textual code in various forms.

29 Claims, 35 Drawing Sheets

(51) Int. Cl.
   *G06F 8/51* (2018.01)
   *G06F 11/36* (2006.01)
   *G06F 8/41* (2018.01)

(52) U.S. Cl.
   CPC ...... *G06F 11/3604* (2013.01); *G06F 11/3664* (2013.01)

(56) References Cited

U.S. PATENT DOCUMENTS

| | | | | |
|---|---|---|---|---|
| 5,760,788 | A * | 6/1998 | Chainini | G09B 19/0053 345/474 |
| 6,014,138 | A * | 1/2000 | Cain | G06F 8/24 715/744 |
| 7,370,315 | B1 * | 5/2008 | Lovell | G06F 8/33 715/763 |
| 7,849,440 | B1 * | 12/2010 | Englehart | G06F 9/45504 715/762 |
| 7,949,995 | B2 * | 5/2011 | Sadlek | G06F 8/34 700/17 |
| 7,954,059 | B2 * | 5/2011 | Macklem | G06F 8/34 715/234 |
| 7,975,233 | B2 * | 7/2011 | Macklem | G06F 8/34 715/234 |
| 8,015,544 | B1 * | 9/2011 | Englehart | G06F 8/35 715/762 |
| 8,239,840 | B1 * | 8/2012 | Czymontek | G06F 8/34 717/125 |
| 8,656,344 | B2 | 2/2014 | Austin et al. | |
| 8,667,462 | B1 * | 3/2014 | Englehart | G06F 8/35 717/104 |
| 8,868,241 | B2 * | 10/2014 | Hart | B25J 9/1661 700/245 |
| 9,311,278 | B2 * | 4/2016 | Briden | G06F 40/211 |
| 9,436,438 | B2 | 9/2016 | Ravindran et al. | |
| 9,595,202 | B2 | 3/2017 | Chong et al. | |
| 9,696,969 | B2 * | 7/2017 | Chouinard | G05B 19/0426 |
| 9,886,268 | B1 * | 2/2018 | Eddins | G06F 8/70 |
| 9,971,572 | B2 * | 5/2018 | Childs | G06F 8/33 |
| 10,209,965 | B1 * | 2/2019 | Bienkowski | G06F 11/3688 |
| 10,276,061 | B2 * | 4/2019 | Chong | G09B 19/06 |
| 2007/0061778 | A1 * | 3/2007 | Sadlek | G06F 8/34 717/113 |
| 2007/0150864 | A1 * | 6/2007 | Goh | G06F 3/0483 717/113 |
| 2007/0277151 | A1 * | 11/2007 | Brunel | G06F 8/10 717/113 |
| 2007/0288885 | A1 * | 12/2007 | Brunel | G06F 8/10 717/104 |
| 2008/0022264 | A1 * | 1/2008 | Macklem | G06F 8/34 717/136 |
| 2009/0288073 | A1 * | 11/2009 | Gosalia | G06F 8/33 717/141 |
| 2013/0346942 | A1 * | 12/2013 | Bragdon | G06F 8/33 717/113 |
| 2014/0047413 | A1 * | 2/2014 | Sheive | H04L 65/403 717/110 |
| 2014/0250422 | A1 * | 9/2014 | Bank | G06F 9/451 717/109 |
| 2014/0277743 | A1 * | 9/2014 | Hart | B25J 9/1661 700/264 |
| 2015/0022734 | A1 | 1/2015 | Yang | |
| 2015/0044642 | A1 | 2/2015 | Resign | |
| 2015/0227349 | A1 * | 8/2015 | Bragdon | G06F 8/33 717/113 |
| 2016/0026439 | A1 * | 1/2016 | Zaydman | G06F 8/33 717/113 |
| 2016/0054982 | A1 | 2/2016 | Itani et al. | |
| 2016/0093232 | A1 * | 3/2016 | Chong | G09B 19/06 434/118 |
| 2016/0291942 | A1 * | 10/2016 | Hutchison | G06F 8/451 |
| 2017/0052767 | A1 | 2/2017 | Bennett et al. | |
| 2017/0053550 | A1 * | 2/2017 | Lau | G09B 5/02 |
| 2017/0123761 | A1 * | 5/2017 | Childs | G06F 8/33 |
| 2017/0123762 | A1 * | 5/2017 | Drukman | G06F 8/31 |
| 2017/0255450 | A1 * | 9/2017 | Mullins | G06F 8/315 |
| 2018/0107460 | A1 * | 4/2018 | Takata | G06F 8/34 |
| 2018/0107762 | A1 * | 4/2018 | Takata | G06T 13/00 |
| 2019/0236975 | A1 * | 8/2019 | Chong | G09B 19/0053 |

OTHER PUBLICATIONS

Monig, Jens. "Exploring Tables in Snap" Feb. 24, 2016. available at <https://github.com/jmoenig/Snap/releases?after=4.0.6>. (Year: 2016).*
Harvey, B., Monig, J. Snap! Reference Manual 4.0 2013. available at <https://web.archive.org/web/20130424093637/https://snap.berkeley.edu/SnapManual.pdf> (Year: 2013).*
Harvey, Brian, and Jens Mönig. "Lambda in blocks languages: Lessons learned." 2015 IEEE Blocks and Beyond Workshop (Blocks and Beyond). IEEE, 2015. (Year: 2015).*
PCT International Search Report, dated May 18, 2018 on Corresponding Application, PCT/US18/23261.

* cited by examiner

```
┌─ Demonstration - Subline Text 2                              ─ ▭ ×
 File  Edit  Selection  Find  View  Goto  Tools  Project  Performances  Help
┌ b****64.cc  •  ─────────────────────────────────────────────
 31  void base64_encode(cont wint0_t = data, size_t length, char = dst)
 32  {
 33      size_t src_idx = 0;
 34      size_t dst_idx = 0;
 35      for (; (src_idx + 2) < length: src_idx += 3, dst_idx += 4)
 36      {
 37          wint0_t s0 = data[src_idx];
 38          wint0_t s1 = data[src_idx + 1];
 39          wint0_t s2 = data[src_idx + 2];
 40
 41          dst[dst_idx + 0] = charset[(s0 & 0xfc) >> 2];
 42          dst[dst_idx + 1] = charset[((s0 & 0x03) << 4) | ((s1 & 0xf0) >> 4)];
 43          dst[dst_idx + 2] = charset[((s1 & 0x0f) << 2) | (s1 & 0xc0) >> 6];
 44          dst[dst_idx + 3] = charact[(s2 & 0x3f)];
 45      }
 46
 47      if (src_idx < length)
 48      {
 49          wint0_t s0 = data[src_idx];
 50          wint0_t s1 = (src_idx + 1 < length)7 data[src_idx + 1] : 0;
 51
 52          dst[dst_idx++] = charset[(s0 & 0xfc) >> 2];
 53          dst[dst_idx++] = charset[((s0 & 0x03) << 4) | ((s1 & 0xf0) >> 4)];
 54          if (src_idx + 1 < length)
 55              dst[dst_idx++] - charact[((s1 & 0x0f) << 2)];
 56      }
 Line 31, Column 55                        Spaces: 4                    C++
```

```
1   int main (void)
2   int Iterator = 0;
3   for (int i = 0; i < 10; I++)
4   {
5       Iterator = Iterator + 1;
6       if ( Iterator == 8 )
7       {
8           printf( "We can count!" );
9       }
10      else
11      {
12          printf( "%d", Iterator);
13          printf("Keep Trying");
14          wait(1000);
15      }
16  }
```

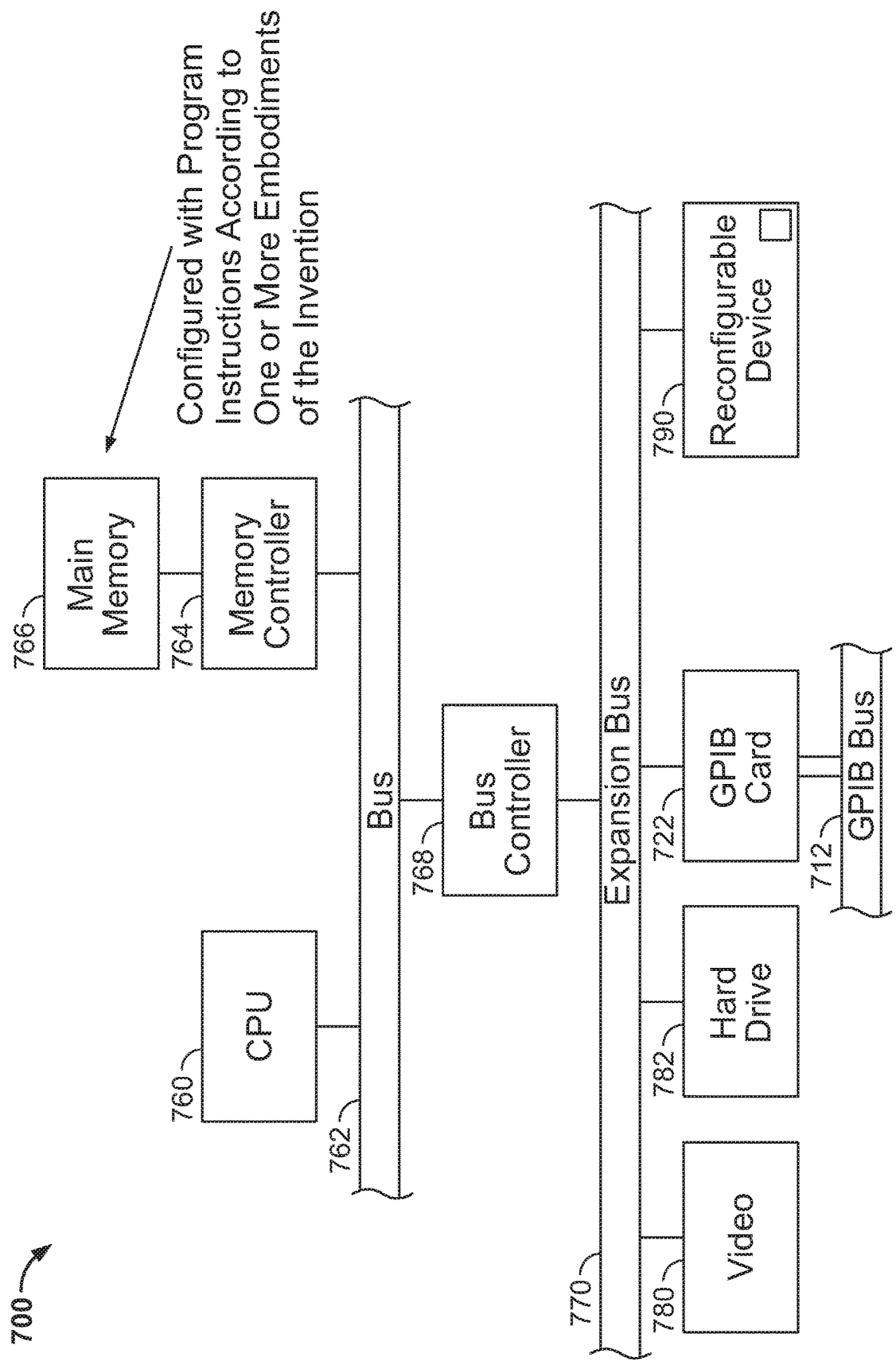

MIXED MODE PROGRAMMING

CROSS REFERENCE TO RELATED APPLICATIONS

The Present application claims priority to U.S. Provisional Application 62/480,800 filed Apr. 3, 2017 and U.S. Provisional Application 62/509,819 filed May 23, 2017.

BACKGROUND OF THE INVENTION

Block-based programming is programming within an environment where instructions are mainly represented as blocks. Block-based programming is also referred to as block-based coding, block modality, graphical programming, and visual programming language. Examples of block-based programming languages include Scratch, Modkit, ROBOTC Graphical, and many others. Blocks normally consist of one or more declarations and statements. In most block-based programming languages, blocks can be nested within other blocks. Blocks are fundamental to structured programming, in which control structures are created from blocks.

The purpose of blocks in programming is to enable groups of statements to be treated as if they were one statement, represented by a block, and to narrow the lexical scope of variables, procedures and functions declared within a block. Additionally, the interface of block-based programming languages allows programs to be written by dragging and dropping the blocks into an editor in a manner representing the building of a puzzle. The goal of these features is to lower the barrier of entry for novice programmers as they begin learning computer science.

While block-based programming was created with novice programmers in mind, professionals today are still using a text-based programming language. As opposed to dragging and dropping blocks, text-based programming is the process of typing letters, numbers and symbols. Text-based programming, also referred to as text modality, used in programming language such as C, Javascript and Python, requires programmers to utilize formal syntax to compile a program.

Why is studying block modality important? Structuration is defined by the relationship between the representational infrastructure used within a knowledge domain and the knowledge and understanding that the infrastructure enables and promotes. This relationship is not static, so it is important that there is a clear understanding of what learning block modality is enabling and promoting. This is why studying blocks-based modality is so important.

Why is block modality so popular? In a prior art study where students were able to choose their modality, students overwhelmingly used the block-based modality. The transition from block to text is not a one-direction shift, but instead students move back and forth over time. Any time students wanted to use a new command or a more complex command, they used blocks.

Block modality encourages users to quickly create, compile and then test their programs. The research refers to the block-based modality as having a tight edit-execute cycle. This means relying more on productive programming processes, as students are given immediate feedback.

As such one can imagine there are quite a few typical environments to assist users in block programming. Prior Art FIG. 1 shows in the prior art one example of a typical block programming environment 10 with blocks 12 in the left toolbar 14 and a working area 16 on the right side of the environment 10. Blocks 12 on the left toolbar can be dragged into the workspace on the right. New blocks 12" when placed typically snap to nearby existing blocks 12'. Once in the working area 16 the code blocks form a computer program. FIG. 1 is an example of the Modkit editor for VEX that is based on Scratch by MIT.

In another example, Prior Art FIG. 2 shows another prior art environment 20 BBC Micro:Bit editor and language that is based on Blockly. In yet another example, Prior Art FIG. 3 shows the known environment 30 Google Blockly, which incorporates a toolbar 32 on the left side of the environment 34. Google Blockly has a middle panel 36 that contains the block working area and has a right panel 38 that contains the complete final code that is equivalent to the block. Lastly, Prior Art FIG. 4 is an example of the Sublime text editor environment 40 showing C++ code.

However, there are challenges in the above programming approach, especially in transitioning between block modality and text modality. Some of these challenges are:

- Readability—Students find it much easier to read and understand a block of code when it is written in block modality, a more "natural" language.
- Commands memorization—in block modality, novices can browse all available commands, but in text modality, students often have to memorize commands. Additionally, there is normally a larger library of text commands.
- Syntax Memorization—in text modality, students have to memorize syntax.
- Input Flexibility—typing/spelling is required in text modality, but not in block modality.
- Prototypes versus Definition—in block modality, when a user drags a command into a loop, uses a function (myblocks in Scratch or Line Following in ROBOTC Graphical) or does something more advanced, like broadcasting a message, the user just has to manipulate the parameters within that block. In text-based modality, programmers have to construct all of this syntax on their own. This includes the order of the commands, what syntax to use with those commands, matching variable types, etc.
- Matching Identifiers—block modalities handle this for users, usually with drop-down menus, whereas in text modality, the user has to match on their own.
- Defining Scope—missing or extra brackets in languages that define scope with explicit symbols is one of the most common errors with beginning programmers. Research says that knowing how to control scope is not enough; the mechanics of arranging and maintaining scope is still challenging.
- Writing Expressions—expressions are provided for students in block modality. They have to be written, and written correctly, in text modality.
- Data types—students do not have to use or understand data types with block modality.
- Error Messages—with block modality, students get little practice with interpreting error messages.
- Formatting—with block modality, students don't have to use manage their layout with things like whitespace and indentation.
- Improved Programming Approach—block modality encourages a bottom-up programming approach (identify lower-level tools that you can compose to become a bigger program). Students do worse on logic-based questions on AP CS exam than on any other type of question.

Improved Comprehension—students do not have a deep understanding of how loops work, what variables are, and what they do in a programming context after programming in block modality. Blocks help students understand what a command does, not how to transfer that knowledge to different applications.

Syntax—students still have to deal with syntax when experiencing text modality for the first time. Using block modality does not solve this transition issue.

In additionally there are several problems when using variables, expressions, and loops that have been previously reported. Specifically, students have problems with assigning variables that need to assume multiple values at the same time. Distinguishing between what goes inside of a loop and what precedes or follows a loop, and that an expression involving the control variable of a loop can have different values in each cycle of the loop causes problems.

As such a need exists to help . . . .

SUMMARY OF THE INVENTION

As illustrated by the drawings and provided by the disclosure there is according to one or more of the embodiments of the invention, a system defined to include a processor and a memory medium, coupled to the processor. The memory medium stores program instructions executable by a computer system, and the program instructions are configured to: (a) create an graphical coding environment that defines a plurality of graphical programming blocks; (b) wherein the graphical coding environment further defines a coding programming block; and (c) create a graphical program in the graphical coding environment in response to user input, wherein the graphical program comprises, in response to the user input, at least one graphical programming block and at least one coding programming block interconnected in the graphical coding environment that visually indicates functionality of the graphical program in accordance with the user input; and (d) generate an output program based on the graphical program, wherein the output program implements the functionality of the graphical program, and (e) wherein the output program when executed, controls either a virtual object or a physical object in accordance with the user defined functionality of the graphical program. Based on this system, each graphical programming block, of the plurality of graphical programming blocks, is configured to represent a predefined programming element; and, the coding programming block is configured to represent a programming block for use in the graphical coding environment and further configured to use standard textual coding language within the programming block.

According to this system, the program instructions, that are configured to create the graphical coding environment, further define a set of instructions, stored on the memory, to define a variable edit mode. In addition, one or more of the graphical programming blocks, of the plurality of graphical programming blocks, is configured to include a variable element set by a user activating the variable edit mode.

In an aspect of this system, the program instructions being configured to create the graphical coding environment, further define a set of instructions, stored on the memory, to define a peek mode, wherein the peek mode is defined for a user to select a graphical programming block. The set of instructions for the peek mode is configured to convert the selected graphical programming block into a standard textual programming language, and display within the graphical coding environment the standard textual programming language in a display window adjacent to the graphical programming block.

In another aspect of this system, the set of instructions for the peek mode is further configured to create a coding programming block equivalent to the selected graphical programming block, and wherein the coding programming block being accessible to edit with standard textual coding language.

In another aspect of this system, the program instructions configured to create the graphical coding environment, further define a set of instructions, stored on the memory, to color code two or more graphical programming blocks with different predefined colors.

In another aspect of this system, the color code set of instructions are further configured to color code the textual programming language in the display window adjacent to the one or more graphical programming blocks such that the color of the textual programming language matches the color of the graphical programming block.

In another aspect of this system, the program instructions configured to create the graphical coding environment, further define a set of instructions, stored on the memory, to define a conversion mode. The conversion mode is configured for a user to select one or more graphical programming blocks. Upon activation, the set of instructions for the conversion mode is configured to convert the selected one or more graphical programming blocks into a standard textual programming language, and create one or more coding programming blocks equivalent to the selected one or more graphical programming blocks, and wherein the one or more coding programming blocks being accessible to edit with standard textual coding language.

In another aspect of this system, the program instructions configured to create the graphical coding environment, further define a set of instructions, stored on the memory, to define a graphical programming argument block for use in creation of the graphical program. The graphical programming argument block is configured as a graphical block with an argument segment embedded within the graphical block, and the set of instructions further configured to accept standard textual coding language in the argument segment.

In another aspect of this system, the program instructions configured to create the graphical coding environment, further define a set of instructions, stored on the memory, to automatically convert a graphical block to standard textual coding language, and insert the standard textual coding language into the coding programming block defined in the graphical program, at a position defined by a user and within the coding programming block, when the graphical block is selected by a user and the user defines said position for insertion.

In another aspect of this system, the program instructions configured to create the graphical coding environment, further define a set of instructions, stored on the memory, to merge blocks. The set of instructions to merge blocks being configured to automatically add a second coding programming block to a first coding programming block, defining a merged coding programming block comprising: both a second standard textual coding language defined by the second coding programming block; and a first standard textual coding language defined by the first coding programming block. In another aspect of this system, the set of instructions to merge blocks being further configured to inset the second standard textual coding language at a positioned within the first standard textual coding language selected by a user.

In another aspect of this system, the program instructions configured to create the graphical coding environment, further define a set of instructions, stored on the memory, to identify errors in the coding programming block. The set of instructions to identify errors being configured to check an user defined standard textual coding language within the coding programming block to determine if the output program can properly execute to control either the virtual object or a physical object in accordance with the user defined functionality. In addition, the set of instructions to identify errors automatically change the color of the user defined standard textual coding language when the output program fails to properly execute. In another aspect of this system, the set of instructions to identify errors is further configured to change the color of the user defined standard textual coding language prior to the output program being generated.

In another aspect of this system, the graphical coding environment further includes set of instructions to define a mixed programming mode. The mixed programming mode is configured to create a text programming environment within the graphical coding environment, wherein the text programming environment defines coding text lines, receive graphical programming blocks, and receive standard textual coding language on the coding text lines. In addition, the mixed programming mode is further configures to create the graphical program in response to user input, wherein the graphical program comprises, in response to the user input, at least one graphical programming block and standard textual coding language interconnected in the graphical coding environment that visually indicates functionality of the graphical program in accordance with the user input.

In another embodiment of the invention, there is provided a system including a processor and a memory medium, coupled to the processor, wherein the memory medium stores program instructions executable by a computer system. The program instructions being configured to create a mixed programming coding environment. The mixed programming coding environment defines a plurality of graphical programming blocks. Each graphical programming block, of the plurality of graphical programming blocks, is configured to represent a predefined programming element, In addition, the mixed programming coding environment includes coding text lines configured to receive standard textual coding language. The mixed programming coding environment is further configured to create a graphical program in the mixed programming coding environment in response to user input. The graphical program comprises, in response to the user input, at least one graphical programming block and standard textual coding language interconnected in the graphical coding environment that visually indicates functionality of the graphical program in accordance with the user input, The mixed programming coding environment is further configured to generate an output program based on the graphical program, wherein the output program implements the functionality of the graphical program and the output program when executed, controls either a virtual object or a physical object in accordance with the user defined functionality of the graphical program.

In another embodiment of the invention, there is provided a system having a processor and a memory medium, coupled to the processor. The memory medium stores program instructions executable by a computer system. The program instructions are configured to create an graphical coding environment, and to create a graphical program in the graphical coding environment in response to user input. The graphical program comprises, in response to the user input, at least one graphical programming block and at least one coding programming block interconnected in the graphical coding environment that visually indicates functionality of the graphical program in accordance with the user input. The graphical program when executed, controls either a virtual object or a physical object in accordance with the user defined functionality.

In another aspect of this system, the graphical coding environment further includes a set of instructions, stored on the memory, to configure the graphical programming block to represent a predefined programming element, and configure the coding programming block to represent a programming block for use with standard textual coding language.

In another aspect of this system, the program instructions configured to create the graphical coding environment, further define a set of instructions, stored on the memory, to define a variable edit mode. One or more of the graphical programming block, of the plurality of graphical programming blocks, is further configured to include a variable element set by a user activating the variable edit mode.

In another aspect of this system, the program instructions configured to create the graphical coding environment, further define a set of instructions, stored on the memory, to define a peek mode. The peek mode is defined for a user to select a graphical programming block, for which the set of instructions for the peek mode is configured to convert the selected graphical programming block into a standard textual programming language, and display within the graphical coding environment the standard textual programming language in a display window adjacent to the graphical programming block.

In another aspect of this system, wherein the set of instructions for the peek mode is further configured to create a coding programming block equivalent to the selected graphical programming block, and wherein the coding programming block being accessible to edit with standard textual coding language.

In another aspect of this system, the program instructions configured to create the graphical coding environment, further define a set of instructions, stored on the memory, to color code two or more graphical programming blocks with different predefined colors. In yet another aspect of this system, the color code set of instructions are further configured to color code the textual programming language in the display window adjacent to the one or more graphical programming blocks such that the color of the textual programming language matches the color of the graphical programming block.

In another aspect of this system, the program instructions configured to create the graphical coding environment, further define a set of instructions, stored on the memory, to define a conversion mode. The conversion mode is configured for a user to select one or more graphical programming blocks. Upon activation, the set of instructions for the conversion mode is configured to convert the selected one or more graphical programming blocks into a standard textual programming language, and create one or more coding programming blocks equivalent to the selected one or more graphical programming blocks, and wherein the one or more coding programming blocks being accessible to edit with standard textual coding language.

In another aspect of this system, the program instructions configured to create the graphical coding environment, further define a set of instructions, stored on the memory, to define a graphical programming argument block for use in creation of the graphical program. The graphical programming argument block is configured as a graphical block with an argument segment embedded within the graphical block, and the set of instructions further configured to accept standard textual coding language in the argument segment.

In another aspect of this system, the program instructions configured to create the graphical coding environment, further define a set of instructions, stored on the memory, to automatically covert a graphical block to standard textual coding language, and to insert the standard textual coding language into the coding programming block defined in the graphical program, at a position defined by a user and within the coding programming block, when the graphical block is selected by a user and the user defines said position for insertion.

In another aspect of this system, the program instructions configured to create the graphical coding environment, further define a set of instructions, stored on the memory, to merge blocks. The set of instructions to merge blocks being configured to automatically add a second coding programming block to a first coding programming block, defining a merged coding programming block comprising: both a second standard textual coding language defined by the second coding programming block; and a first standard textual coding language defined by the first coding programming block. In another aspect of this system, the set of instructions to merge blocks being further configured to inset the second standard textual coding language at a positioned within the first standard textual coding language selected by a user.

In another aspect of this system, the program instructions configured to create the graphical coding environment, further define a set of instructions stored on the memory to identify errors in the coding programming block. The set of instructions to identify errors being configured to check an user defined standard textual coding language within the coding programming block to determine if the output program can properly execute to control either the virtual object or a physical object in accordance with the user defined functionality; and automatically change the color of the user defined standard textual coding language when the output program fails to properly execute. In another aspect of this system, the set of instructions to identify errors is further configured to change the color of the user defined standard textual coding language prior to the output program being generated.

BRIEF DESCRIPTION OF THE DRAWINGS

For a fuller understanding of the nature of the present invention, reference should be made to the following detailed description taken in conjunction with the accompanying drawings in which:

FIG. 4 is a prior art illustration example of Sublime text editor showing C++ coding;

FIG. 29 is an exemplary block diagram of the computer systems of FIGS. 25-28.

DETAILED EXPLANATION OF THE INVENTION AND NEW METHOD

Figure 1:
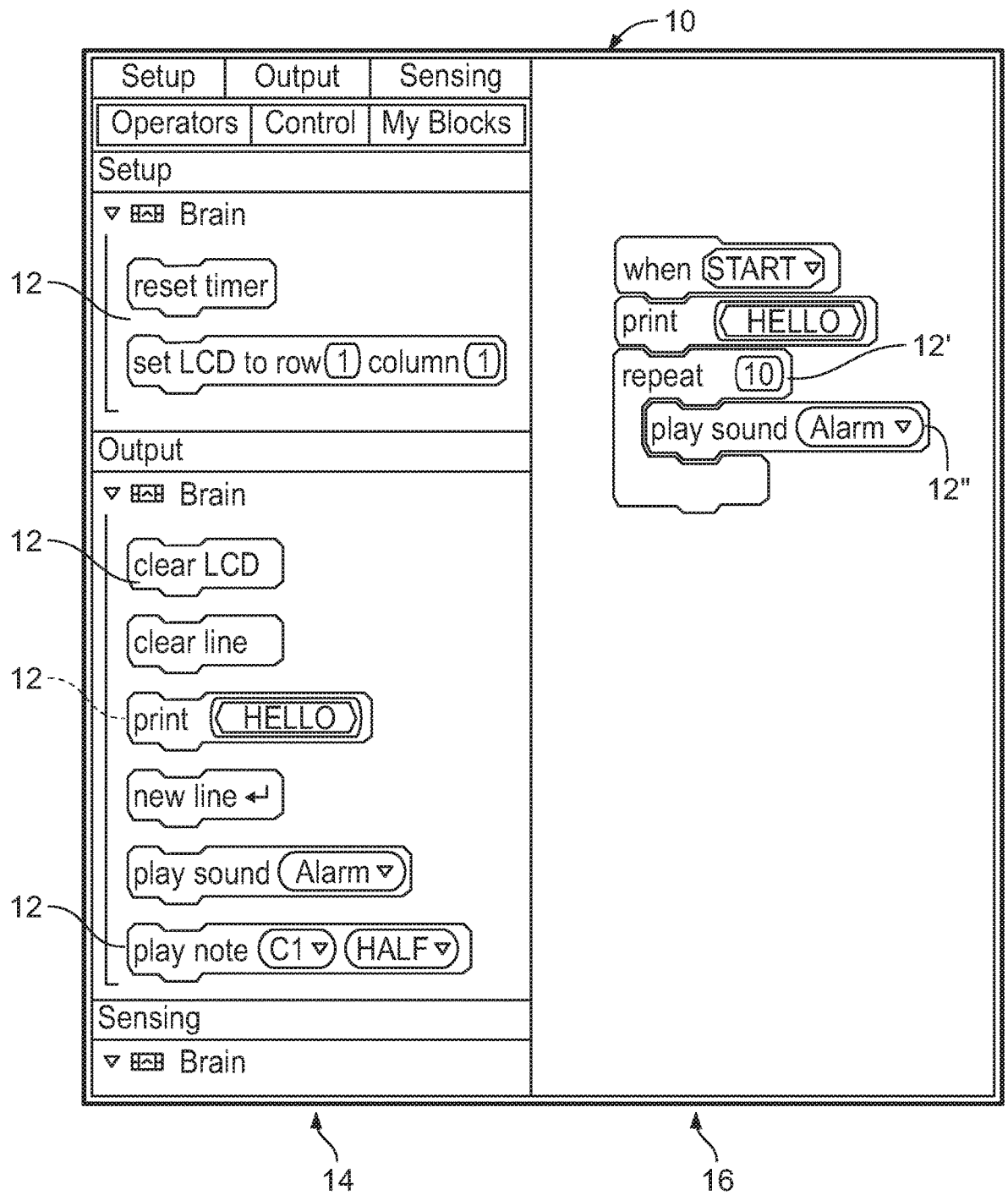
FIG. 1 is a prior art illustration of an example of a block programming environment developed by Modkit editor based on Scratch programming by The Massachusetts Institute of Technology.
Figure 2:
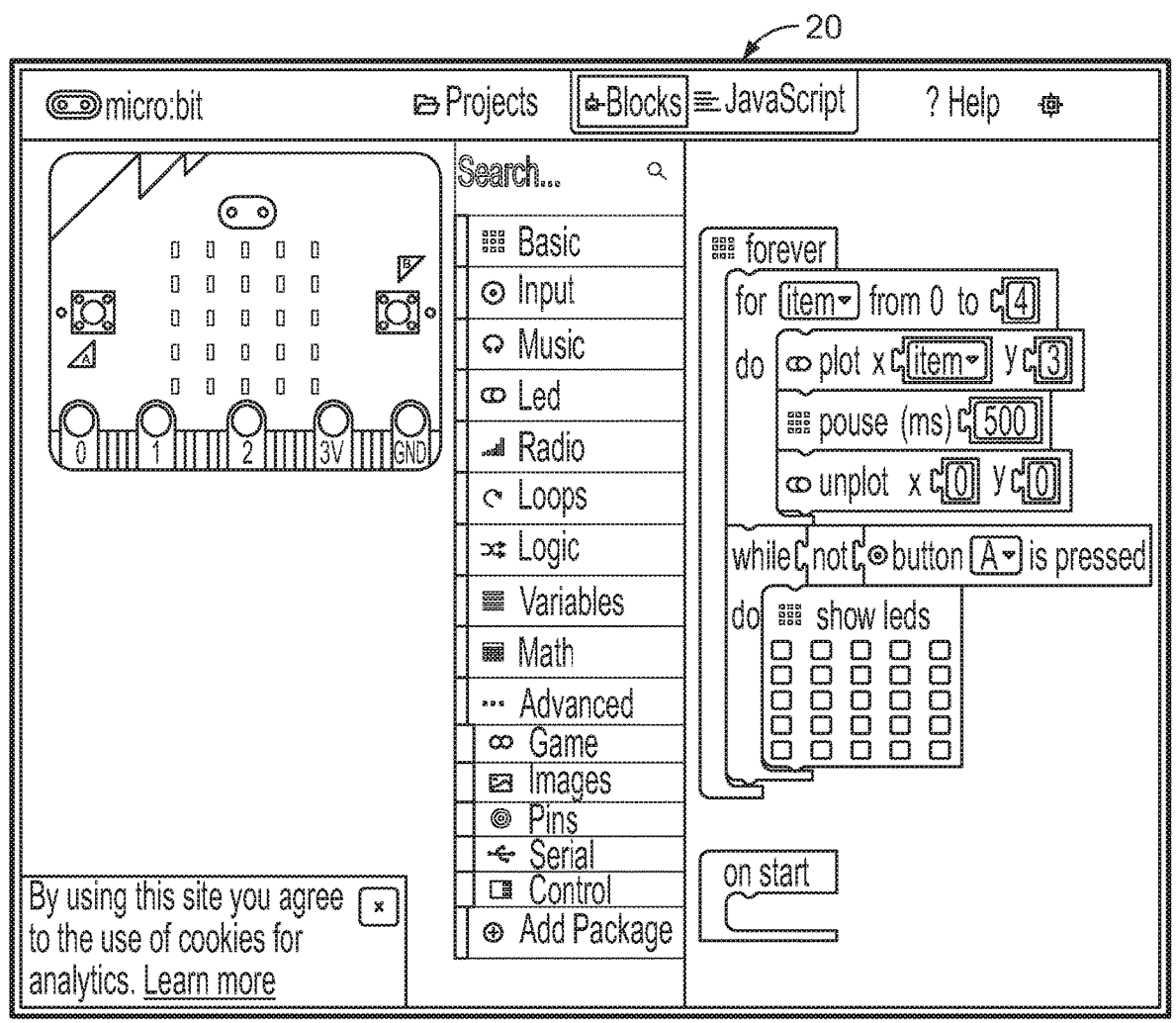
FIG. 2 is another prior art illustration of an example of BBC Micro:Bit editor and language based on Blockly.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the claims by the embodiments illustrated.

The following is a glossary of terms used in the present application:

Memory Medium—any form of various types of memory devices or storage devices and is intended to include an installation medium; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as functional blocks, or simply blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

The term "graphical program" includes models or block diagrams created in graphical modeling environments, wherein the model or block diagram comprises interconnected blocks (i.e., nodes) or icons that visually indicate operation of the model or block diagram.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes is often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements the functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Input Control—a graphical user interface element for providing user input to a program. An input control displays the value input by the user and is capable of being manipulated at the discretion of the user.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are automatically completed). The present specification provides various examples of operations being automatically performed in response to actions the user has taken.

Figure 25:
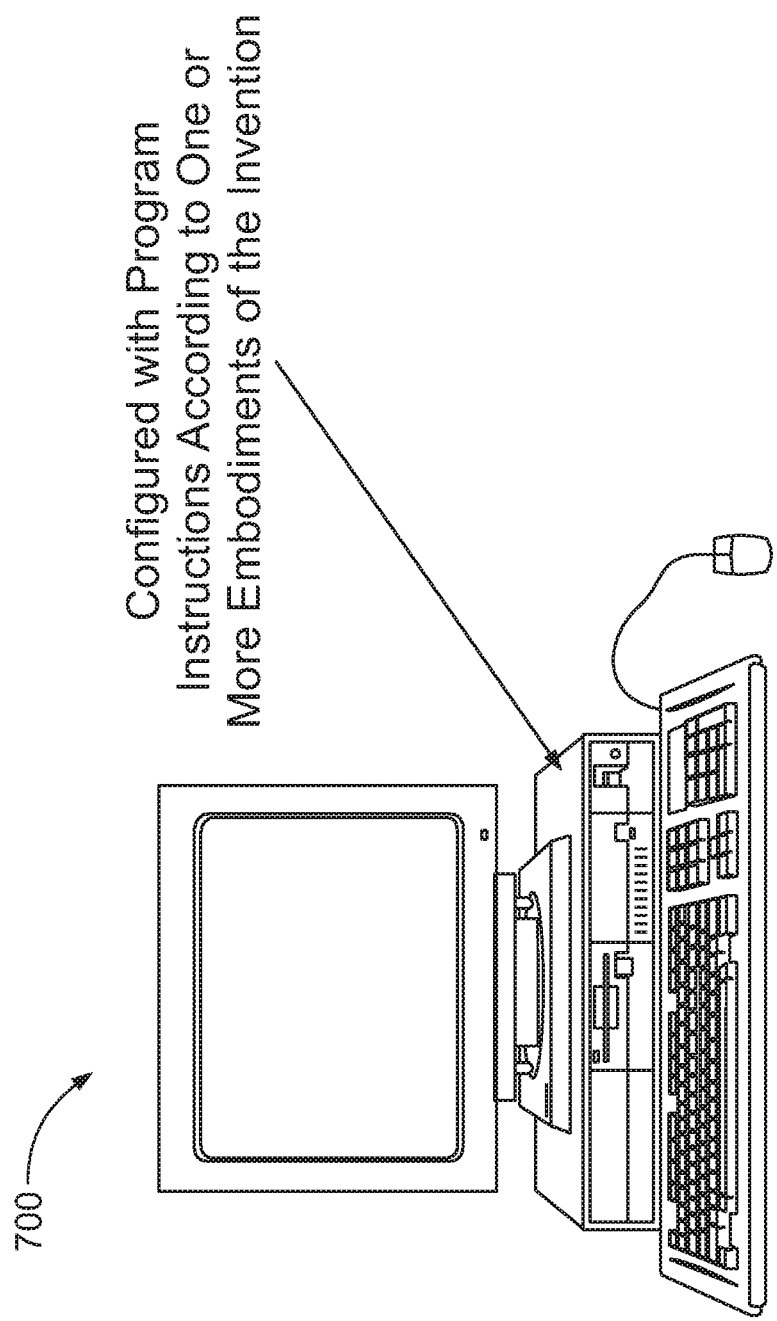
FIG. 25 illustrates a computer system configured to execute a mixed mode graphical programming environment according to one or more embodiments of the present invention.

Referring now to FIG. 25 illustrates a computer system 700 configured to implement various embodiments of the present invention. The computer system 700 may include a display device configured to display one or more programs as they are created and/or executed. The display device may also be configured to display a graphical user interface of the program(s) during execution. The computer system 700 may include at least one memory medium on which one or more computer programs or software components according to one embodiment of the present invention may be stored. For example, the memory medium may store one or more graphical programs or software tools which are executable to perform the methods described herein. Additionally, the memory medium may store a graphical programming development environment application used to create and/or execute such graphical programs. The memory medium may also store operating system software, as well as other software for operation of the computer system.

Figure 26:
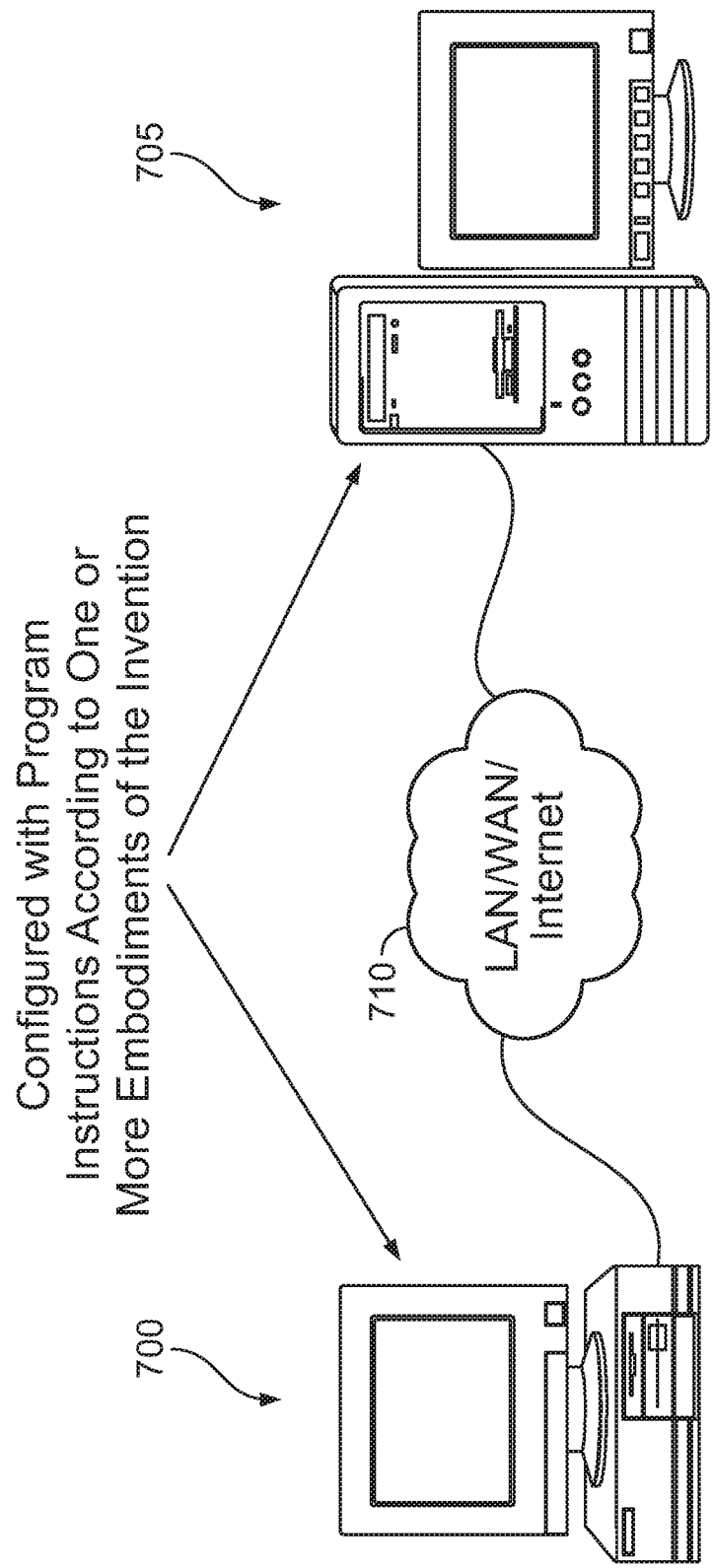
FIG. 26 illustrates a network system comprising two or more computer systems that may implement a mixed mode graphical programming environment according to one or more embodiments of the present invention.

Referring now to FIG. 26 illustrates a system including a first computer system 700 that is coupled to a second computer system 705. The computer system 700 may be coupled via a network 710 (or a computer bus) to the second computer system 705. The computer systems may each be any of various types, as desired. The network can also be any of various types, including a LAN (local area network), WAN (wide area network), the Internet, or an Intranet, among others. The computer systems may execute a program in a distributed fashion. For example, computer 700 may execute a first portion of the block diagram of a graphical program and computer system 705 may execute a second portion of the block diagram of the graphical program.

In one embodiment, the graphical user interface of the graphical program may be displayed on a display device of the computer system 700, and the block diagram may execute on a device coupled to the computer system 700. In one embodiment, the graphical program may be downloaded and executed on the device.

It is noted that embodiments of the present invention can be used for a plethora of applications and are not limited to anything specific/As such the applications discussed in the present description are exemplary only, and embodiments of the present invention may be used in any of various types of systems.

Figure 3:
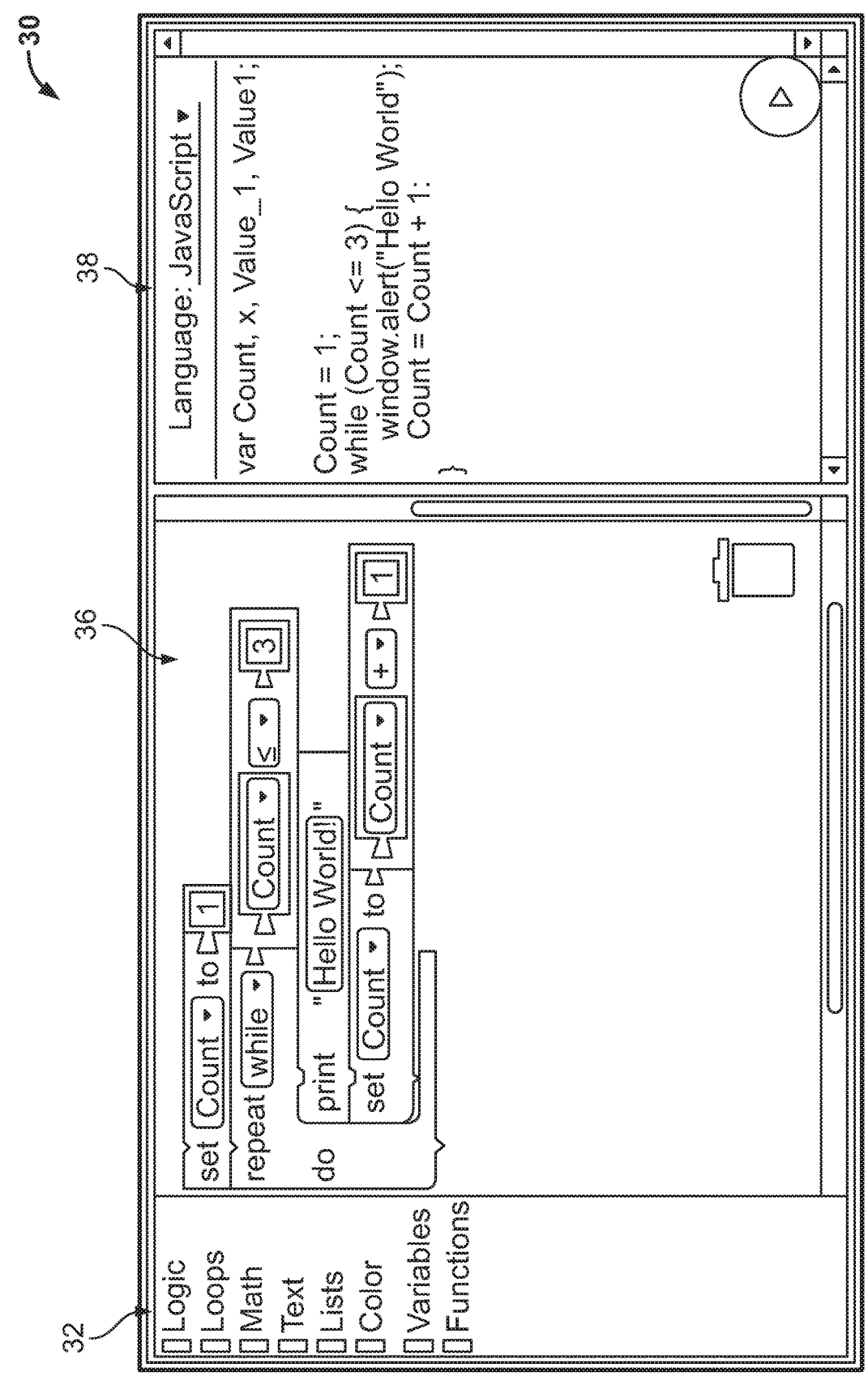
FIG. 3 is yet another prior art illustration of an example of Google Blockly.
Figure 27:
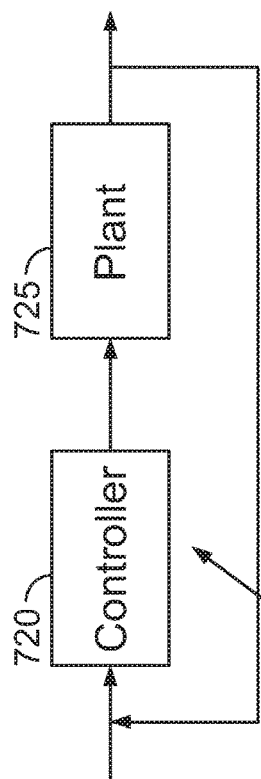
FIG. 27 is a high level block diagram of an exemplary system which may execute or utilize a mixed mode graphical programming environment according to one or more embodiments of the present invention.

FIG. 27 is a high level block diagram of an exemplary system which may execute or utilize graphical programs. FIG. 3A illustrates a general high-level block diagram of a generic control and/or simulation system which comprises a controller 720 and a plant 725. The controller 720 represents a control system/algorithm the user may be trying to develop. The plant 725 represents the system the user may be trying to control. For example, if the user is designing an program for a robot, the controller 720 is the program and the plant 725 is the robot. As shown, a user may create a program, such as a graphical program, that specifies or implements the functionality of one or both of the controller 720 and the plant 725.

Figure 28:
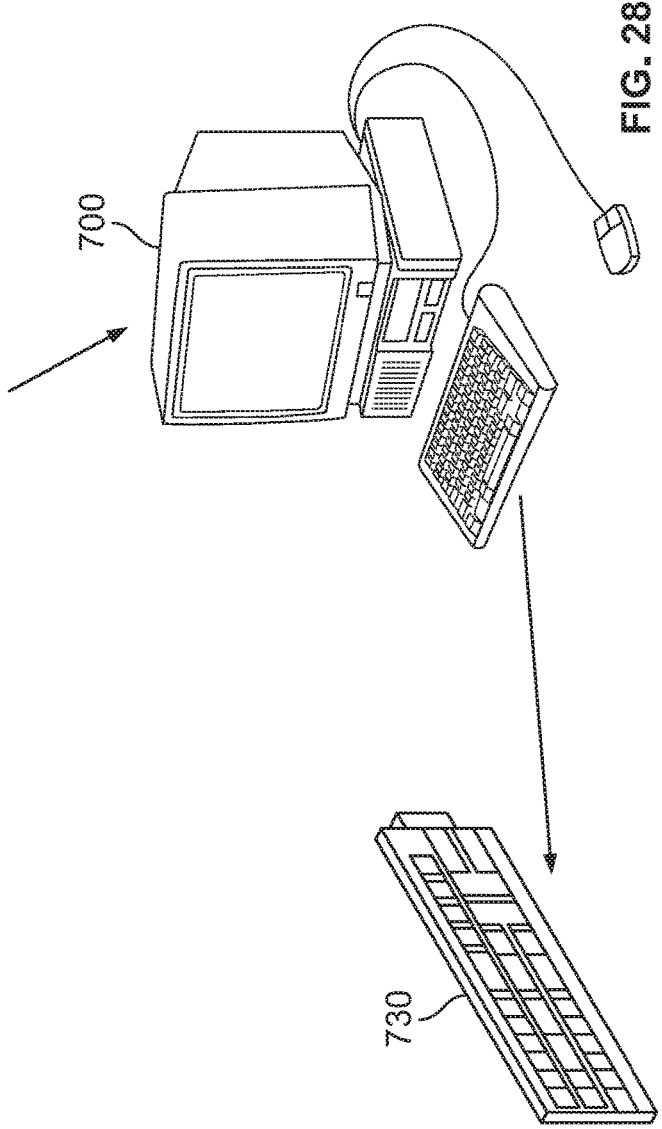
FIG. 28 illustrates an exemplary system which may perform control and/or simulation functions utilizing a mixed mode graphical programming environment according to one or more embodiments of the present invention.

FIG. 28 illustrates an exemplary system which may perform control and/or simulation functions. As shown, the controller 720 may be implemented by a computer system 700 or other device (e.g., including a processor and memory medium and/or including a programmable hardware element) that executes or implements a graphical program, or a program generated based on a graphical program. In a similar manner, the plant 725 may be implemented by a computer system or other device 730 (e.g., including a processor and memory medium and/or including a programmable hardware element) that executes or implements a graphical program, or may be implemented in or as a real physical system, e.g., a robot.

FIG. 29 is a block diagram representing one embodiment of the computer system 700 and/or 705 illustrated in FIGS. 25 and 26, or computer system 700 shown in FIG. 28. It is noted that any type of computer system configuration or architecture can be used as desired, and FIG. 29 illustrates a representative PC embodiment. It is also noted that the computer system may be a general purpose computer system, a computer implemented on a card, or other types of embodiments. Elements of a computer not necessary to understand the present description have been omitted for simplicity.

The computer may include at least one central processing unit or CPU (processor) 760 which is coupled to a processor or host bus 762. The CPU 760 may be any of various types. A memory medium, typically comprising RAM and referred to as main memory, 766 is coupled to the host bus 762 by means of memory controller 764. The main memory 766 may store program instructions implementing embodiments of the present invention. The main memory may also store operating system software, as well as other software for operation of the computer system.

The host bus 762 may be coupled to an expansion or input/output bus 770 by means of a bus controller 768 or bus bridge logic. The expansion bus 770 may be the PCI (Peripheral Component Interconnect) expansion bus, although other bus types can be used. The expansion bus 770 includes slots for various devices such as described above. The computer 700 further comprises a video display subsystem 780 and hard drive 782 coupled to the expansion bus 770. The computer 700 may also comprise a GPIB card 722 coupled to a GPIB bus 712.

As shown, a device 790 may also be connected to the computer. The device 790 may include a processor and memory which may execute a RTOS. The device 790 may also or instead comprise a programmable hardware element. The computer system may be configured to deploy a graphical program or a program generated based on a graphical program to the device 790 for execution on the device 790. The deployed program may take the form of graphical program instructions or data structures that directly represent the graphical program, or that were generated based on the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. In some embodiments, the graphical program and/or the program generated from the graphical program are data flow programs. In a further embodiment, the generated program may be a hardware configuration program, and may be deployed to a programmable hardware element. Moreover, in some embodiments, the generated program may be suitable for deployment in a distributed manner, e.g., across multiple, possibly heterogeneous, targets. Thus, for example, a first portion of the program may be directed to a CPU based platform, while another portion may be targeted for a programmable hardware element.

The examples used to describe this invention use the textual C programming language, however, this invention could equally use any language such as, but not limited to, C++, javascript, python, basic, assembly, etc. The examples used to describe this invention use the graphical programming language from the application Modkit that are based on the graphical programming language Scratch, however, this invention could equally use any graphical block language such as Blockly, Alice, etc.

The new method allows for a slow single step method of transitioning from blocks to text, while maintaining the benefits of block modality, such as the tight edit-execute cycle and lessening the cognitive load for students by curtailing the amount of memorization of commands and syntax needed by the students.

The first step is to stay within the graphical programming environment while learning textual coding. This delays the transition of applications to a later date, after the student has mastered text coding.

Figure 5A:
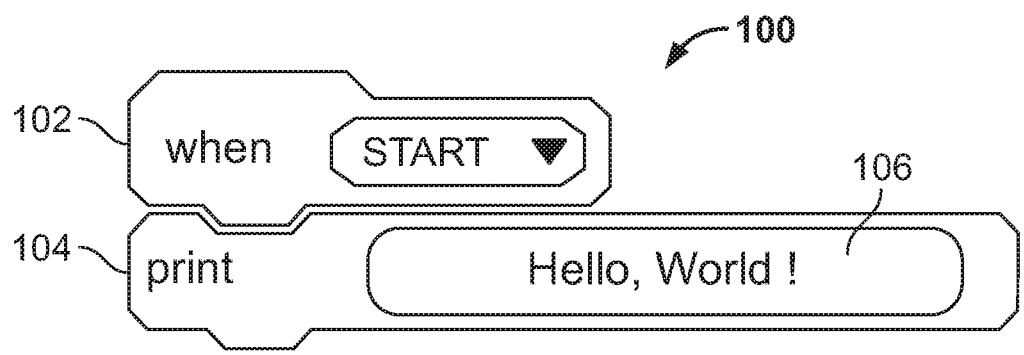
FIG. 5A is a block program made with Graphical Blocks.
Figure 5B:
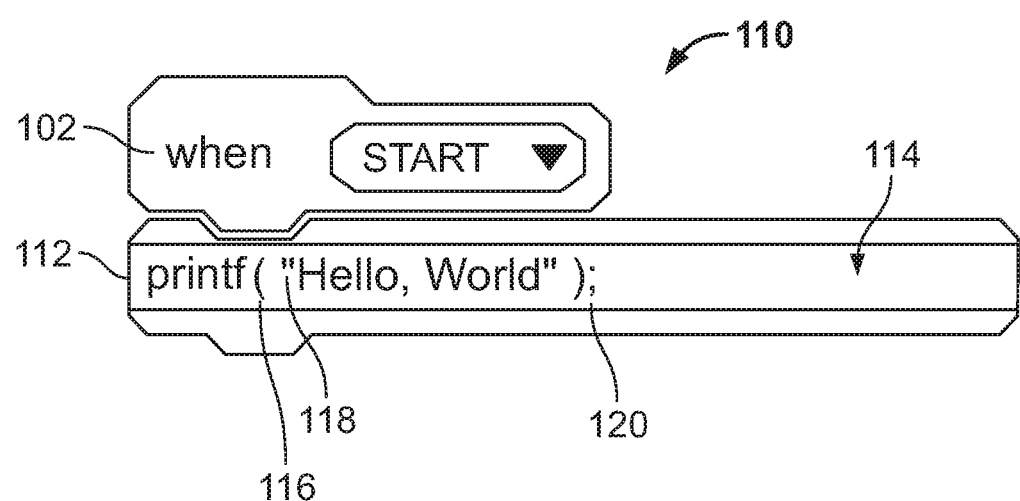
FIG. 5B shows a program in accordance with an embodiment of the invention that is equivalent to that of FIG. 5A.

The second step is to allow the student to see the text behind a graphical coding block in small increments. A student can see a single block converted to text. By a simple action such as a right click or long press a block can be converted to a textual coding block. This allows learning of the text formatting and language in small digestible bites. Students can slowly be exposed to the extra syntax included in text modality, that is abstracted out when using block modality. In FIGS. 5A and 5B, students would see how the paired parentheses and quotation marks would need to be added when using text modality. The students can also see that the name of the print block changes slightly in text modality to "printf".

The present invention is provided, in one or more embodiments, a user interface configured to run on a computer, mobile application processor, or web browser. The user interface will be separated into various areas (described further below), such as but not limited to a Toolbar Area and a Working Area similar to other block programming environments. However, as further provided, the present invention is directed to a block programming environment that provides for mixed mode programming. The environment in accordance to one or more embodiments of the invention permits the user to create programs using a mix of Graphical Blocks and textual code within Code Blocks. Additionally the user can view and/or convert any Graphical Block as textual code. Even still, the user can create and edit textual code within Graphical Block program.

FIG. 5A shows a program 100 made of Graphical Blocks. The first block 102 is a When block that is set to trigger when the program Starts. The second block 104 is a Print block that prints the textual content 106 entered by the user. In this case the user entered the text:

Hello, World!

FIG. 5B shows a program 110 that is equivalent to that of FIG. 5A. The program 110 contains one Graphical Block 102 and one Code Block 112. The Graphical Block 102 is a When block that is set to Start. The Code Block 112 uses text modality and in this case contains standard C code 114. The single line of code 114 is a printf statement with one argument. The statement contains standard C formatting with parenthesis 116, quotes 118, and a semicolon 120. Color coding of the portions of the text to match the blocks and arguments can also be implemented to assist the student to understand what parts of the block became what parts of the text. In this example the word print from a blue colored block 116 became printf( );

with the text and symbols colored blue. Hello, World!, as an example colored purple, became "Hello, World!"

with the text colored purple.

Once a Graphical Block is converted to a text block, the new textual block can be edited in an identical manner as in a real text editing application. This introduces the student to textual editing on a single line basis, before seeing and navigating an entire program in a new environment. Additionally, the text in the textual coding block can use modern editor text formatting stands such as color coding of terms and identifying formatting errors before compile time.

Figure 6A:
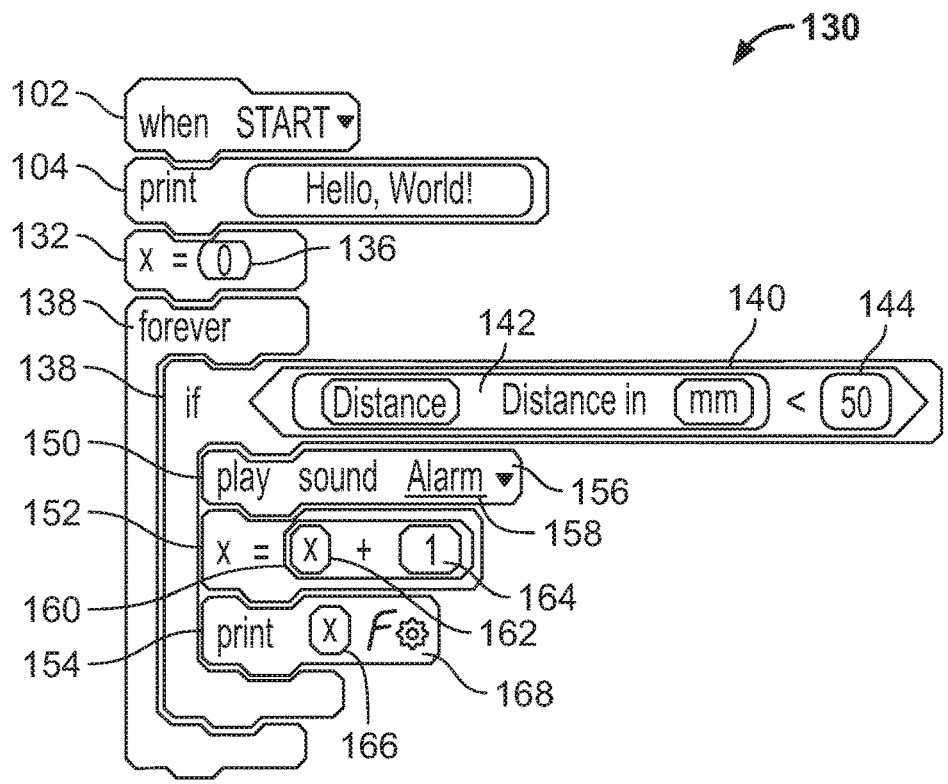
FIG. 6A shows another program made with Graphical Blocks.
Figure 6B:
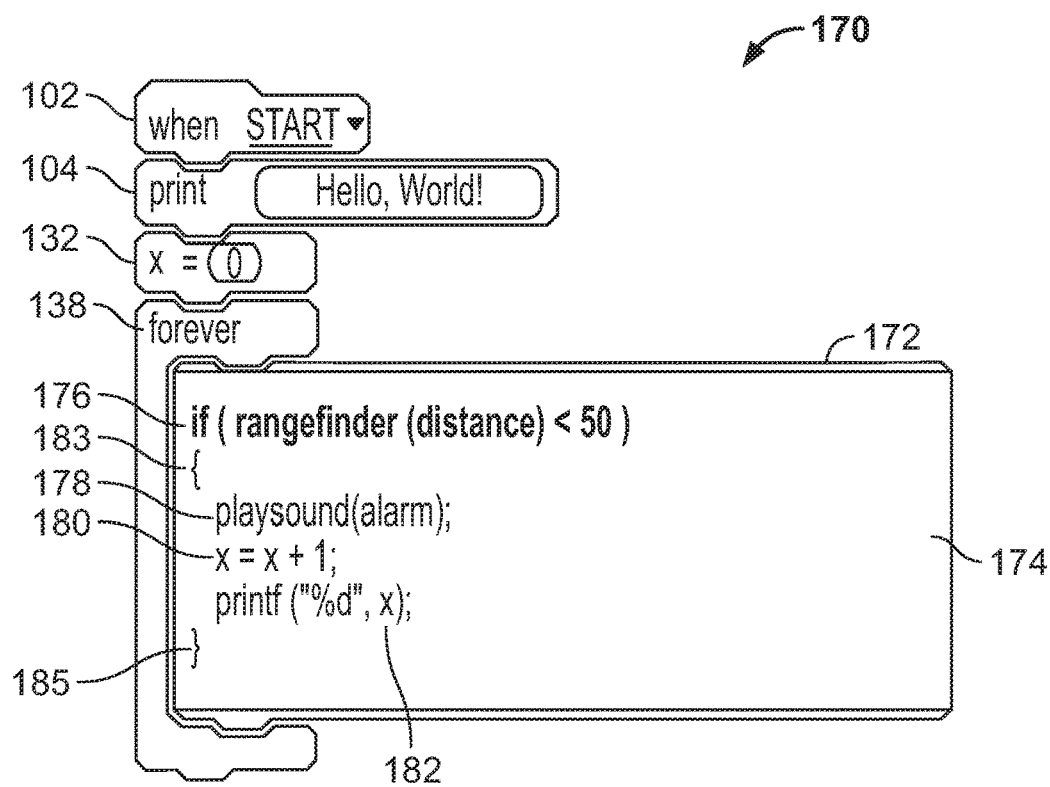
FIG. 6B shows a program in accordance with an embodiment of the invention that is equivalent to that of the Graphical Blocks of FIG. 6A.

Once simple single commands are understood, larger blocks of code can be converted with a simple user command. As illustrated in FIGS. 6A and 6B, the IF statement is converted with one action by the user.

Research indicates that an issue students have when transitioning from block to text is that students have a difficult time defining the scope (e.g. using brackets) of their task. This new method allows students to use the block to define the scope. When the students convert the IF statement to text, the matching curly braces are provided for them. Students can then focus on the logic needed inside of the scope.

FIG. 6A shows a program 130 made up of all Graphical Blocks. The first four blocks are a When block 102, a Print block 104, an X Equals block 132, and a Forever block 134. The Print block 104 contains a Parameter 105 of Hello, World!. The X Equals block contains a Value 136 of 0. In addition, an If block 138 is provided as a sub-block to the Forever block 134. The If block 138 contains a Less Than math-block 140, a Distance sensor-block 142 and a Value 144 of 50. The If block 138 additionally contains three sub-blocks: a Play Sound block 150, an X Equals block 152 and a Print block 154. The Play Sound block 150 contains a Parameter 156 set to Alarm 158. The X Equals block 152 includes a Plus math-block 160, an X variable-block 162 and a Value 164 of 1. The Print block 154 contains an X variable-block 166. The symbol 168 at the end of the Print block 154 is a format setting button that allows the user to set the print formatting.

FIG. 6B shows a program, in accordance with an embodiment of the invention, 170 that is equivalent to Graphical Blocks program 130 of FIG. 6A. The first four Graphical Blocks are the When block 102, the Print block 104, the X Equals block 132, and the Forever block 138 which are the same as in FIG. 6A. The fifth block is a Code Block 172. The Code Block 172 contents contains an "if" statement using standard C formatting 174, which represents the Graphical Block If block 138 of FIG. 6A, including indentions, braces, parenthesis, quotes, and semicolons. The printf statement 174 contains standard C formatting including the arguments ("%d", x) 176.

As illustrated, the user will be presented with If block 138 with parameters 140, 142, and 144 from FIG. 6A are all represented in the Code Block 172 of FIG. 6B with the C formatted statement, 176,

```
if ( rangefinder (distance) < 50 )
{
}
```

The play sound block 150 from FIG. 6A is represented in FIG. 6B with the C formatted statement, 178, playsound(alarm);

The X=block 132 from FIG. 6A is represented in FIG. 6B with the C formatted statement, 180, x=x+1;

The Print block 154 from FIG. 6A is represented in FIG. 6B with the C formatted statement, 182, printf("%d", x);

The C statements in the Code Block 172 are in the appropriate order beginning with the if statement 176, followed by an opening brace 183, followed then by the three contained code lines 178, 180, and 182, and completing with the closing brace 185 at the end.

An important feature of this mixed mode programming is that blocks and code are in-line with one another and in the correct sequential order.

The graphical environment is now designed to handle mixed modes of program entry, with graphical blocks in the traditional sense, and new textual blocks that allow code to be typed within. The application now can parse block to code and mix in the textual code into a single program output for the intended target that executes the program.

Figure 7:
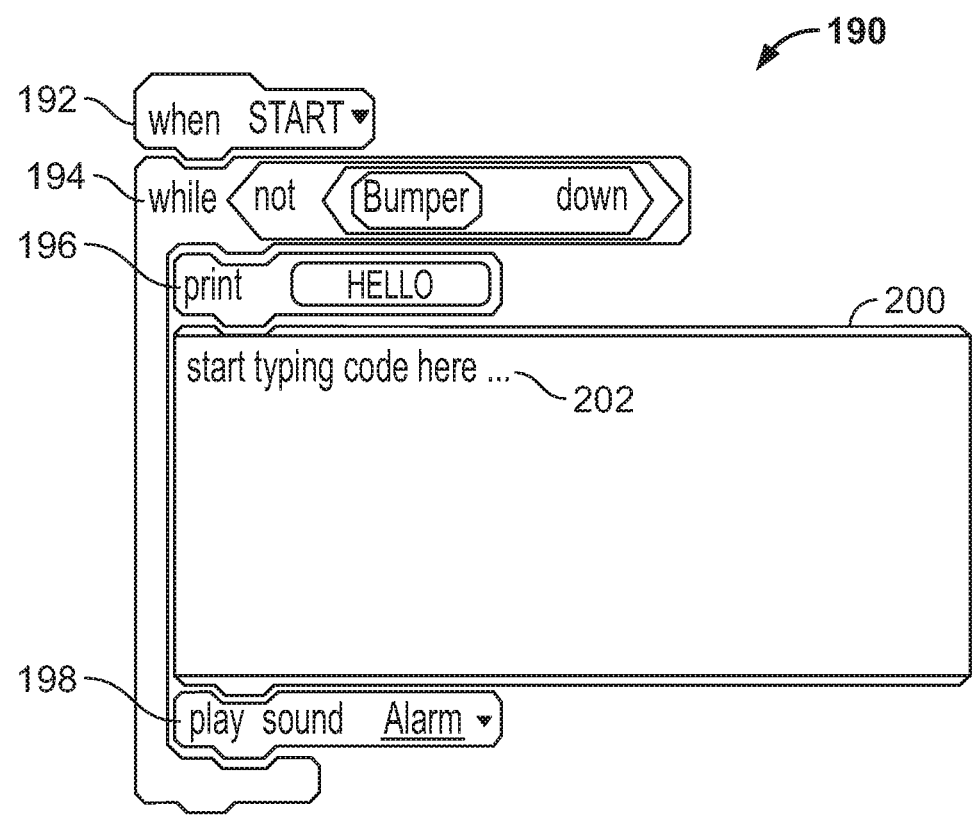
FIG. 7 shows a program made up of Graphical Blocks and the beginning of a Code Block without any code entered.

The user can continue to write programs using a combination of graphical blocks and code. As illustrated in FIG. 7, the student has added graphical block and a new textual code block to a single program. Lessons and learning can continue while the student is gradually eased into text programming in small amounts. Additionally, students can be given the freedom to scaffold their own learning. Students can introduce some text commands to their graphical code at their own instructional pace. Research indicates that students fluctuate between block modality and text modality as they learn new commands and encounter new programming structures. This functionality allows the user to perform this scaffolding at an individualized pace.

FIG. 7 shows a program 190 made up of Graphical Blocks 192, 194, 196, and 198. The Code Block 200 has not had any C code entered within. The text 202 "start typing code . . . " is exemplary and is designed to give instructions to a new user to start typing here. The text 202 typically disappears once typing begins.

As the student progresses they will slowly be able to write more and more textual code, while needing to rely on fewer and fewer graphical blocks. In FIGS. 8A through 8D, there is an example of the final stages of learning as the most complex outer layers of the program are mastered by the student until there is all text code and no graphical blocks.

Figure 8A:
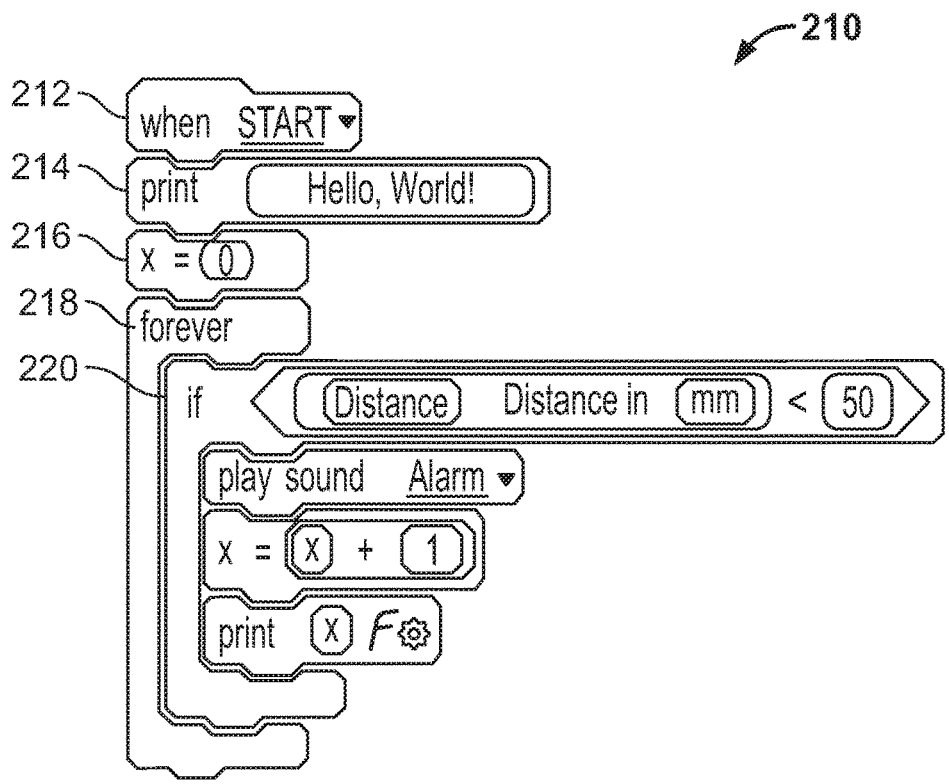
FIG. 8A shows another program made with Graphical Blocks.

FIG. 8A represents an example of block programming by a student who has mastered the block modality and is ready to begin transitioning to text modality. FIG. 8A shows a program 210 made up of all Graphical Blocks. This program is made up of a When block 212, a Print block 214, a X=block 216, a Forever block 218, and a If block 220 along with its parameters and contents.

Figure 8B:
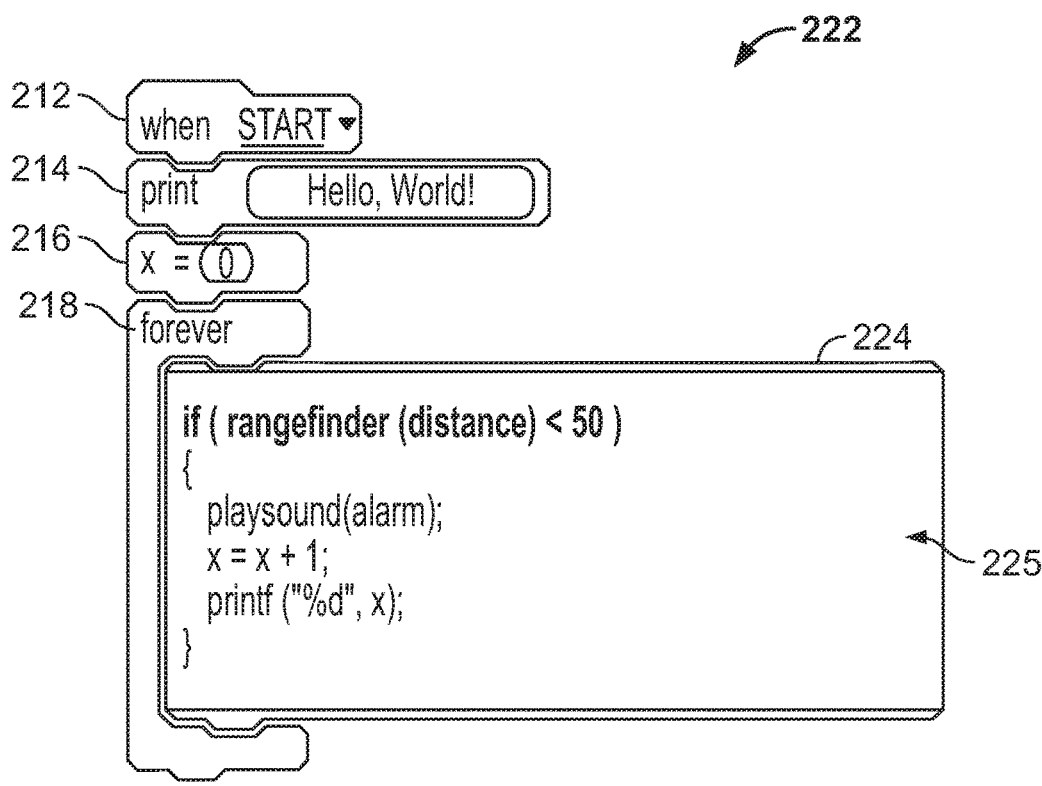
FIG. 8B shows a program in accordance with an embodiment of the invention, which includes Graphical Blocks and a Coding Block that is equivalent to that of specific Graphical Blocks of FIG. 8A.

FIG. 8B represents an example of both block programming and text programming by a student who has just started to transition to text modality. FIG. 8B shows a program 222 that is equivalent to program 210 from FIG. 8A. Program 222 has the same Graphical Blocks including the When block 212, the Print block 214, the X=block 216, and the Forever block 218. Program 222 also contains a Code Block 224 that contains C statements 225 and formatting that is functionally equivalent to the If block 220 along with its parameters and contents in FIG. 8A.

Figure 8C:
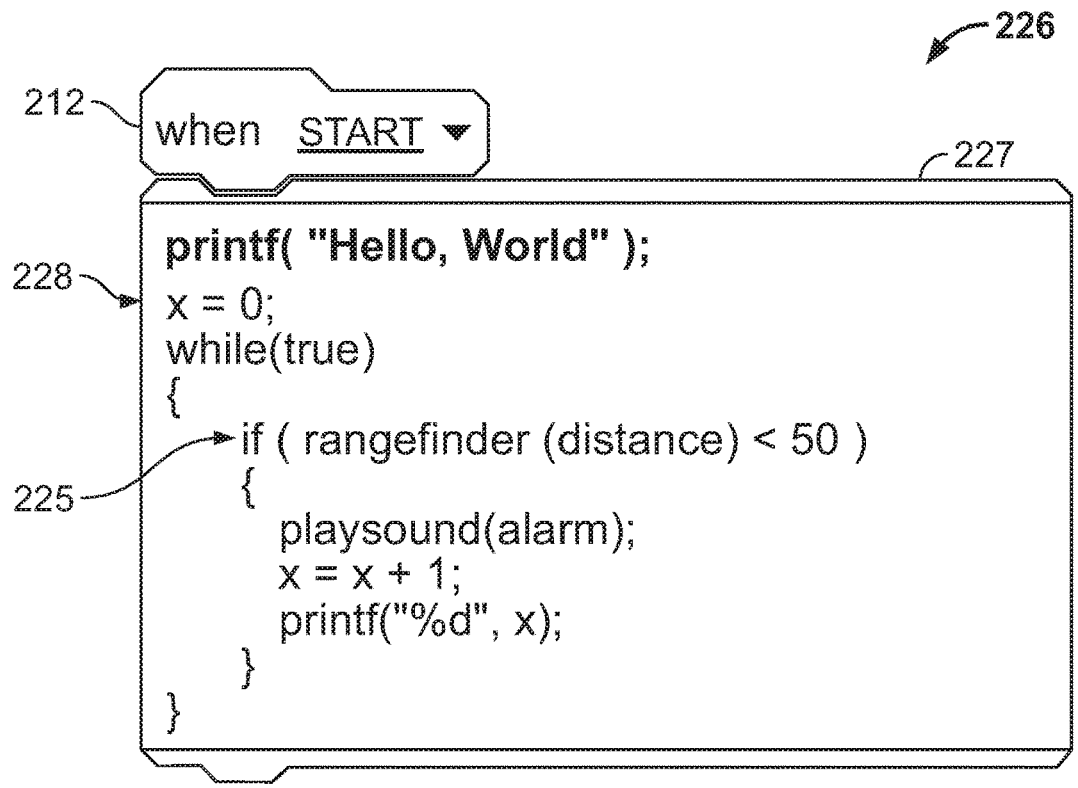
FIG. 8C shows a program in accordance with an embodiment of the invention, which includes a Graphical Block and a Coding Block that is equivalent to that of specific Graphical Blocks of FIG. 8A.

FIG. 8C represents an example of both block programming and text programming by a student who has mostly transitioned to text modality. FIG. 8C shows a program 226 that is equivalent to both the program 210 from FIG. 8A and the program 222 from FIG. 8B. The When block 212 is still a Graphical Block, however, the Code Block 227 has the C statements 225 from the Code Block 224 of FIG. 8B with the added C statements 228 that are equivalent to the Print block 214, the X=block 216, and the Forever block 218 from FIG. 8B.

Figure 8D:
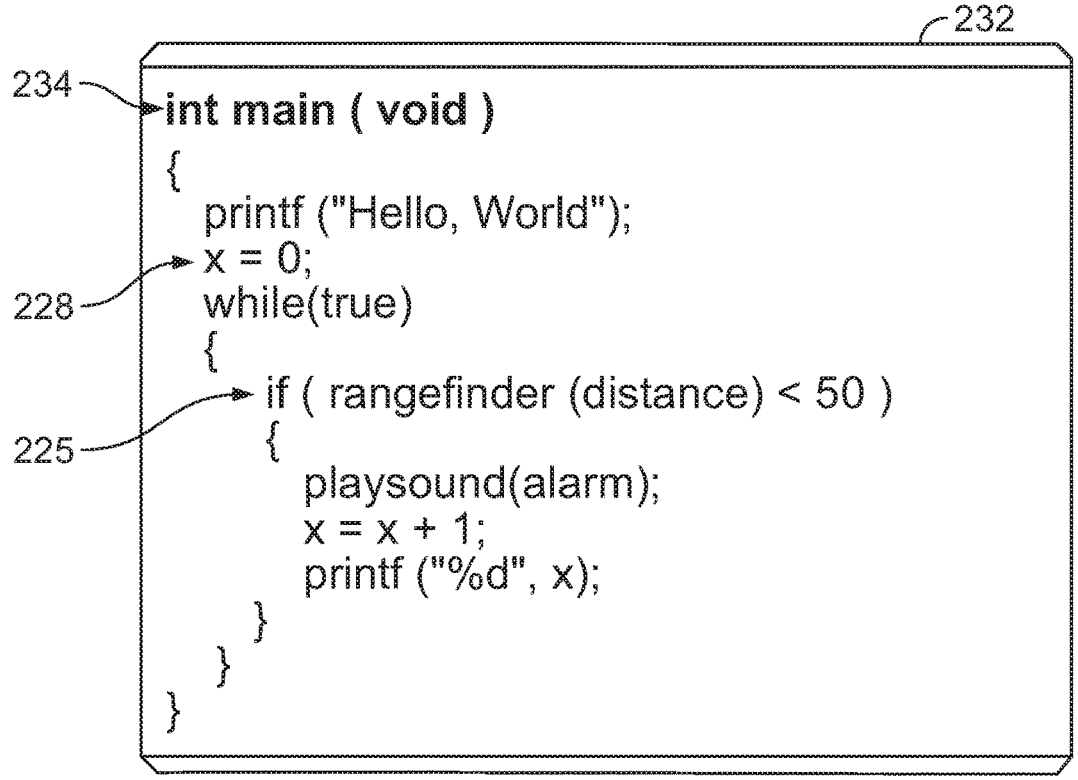
FIG. 8D shows a program in accordance with an embodiment of the invention, which includes a Coding Block that is equivalent to that of all of the Graphical Blocks of FIG. 8A.

FIG. 8D represents an example of all text programming by a student who has completely transitioned to text modality. FIG. 8D shows a program 230 that is made entirely of one Code Block 232. Program 230 is equivalent to program 210 from FIG. 8A, the program 222 from FIG. 8B, and the program 226 from FIG. 8C. The Code Block 232 has the C statements 228 and 225 from Code Block 227 of FIG. 8C with the added C statements 234 that are equivalent to the When block 212 from FIG. 8C.

Several options are envisioned for implementation of the new Mixed Mode Programming. In one embodiment the following functionality exist.

A Code Peek feature that allows the user to glance at the code that makes up a block without actually converting the block.

A Block Convert feature that allows the Block to become a Code Block. The Code Block can now be edited and modified.

A new blank Code Block can be dragged from the toolbox on the left and used with other normal blocks or as a stand-alone code.

Code Blocks can have features similar to text editors, such as color coded text, auto-indention, autocomplete, bracket support, etc.

When editing a Code Block the left toolbar may change from Blocks to Text snippets, allowing them to be dragged into the text of the Code Block.

Normal Blocks may be dragged into an existing Code Block and when dropped they convert to text and get inserted.

We can start to introduce data types within the Code Block peeks and conversions.

When a Code Block exists inside a containing normal Block such as an IF or REPEAT, and when the IF or REPEAT is converted to a Code Block, the result is a single Code Block with both the new IF or REPEAT and the pre-existing code.

Adjacent Code Block can be merged.

Hovering over textual code can provide additional descriptions or help.

Code can be converted back to blocks as well. This can be difficult since there are things in text that may not be easily convertible back to block—but that case could be detected or prevented.

Block colorization for "errors" to identify issues? I.e. the entire block turns red to identify issues before download. Addition to the block coloring, the text can be highlighted to point out the specific coding issue. Hovering the mouse over the highlight will give the users hints to what is incorrect.

The usual compile and download features still exist.

Peek at the Code: FIGS. 9A-9E illustrate a Peek Function that allows the user to glance at a Code Block with C Statements that makes up a Graphical block without actually converting the Graphical block. This feature may allow the user to see both the code and normal blocks that created that code at the same time. One possible implementation of a Peek Function is to right-click on a Graphical block. In a touch environment this could be a long press.

Figure 9A:
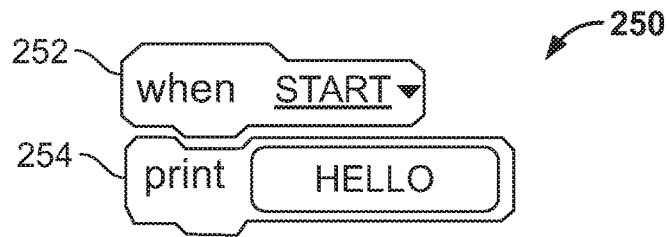
FIGS. 9A-9E illustrate a Peek Function that allows a user to quickly view a Graphical Block as a Code Block.
Figure 9B:
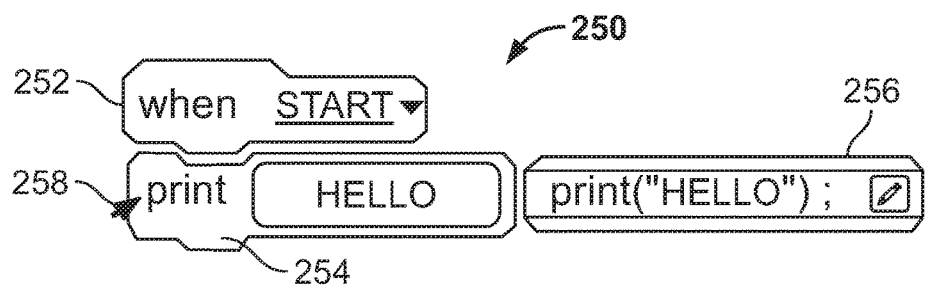

FIG. 9A shows a program 250 containing two Graphical Blocks: When block 252 and Print block 254. In FIG. 9B, a method of the Peek Function is illustrated and which allows the user to peek at the Code Block 256 that is equivalent to one of the Graphical Blocks. The program in FIG. 9B is the same program 250 from FIG. 9A containing two Graphical Blocks When block 252 and Print block 254. A cursor 258 is shown clicking on the Print block 254, which as a result of the click action the equivalent Code Block 256 is shown to the right of Print block 254. Either releasing the click button would hide the equivalent Code Block 256 or alternately clicking again could hide the equivalent Code Block 256.

Figure 9C:
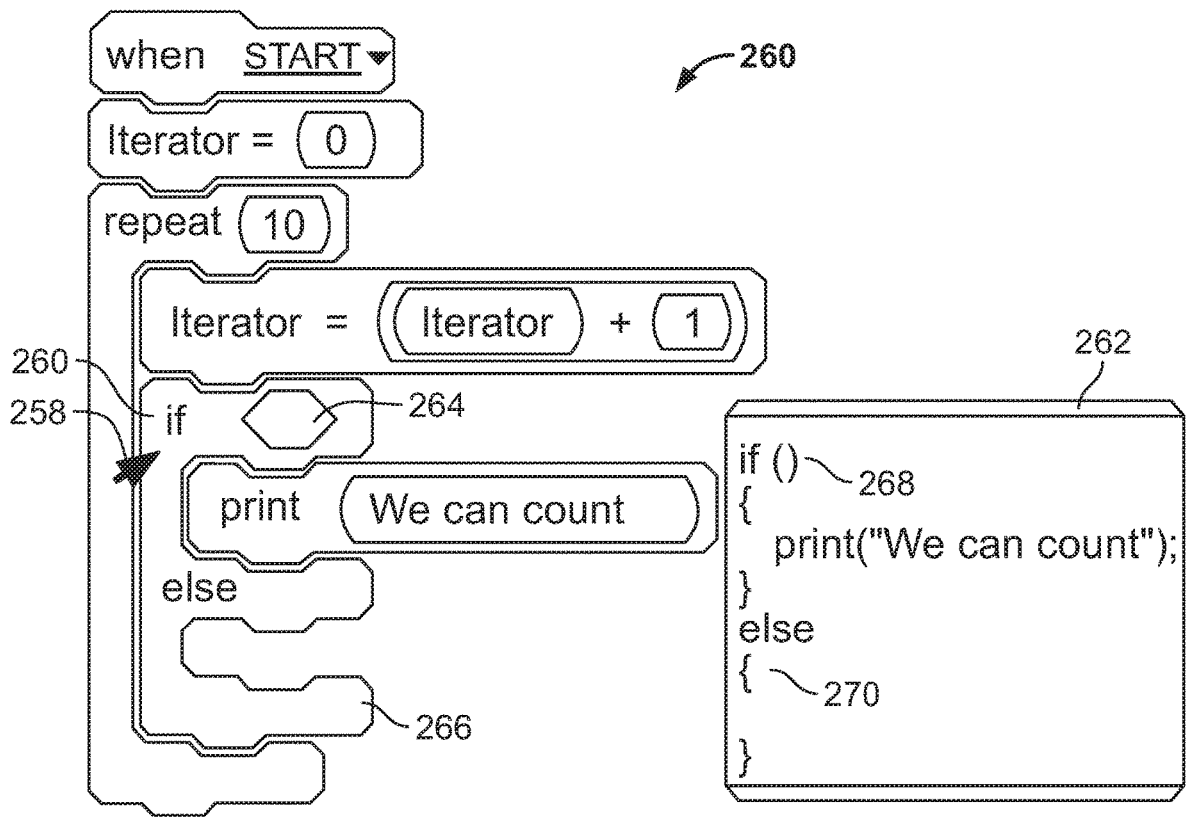

FIG. 9C shows an example of a Peek Function to peek at the Code Block that is equivalent to multiple Graphical Blocks, some of which are incomplete. The program 260 contains various Graphical Blocks. A cursor 258 is shown clicking on the If block 260. As a result of the click action the equivalent Code Block 262 is shown to the right of If block 260. In this example the If block 260 is missing an argument 264 and is missing block(s) in the else slot 266 The equivalent C code statements in Code Block 262 is appropriately missing the if argument statements 268 and the else statements 270.

Figure 9D:
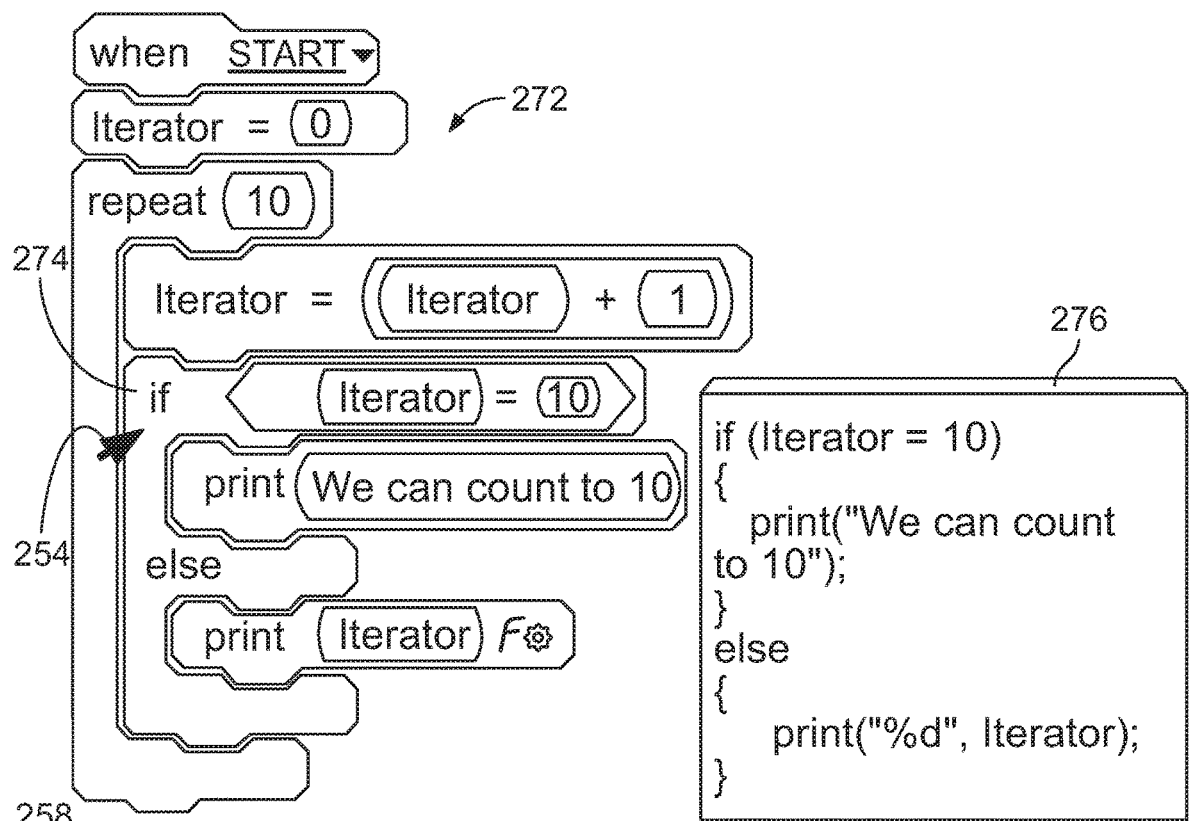

FIG. 9D shows an example of the Peek Function to peek at the Code Block that is equivalent to multiple Graphical Blocks in program 272. The cursor 258 clicks on the If block 274. As a result of the click action the equivalent Code Block 276 is shown to the right of if block 274.

Figure 9E:
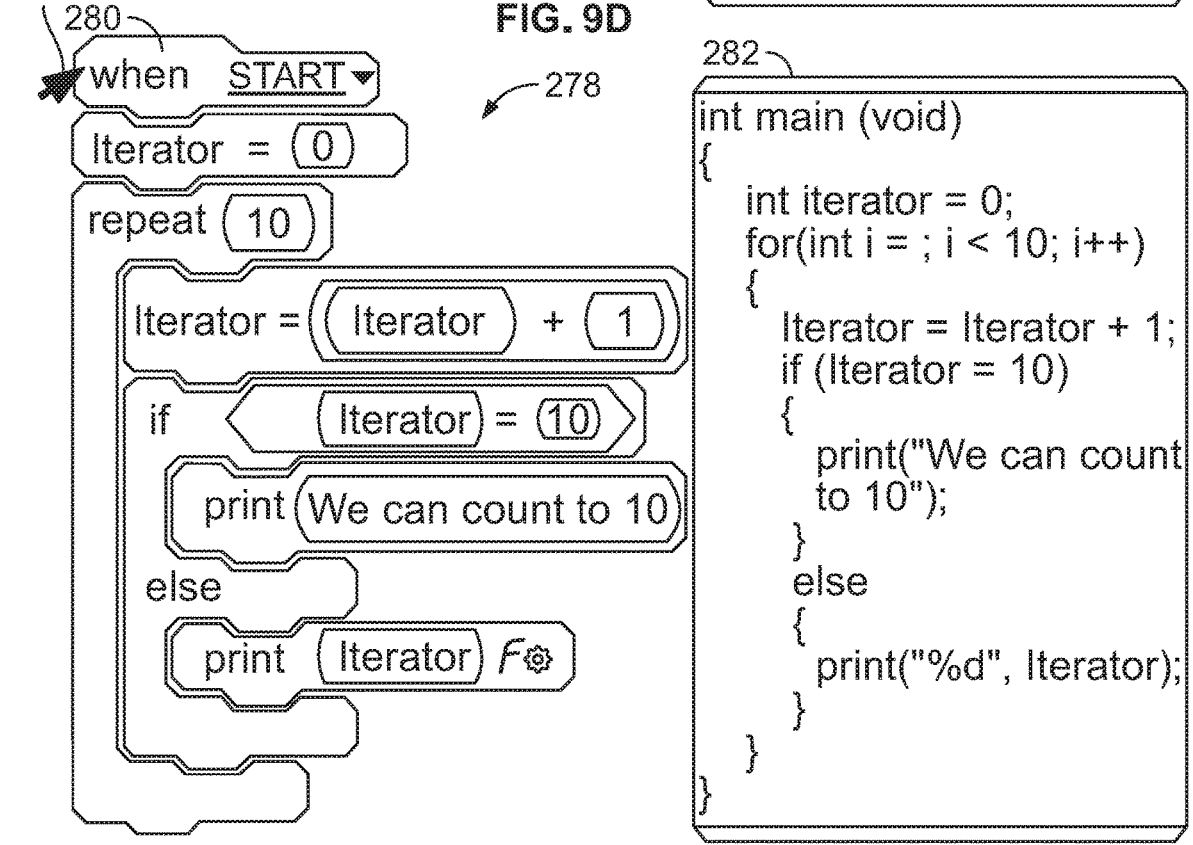

The peek function may have two options when used on the first block of a program; 1) see just the code equivalent of the first block, or 2) see the entire program. FIG. 9E shows an example of the Peek Function used to peek at the Code Block that is equivalent to an entire program 278 of Graphical Blocks.

Figure 10A:
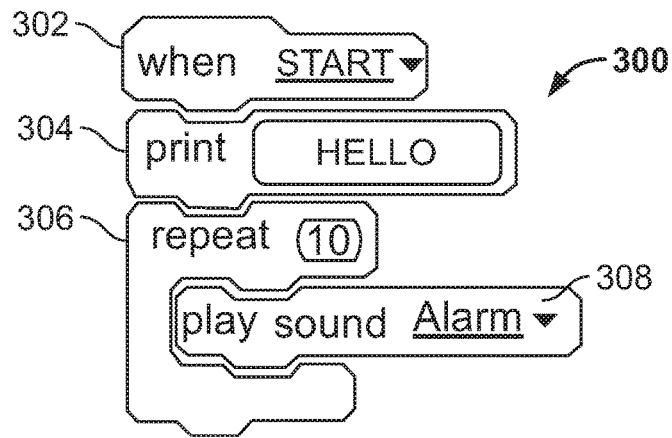
FIGS. 10A-10D illustrate a Block Convert Function that converts a Graphical Block to a Code Block within the Graphical Block program.
Figure 10B:
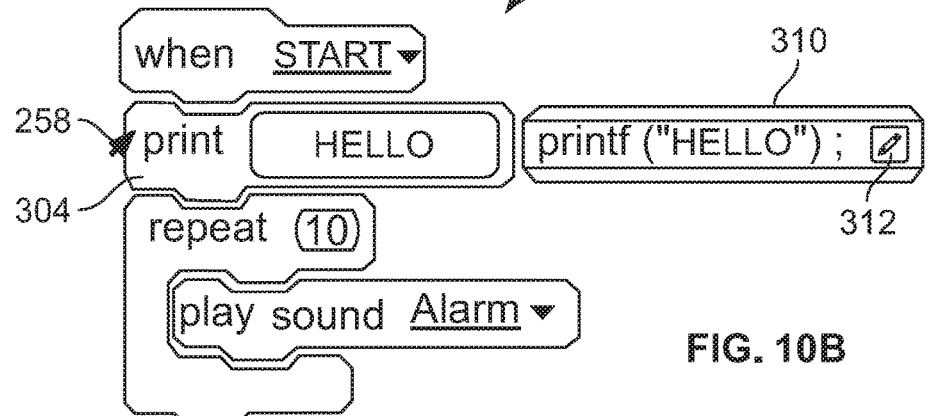

Convert Graphical Block to Code Block: FIGS. 10A-10D show one implementation of the Block Convert Function that converts a Graphical Block to a Code Block. Once converted the Code Block can then be edited using standard C statements. Many alternate user actions can be devised to achieve the same results. In FIG. 10A illustrates a program 300 made up of various Graphical Blocks, including a When block 302, a Print Block 304, and a Repeat Block 306 with a Play Sound sub-block 308. As shown in FIG. 10B as a first step, the cursor 258 is used to click on one of the Graphical Blocks as an initial Peek Function to invoke the equivalent Code Block 310. The program 300 is the same program from FIG. 10A. As illustrated, the cursor 258 is shown clicking on the Graphical Block, Print block 304. As a result of the click action the equivalent Code Block 310 is shows to the right of Print block 304. In addition and in accordance with the present invention, the Code Block 310 has an Edit button 312.

Figure 10C:
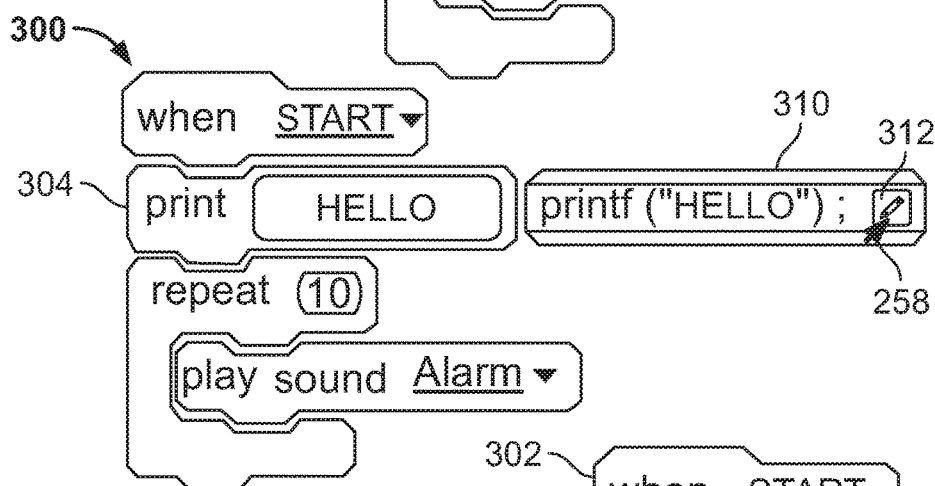
Figure 10D:
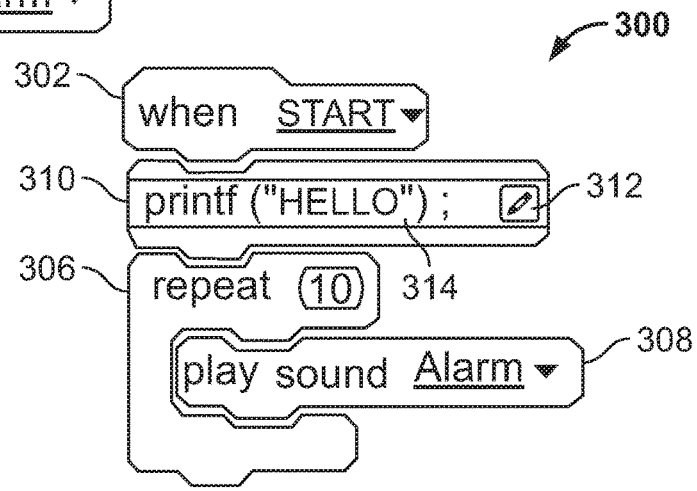

FIG. 10C is a second step to the Block Convert Function. FIG. 10C shows the user initiating a conversion of a Graphical Block to an equivalent Code Block. The program 300 is the same program from FIGS. 10A-10B. The cursor 258 is shown clicking on the Edit button 312. FIG. 10D shows the result of the user clicking on the Edit button 312 from FIG. 10C. The mixed program 300' includes a mix of Graphical Blocks 302 and 306 and now a Code Block 310 that has replaced the Print block 304 from the previous figures. The Edit button 312 is part of the Code Block 310 and can be used as a means to allow the user to edit the Code Block 310 by using C programming statements 314. Alternately the user can click within the Code Block 310 to begin the edit process.

Figure 11A:
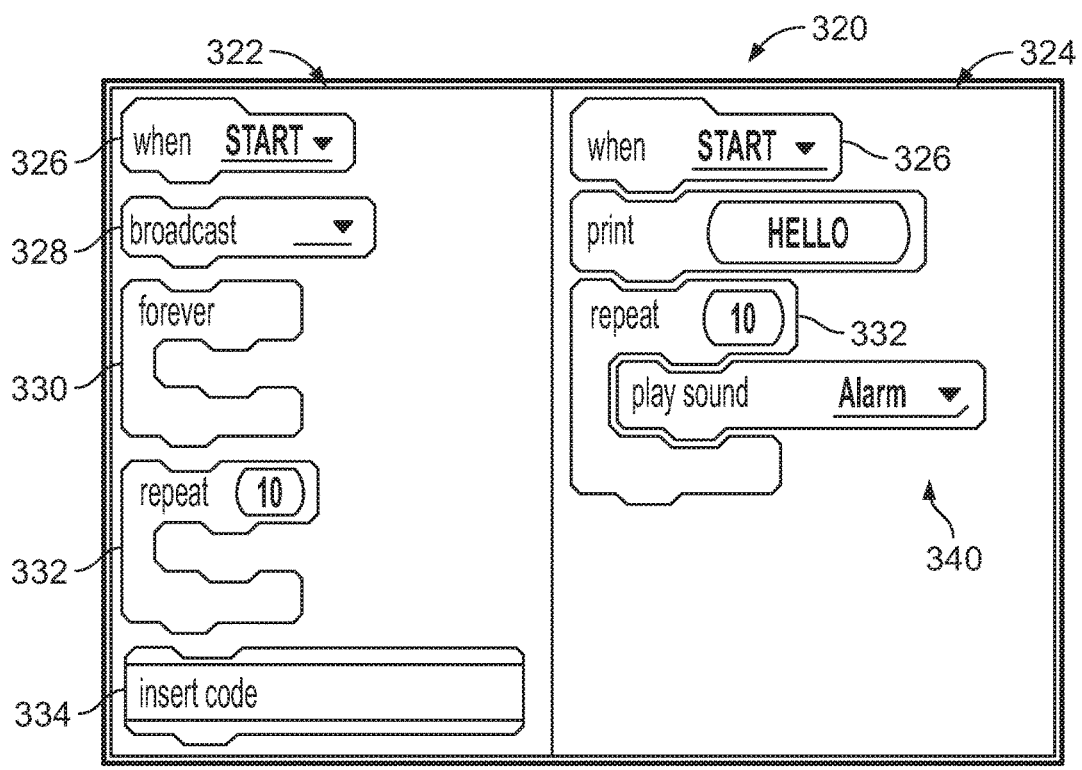
FIGS. 11A-11C illustrate a screen template that permits the addition of new Blank Code Blocks into a from the Toolbox Area into a Working Area.
Figure 11B:
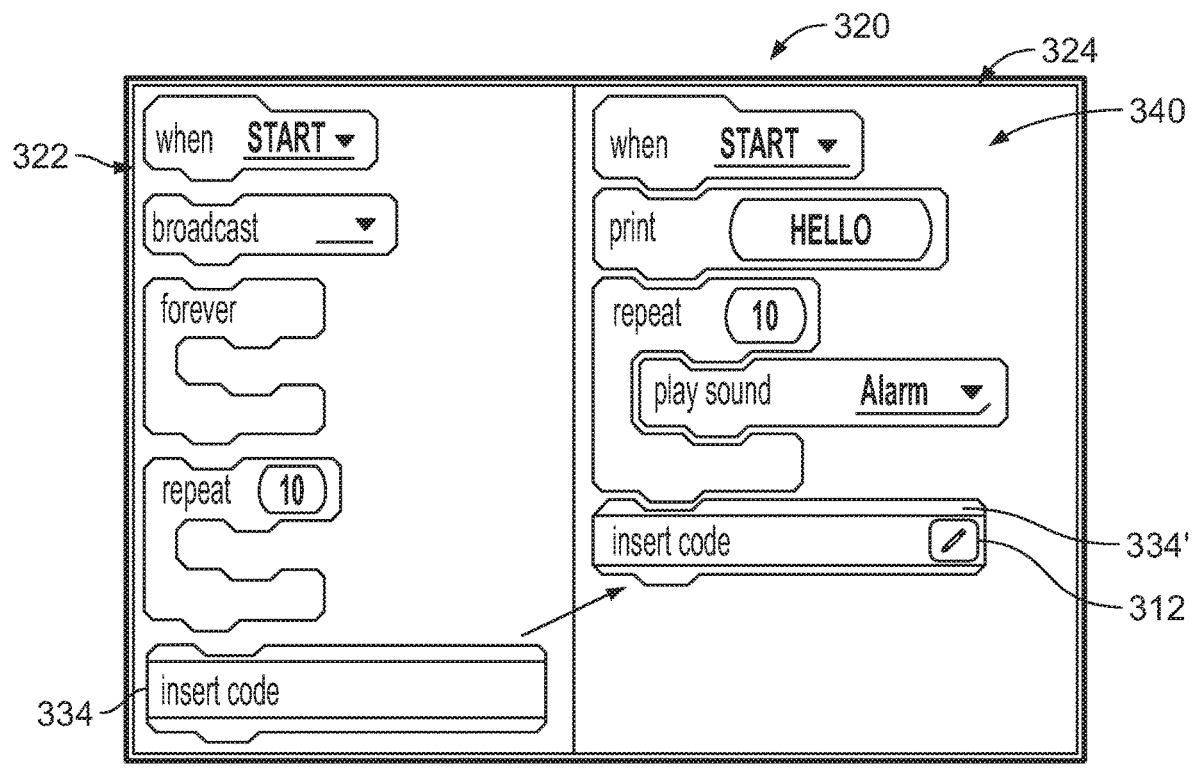
Figure 11C:
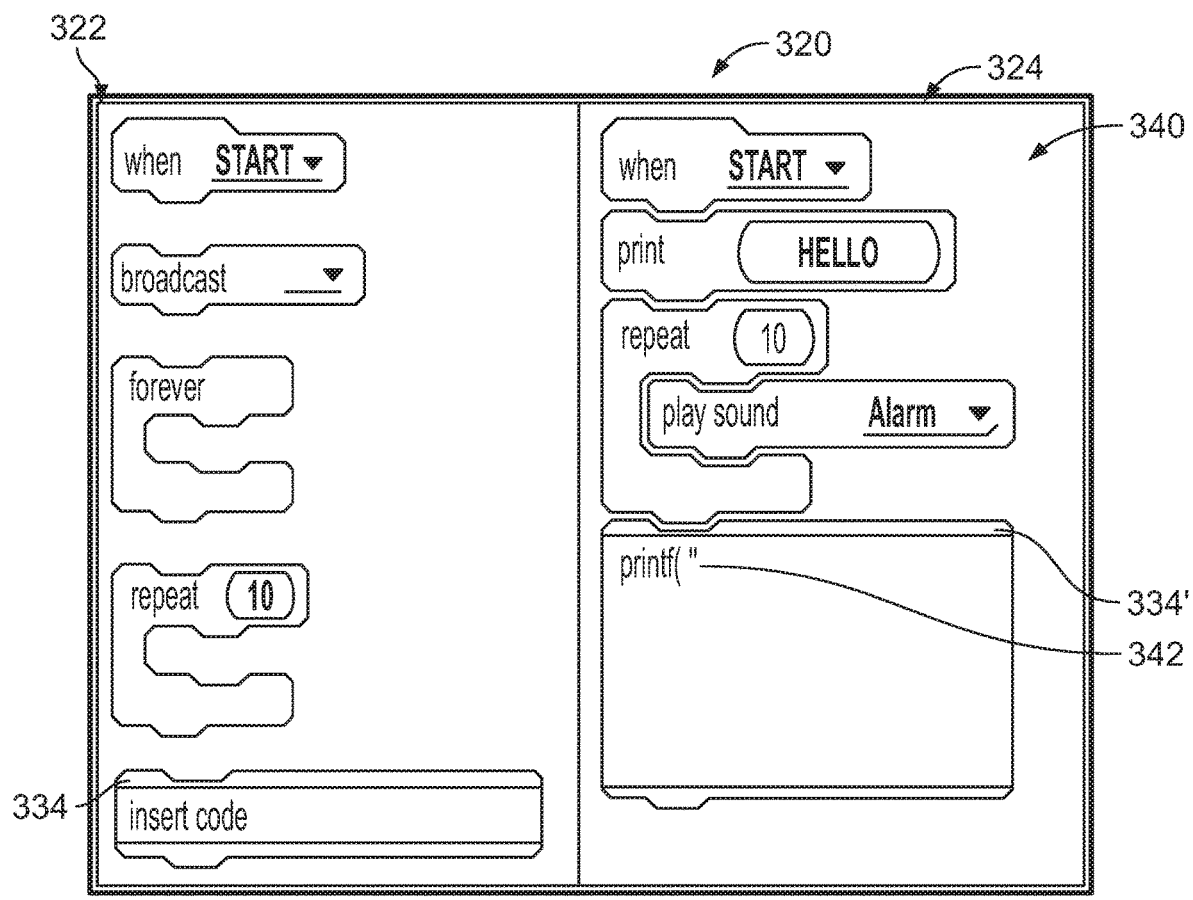

New Code Block: FIGS. 11A-11C shows, in accordance with one embodiment of the invention, a screen template 320 allowing a user to add, from a Toolbar Area 322, a new Blank Code Block 324 that can be dragged from the Toolbox Area 322 into a Working Area 324. The Blank Code Block 324 can be used with other Graphical Blocks or as a stand-alone Code Block. Once inserted, the user can then use the Edit button 312 to insert code, i.e., the text "insert code" is removed and the cursor is shown blinking. The user can now type any new code from scratch.

In more specific detail, FIG. 11A shows a screen template 320 that includes Toolbar Area 322 on the left side and a Working Area 324 on the right side. Multiple Graphical Blocks are shown in the Toolbar Area 322 including a When block 326, a Broadcast block 328, a Forever block 330, and a Repeat block 332. A blank Code Block 334 is also shown in the Toolbar Area 322. The blank Code Block 334 contains the text "insert code" to let the user know this block allows typing within. Blocks in the Toolbar Area 322 can be dragged into the Working Area 324 on the right. The Working Area 324 already contains multiple Graphical Blocks forming the start of a program 340.

FIG. 11B shows the same scene as in FIG. 11B. The user has dragged the blank Code Block 334 from the Toolbar Area 322 on the left to the Working Area 324 on the right, connecting the new blank Code Block 334' to the bottom of the Repeat block 332. The new blank Code Block 334 when inserted into the Working Area 324 will have an Edit button 312. FIG. 11C shows the same scene as FIG. 11B except that the user has clicked on the Edit button 312 and the user has started typing a partial C statement 342. While illustrated as a programming print statement, the user can program any statement in the blank Code Block 334'.

Figure 12A:
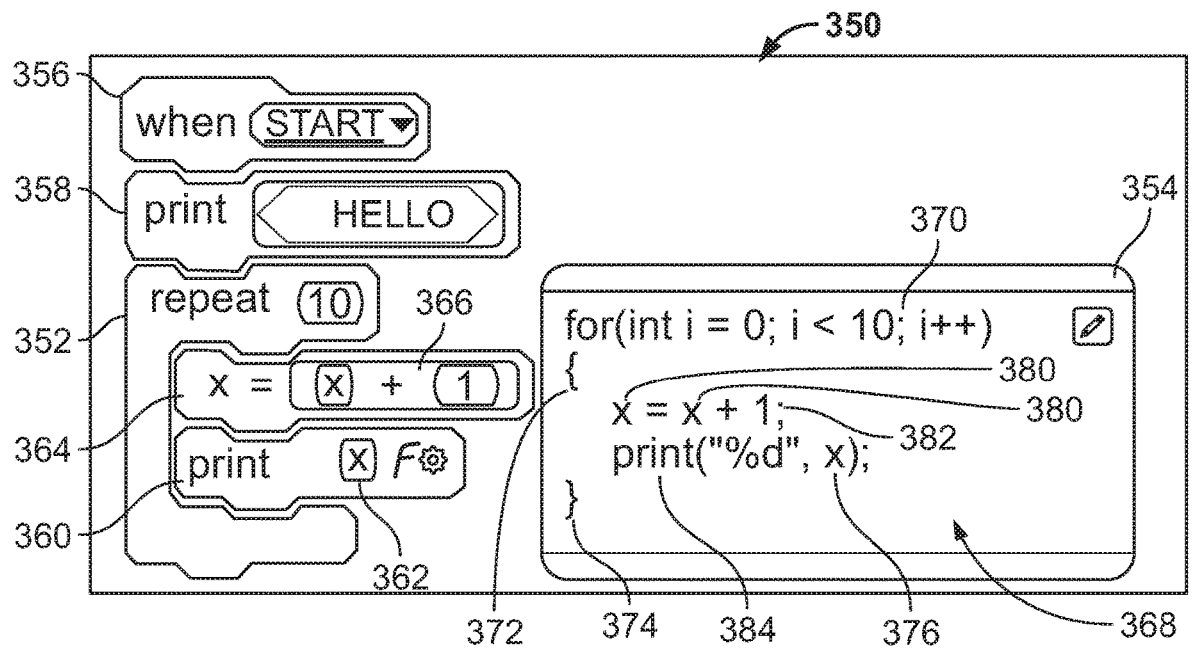
FIGS. 12A-12B show an Editor Feature in a Code Block with a Hover Over Function for users to better understand the C statements in Coding Blocks.
Figure 12B:
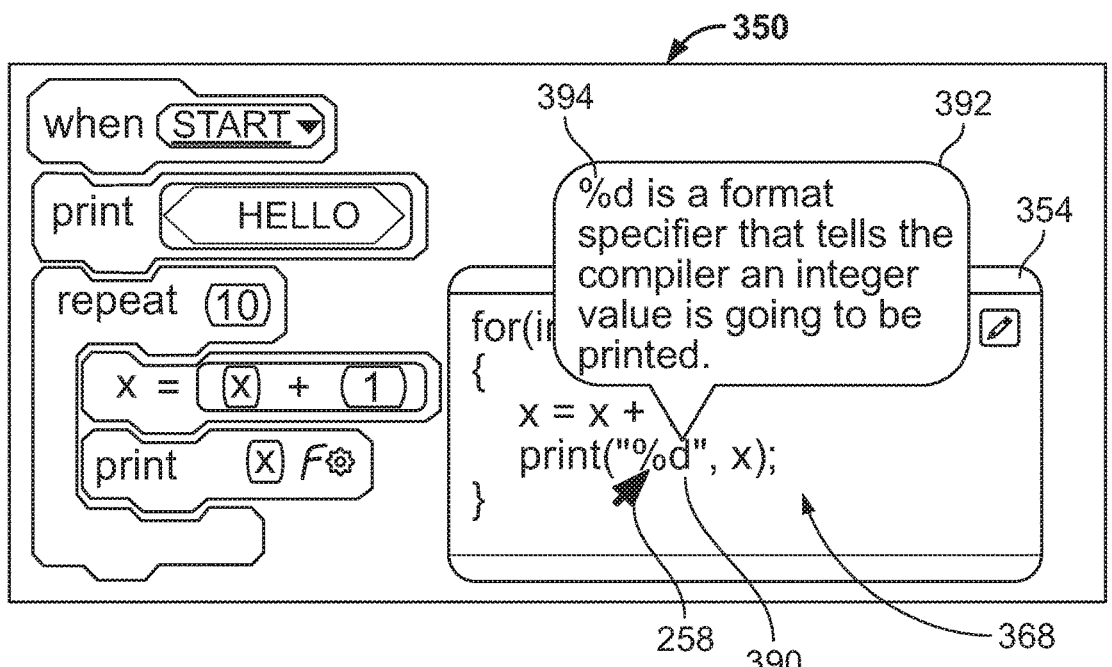

Editor Features in a Code Block: FIGS. 12A and 12B illustrate Code Blocks that have features similar to text editors, such as color coded text, auto-indention, autocomplete, bracket support, etc. One option is to mimic the coloring of the blocks with the new text. In this example the brackets {and} are also color coded with the line that is associated with them. A "Hover Over" Function allows students to hover over the text code %d is see that it is a format specifier. Similarly with data types, since the graphical block abstracts that info out, presenting the "hover over" as a scaffolding technique would help the students.

FIG. 12A shows a program 350 made from Graphical Blocks. By placing a cursor (not shown) over the Repeat block 352, the user has peeked at the Repeat block 352 by revealing the equivalent Code Block 354. Each of the Graphical Blocks can have a color that helps the user infer its function. The color of the When block 356 and the Repeat block 352 are orange. The color of the Print blocks 358 and 360 are blue. The color of the X block 362 and the X=block 364 are red. The color of the + block 366 is green. The C statements 368 in the Code Block 354 are derived from Graphical Blocks 352 thru 366. The portion of the C statements 370, 372, and 374 (also shown below) are color coded orange since they are the equivalent of the Repeat block 352 that is also orange.

```
for(int 1 = 0; i < 10; i++)
{
}
```

The portions of C statements 376 and 380 (also shown below) are color coded red since they are the equivalent of the x=block 364 and x blocks 362 that is also red.

x=x;

x

The portions of C statements 382 (also shown below) are color coded green since they are the equivalent of the + block 366 that is also green.

+

The portions of C statements 384 (also shown below) are color coded blue since they are the equivalent of the Print block 360 that is also blue.

print("%d",);

FIG. 12B is the same as FIG. 12A. The user however has hovered the cursor 258 over a portion of text "%d" 390 that the user is unfamiliar with as is does not appear in the Print block 360. A pop-up window 392 with a help description 394 appears to aid the user in understanding the text portion 390 of the C statement 368.

Figure 13:
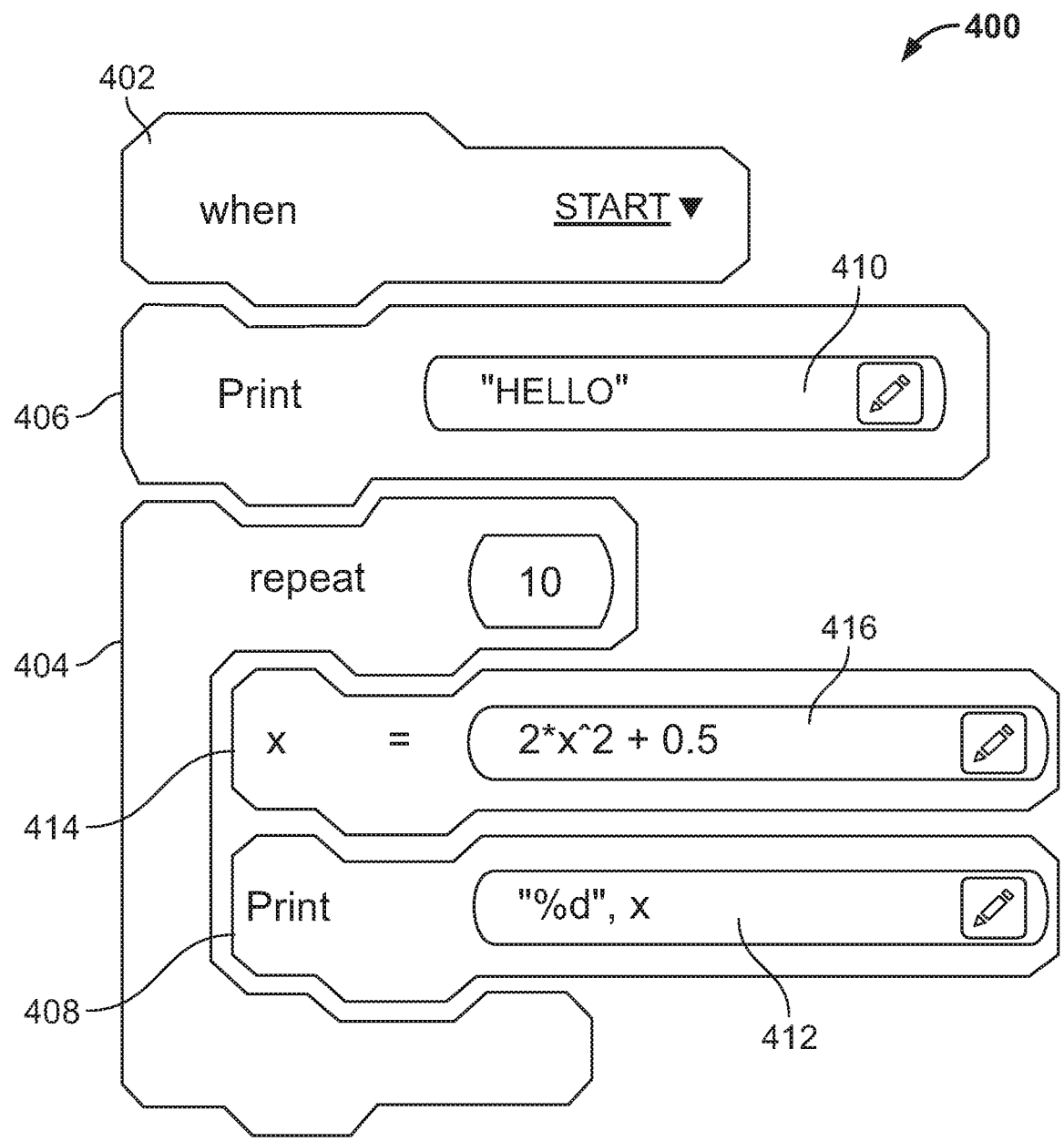
FIG. 13 illustrates a Code Block that includes a the argument window for entering text, to permit users to express formulas in a code format.

Code Inside a Block: FIG. 13 shows a new Code Block can be dropped into the argument window of a block. This allows formulas to be expressed in code format. The example below uses this method in the Print block and the X=block. Referring now to FIG. 13, there is shown in accordance with an embodiment of the invention, a program 400 containing Graphical Blocks: When block 402 and Repeat block 404. Print blocks 406 and 408 are also provided and are a new form of Print blocks that allows both blocks and C arguments within the argument window. The user has entered the argument "Hello"

in the argument window 410 of Print block 406, while the user has entered the argument "%d", x in the argument window 412 of Print block 408.

The x=block 414 is a new form of x=block that allows both blocks and C arguments within the argument window. In this example the user has entered the argument 2*x^2+0.5 in the argument window 416. Other options for the argument ## are any argument that is valid for a C equation argument.

Figure 14A:
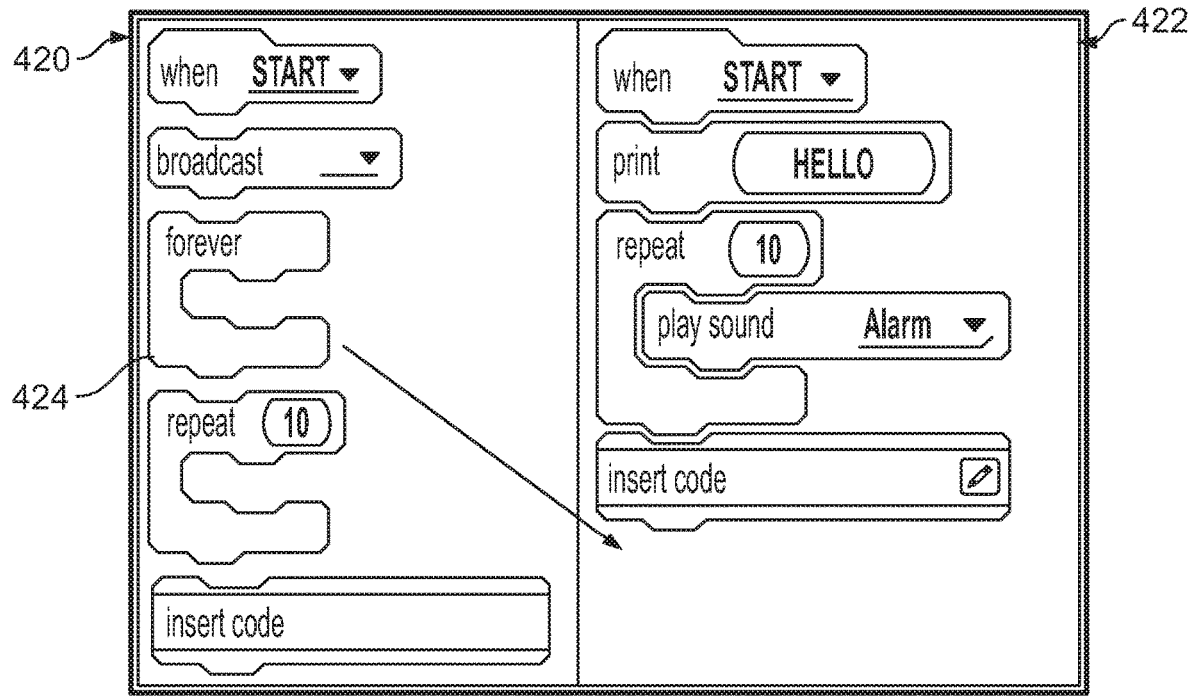
FIGS. 14A and 14B illustrate in one embodiment of the invention the ability to change the left Toolbar Area from Blocks to Text snippets.
Figure 14B:
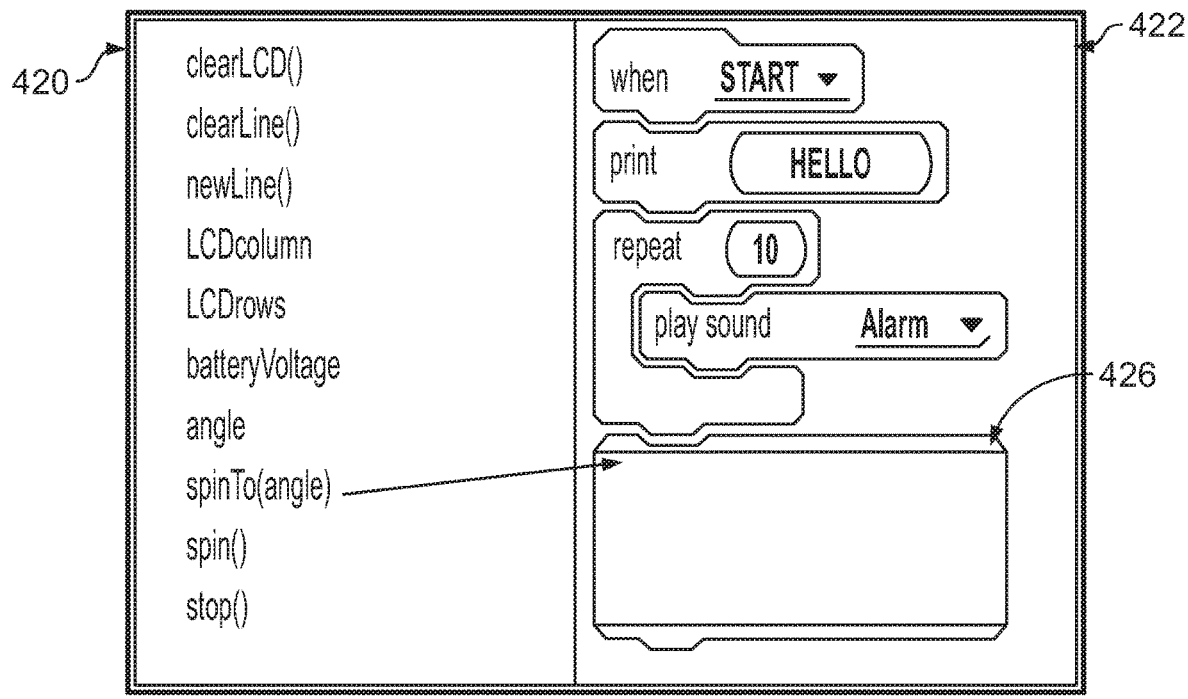

Toolbar Change: FIGS. 14A and 14B illustrate in one embodiment of the invention the ability to change the left Toolbar Area 420 from Blocks to Text snippets depending on what the user is editing on the right Working Area 422. FIG. 14A shows the user dragging a Graphical Block 424 from the Toolbar Area 420 to the Working Area 422. FIG. 14B shows the left Toolbar transformed to code snippets. The user can now drag code snippets from the left Toolbar Area 420 into the Code Block 426. Several methods can be used to change the left Toolbar from blocks to text. One option is a user controlled switch. Another option is to automatically switch to text snippets in the toolbar when the user clicks within a Code Block, and automatically switch to blocks in the toolbar when the user clicks anywhere outside of a Code Block.

Dropping Blocks in a Code Block: FIGS. 15A through 15D, there is illustrated a function provided by an embodiment of the invention that permits the user to drag Graphical Blocks into an existing Code Block and when released/ dropped/added in the invention automatically converts the Graphical Block to text and inserts the text in the position that the user desired/cursor position. This would help users with transition difficulties. Students could drop a command in and see the syntax that was added. As the block is being dropped into place the text will dynamically update. But the system can also make sure the block can only be dropped in a location that makes since. So the user cannot drop it in a location that would cause a coding error.

Figure 15A:
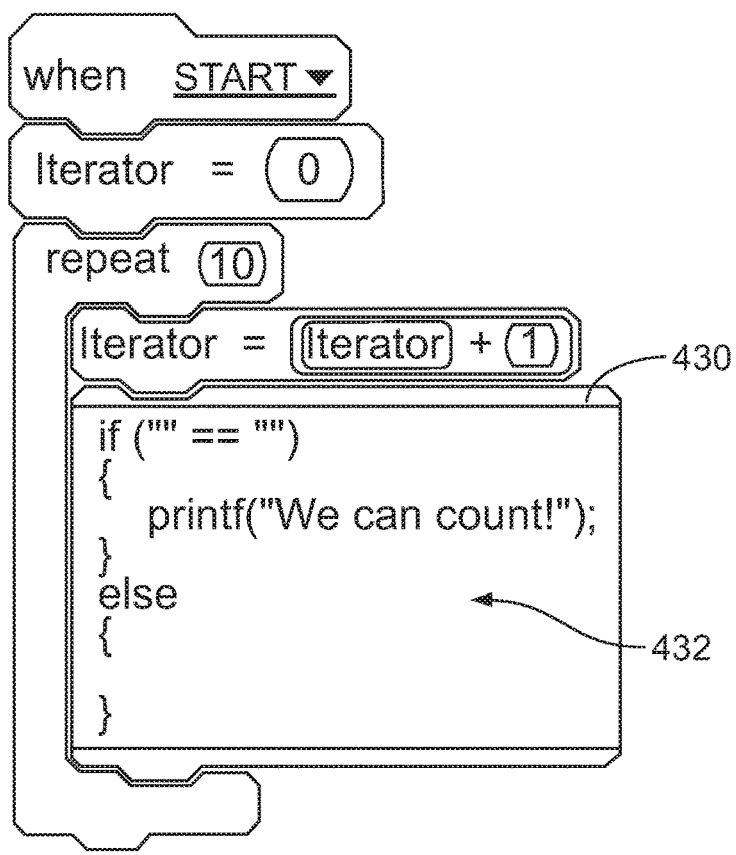
FIGS. 15A-15D illustrate a function to add Graphical Blocks into an Existing Code Block by automatically converting the Graphical Block to text during the insertion.
Figure 15B:
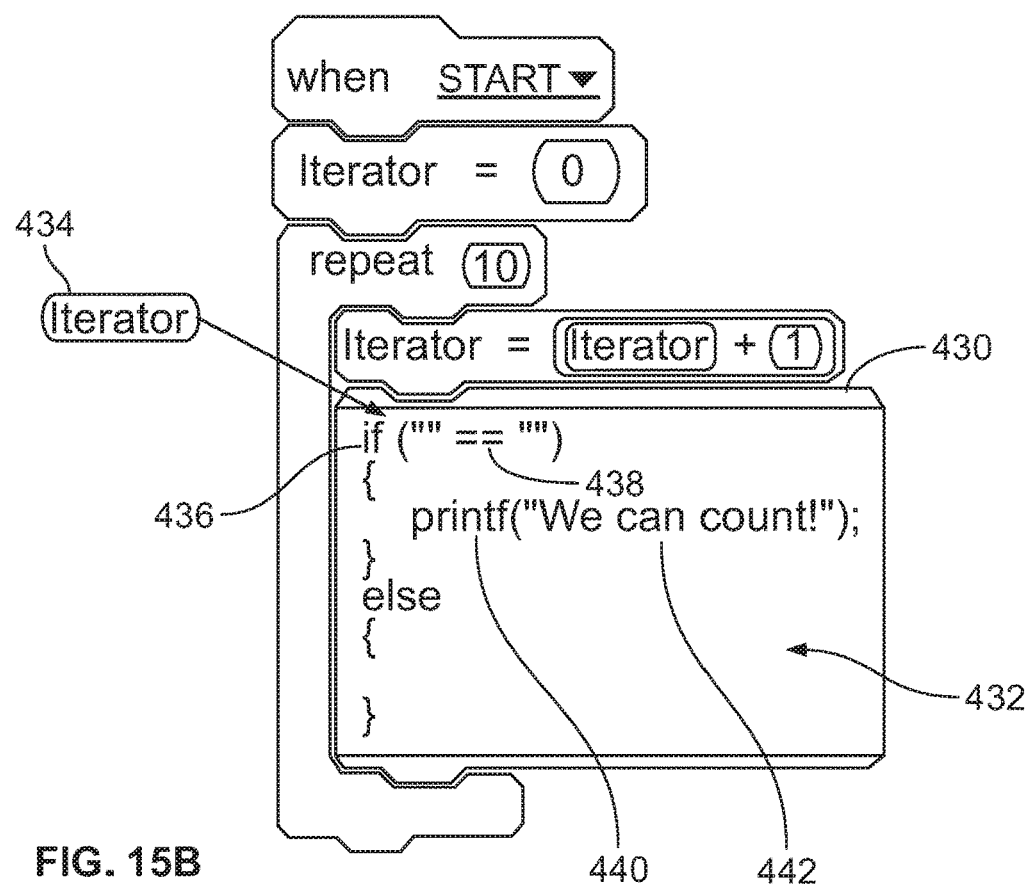
Figure 15C:
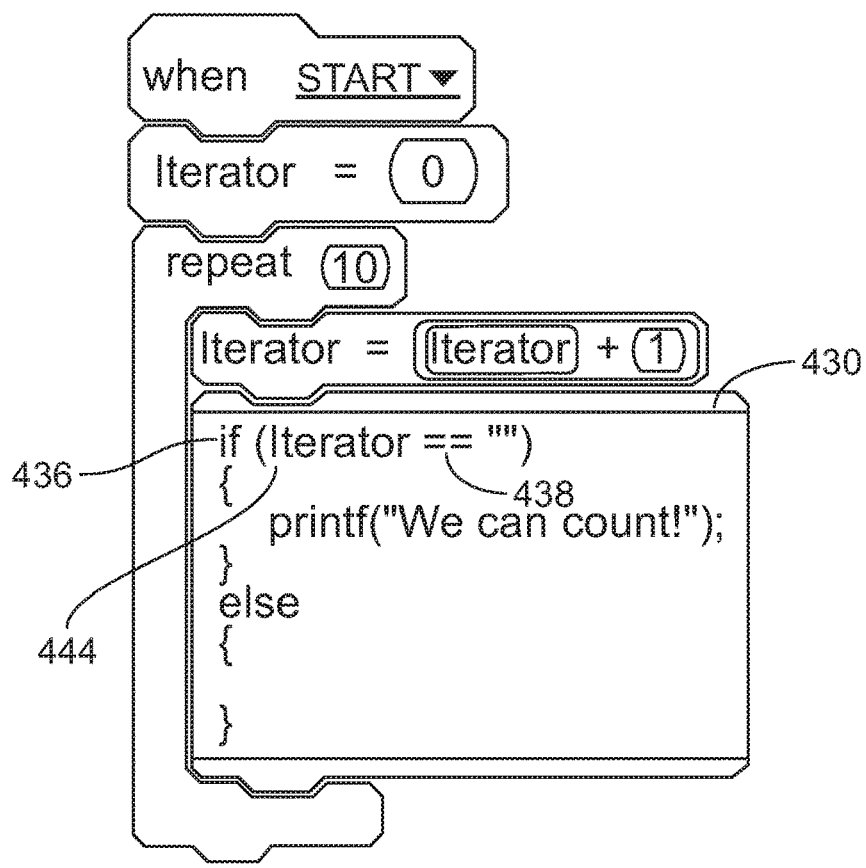
Figure 15D:
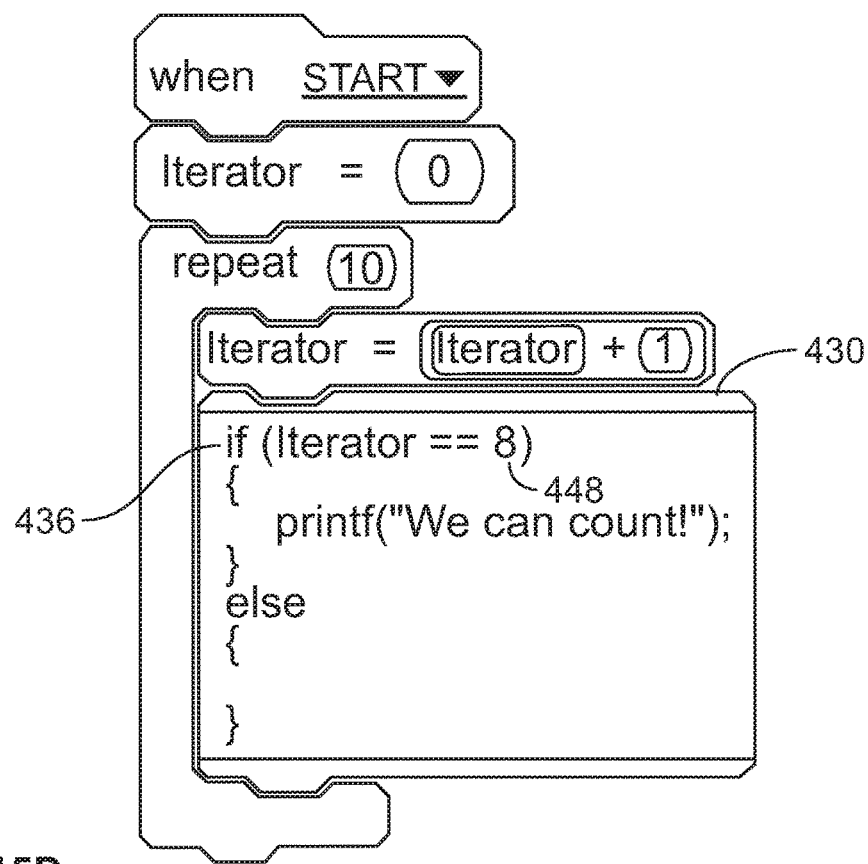

FIG. 15A shows a group of Graphical Blocks and one Code Block 430. The Code Block 430 contains C statements 432. FIG. 15B shows the same scene as FIG. 15A with the addition that the user is dragging a Variable Iterator block 434 into the Code Block 430. The application or invention will allow the Variable Iterator block 434 to be dropped only into valid locations. Valid locations are as part of the If statement 436 either before or after == 438 or as part of the Print statement 440 either before or after the text "We can count!" 442. FIG. 15C shows the same scene as FIG. 15B after the user has dragged and dropped the Variable Iterator block 434 into the If statement 436 and to the left of the == 438. The resulting valid C statement if (Iterator ==" ") 444 is the result of the drag and drop. FIG. 15D shows the same scene as FIG. 15C with the user further interacting with the Code Block 430 by deleting the " " of the If statement 436 and typing the new text "8" 448.

Figure 16:
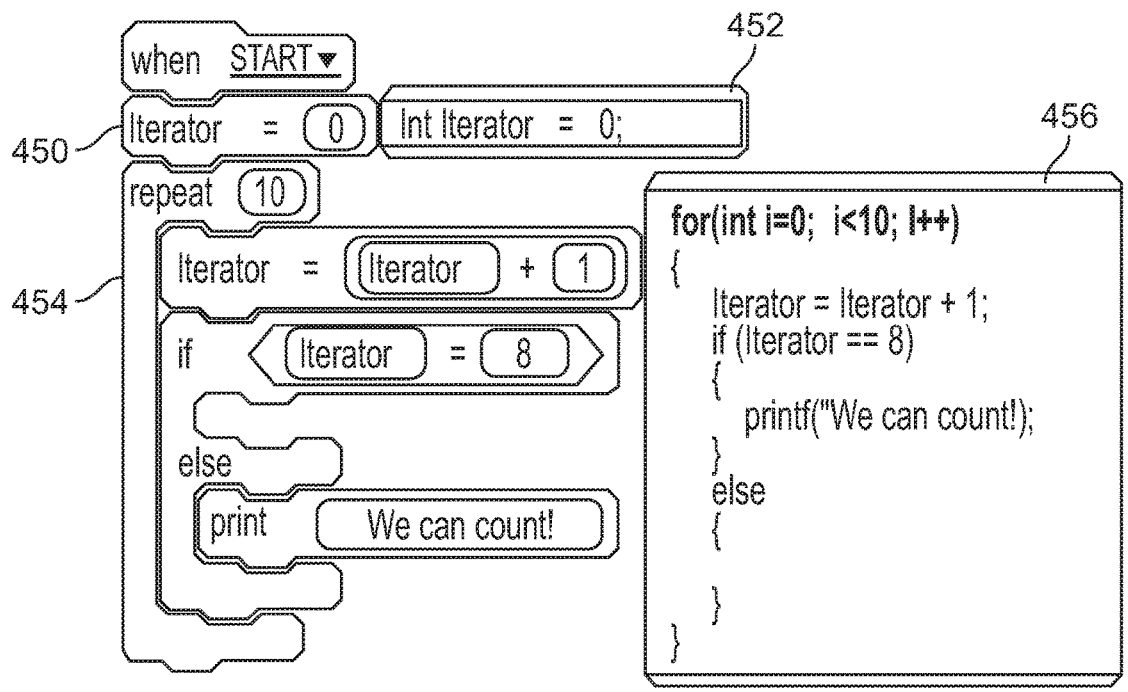
FIG. 16 illustrates data types.

Data Types: FIG. 16 illustrates that the user can be introduced to data types. Blocks abstract the types but at some point the student will have to learn what they are. Introducing data types would help the transition to textual code. Data Types is one of the pain points research identifies when transitioning from the blocks to text. When students are in "code peek" and see the text, the data type could be identified by weight, color, format, etc. to highlight to the student that this was not in the graphical block. In FIG. 16 the user has peeked at the Graphical Block Iterator=0 450 revealing the Code Block 452 which contains the C statement:

Int Iterator=0;

introducing the concept of a data type. Additionally, in FIG. 16 the user has peeked at the group of Graphical Blocks contained within repeat 10 454 revealing the Code Block 456 which contains the C statements:

```
for(int i=0; i<10; I++)
{
    Iterator = Iterator + 1;
    if (Iterator == 8)
    {
        printf("We can count!);
    }
    else
    {
    }
}
``` further introducing the concept of data types in the "for statement".

Figure 17:
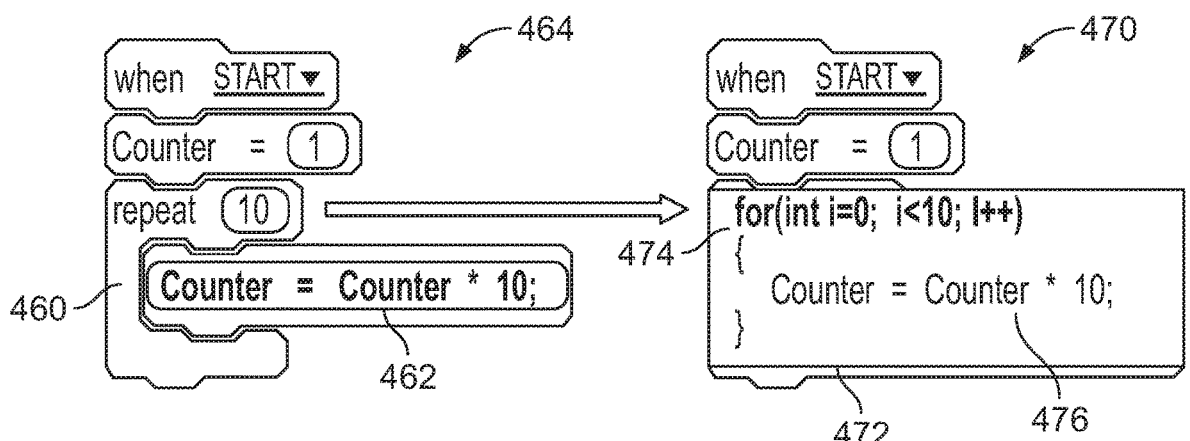
FIG. 17 illustrates Graphical Block conversion to Code Block.

Enhanced Block Conversion—Several methods can be implemented to convert a Graphical Block when the Graphical Block contains a Code Block. FIG. 17 shows a Code Block 462 contained within a Graphical Block Repeat block 460. When the user requests to convert the Repeat block 462 to a Code Block, the right side program 470 is the result. The new Code Block merges the old Code Block 462 and wraps the repeat functionality around it. The resulting Code Block 472 contains both the C statements for the Repeat block 460 and the old Code Block 462.

As illustrated FIG. 17 shows a program 464 on the left that contains a mix of Graphical Blocks and Code Blocks. As shown on the left the Code Block 462 is contained within the Graphical Block Repeat block 460. Through user interaction the Repeat block is selected for conversion to a Code Block. The resulting program 470 on the right shows that the application has converted the Repeat block 460 to the equivalent C statements and merged them into the Code Block 472. The Repeat block 460 equivalent C statements 474 are also shown below:

```
for (int i = 0, i<10, i++)
{
}
The C statement
Counter = Counter *10;
```

476 from the left side Code Block 462 was inserted in the appropriate location within the Repeat block 460 equivalent C statements 474. The resulting Code Block 472 on the right is equivalent to the Repeat block 460 on the left plus the Code Block 462 on the left.

Figure 18:
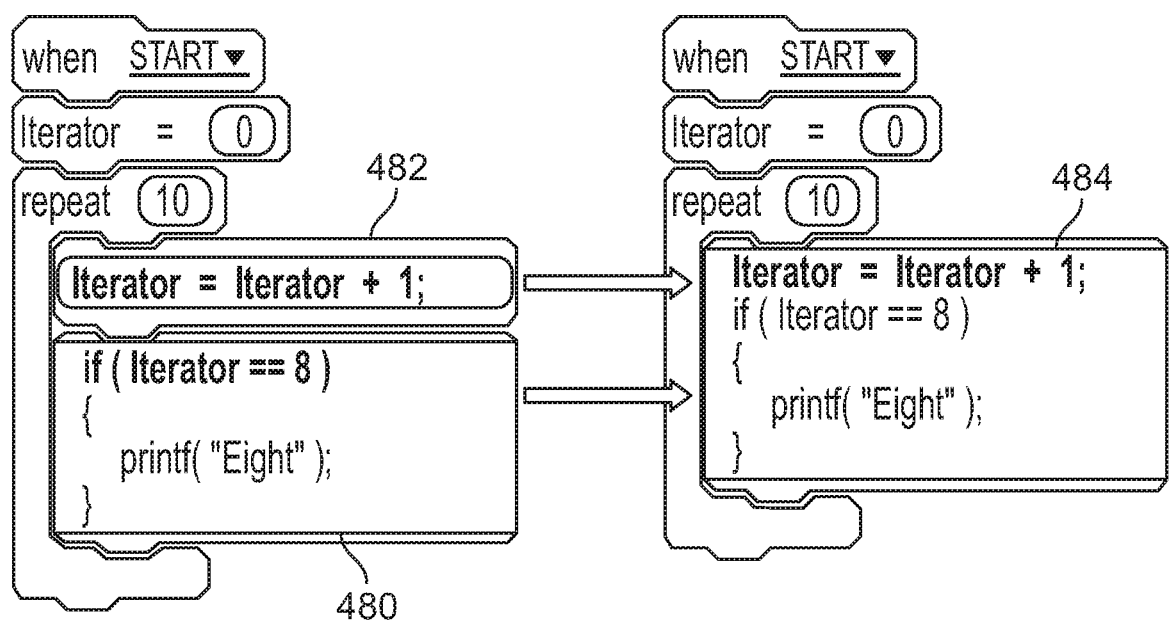
FIG. 18 shows the merging of two Code Blocks into a single resulting Code Block.

Merging Code Blocks: Several methods can be implemented to merge Code Blocks. One method could be to drag one Code Block onto another, indicating the intention to merge. The Exact position of the dragged block could indicate whether it is desired to add the dragged block before or after the destination blocks code. In FIG. 18, the bottom Code Block 480 was detached and dropped on the lower half of the top Code Block 482. A new merged Code Block 484 contains the C statements from both blocks 480 and 482. The application would simply automatically merge the two when dropped.

Figure 19A:
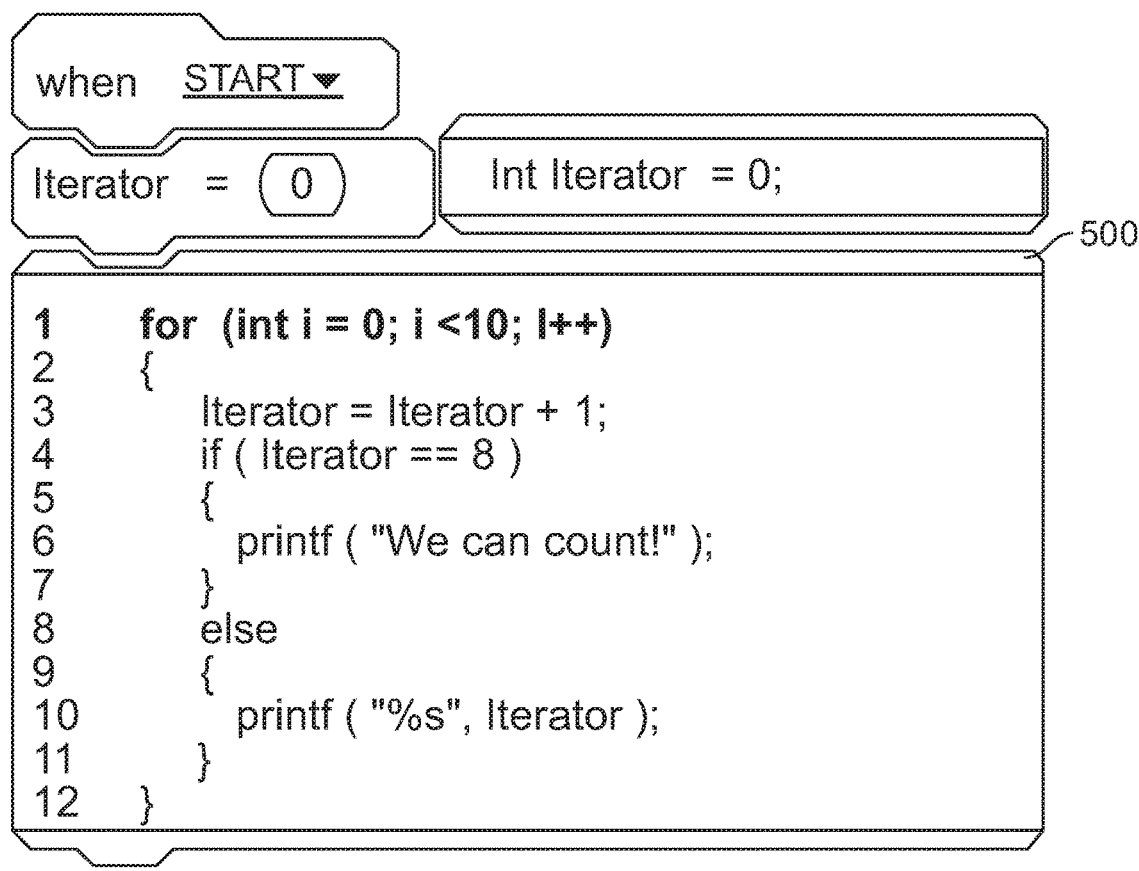
FIGS. 19A-19F in one or more embodiments of the present invention error indicators to allow the correction of coding in the developed program.
Figure 19B:
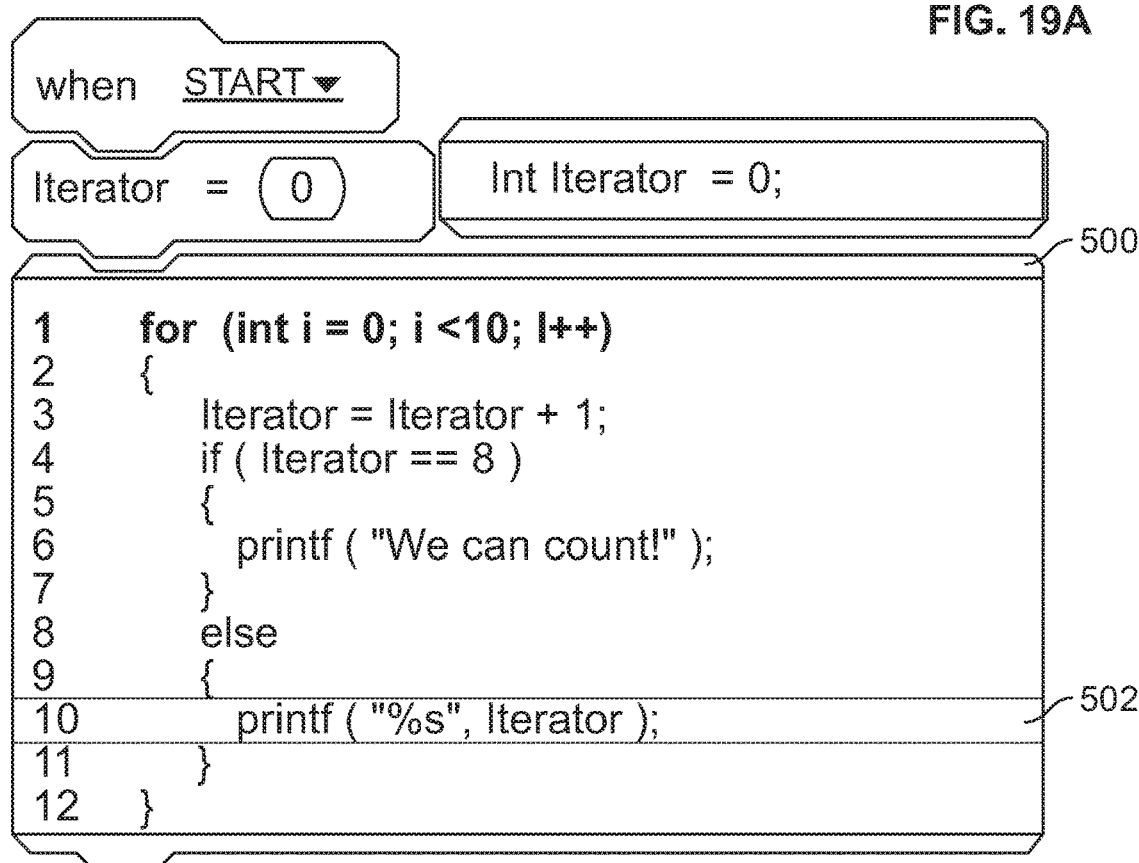
Figure 19C:
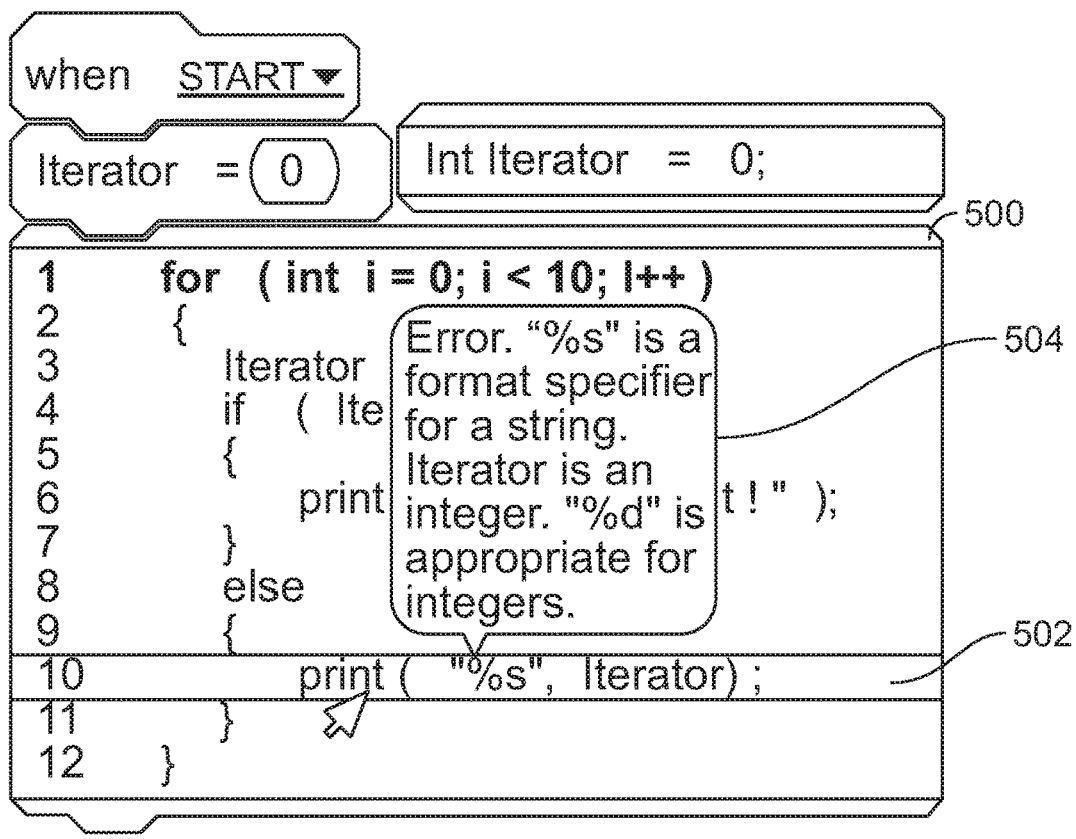
Figure 19D:
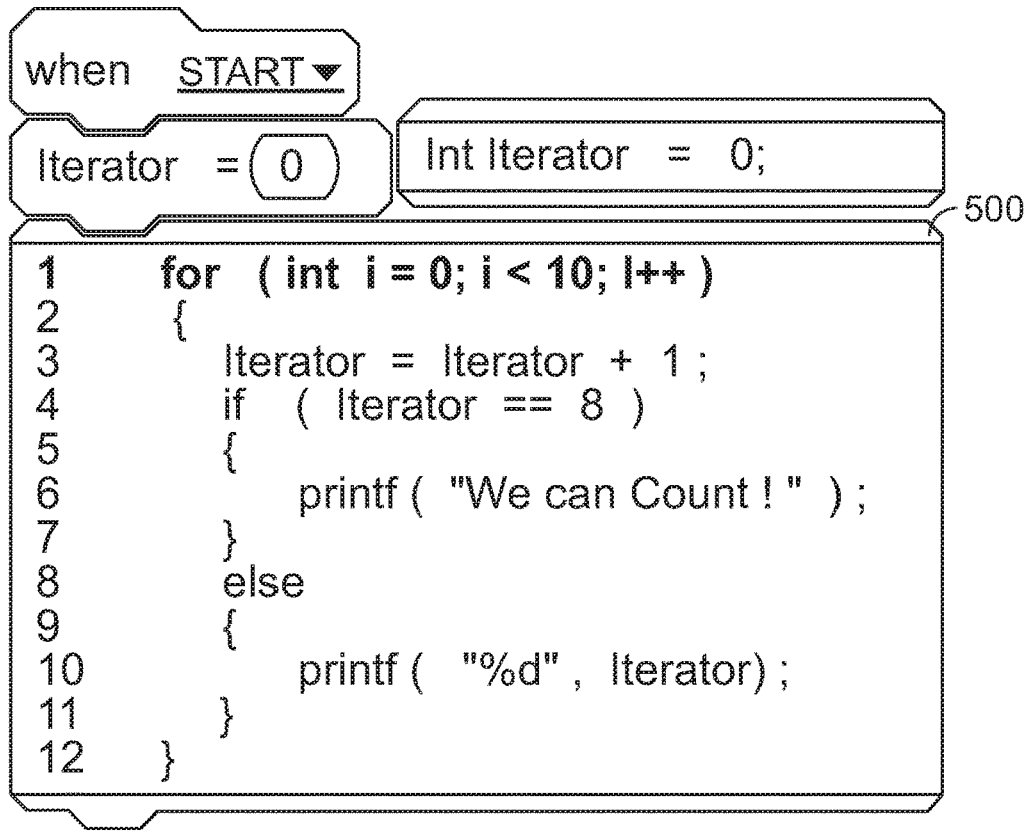
Figure 19E:
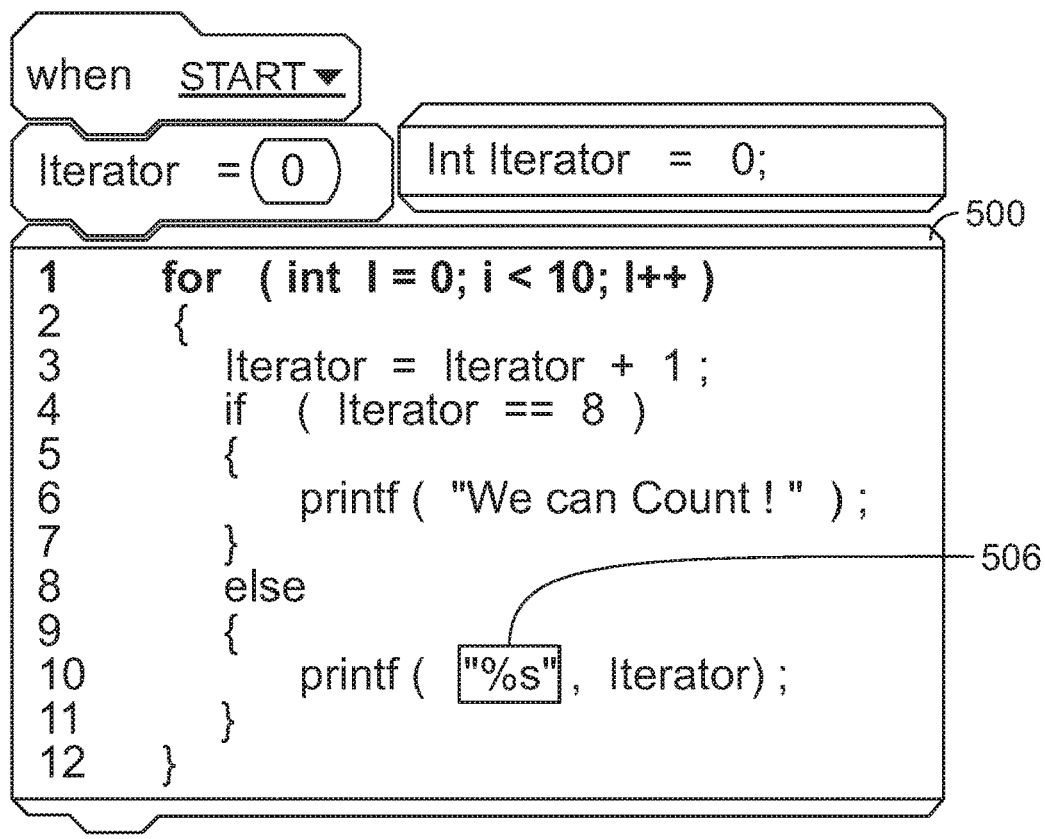
Figure 19F:
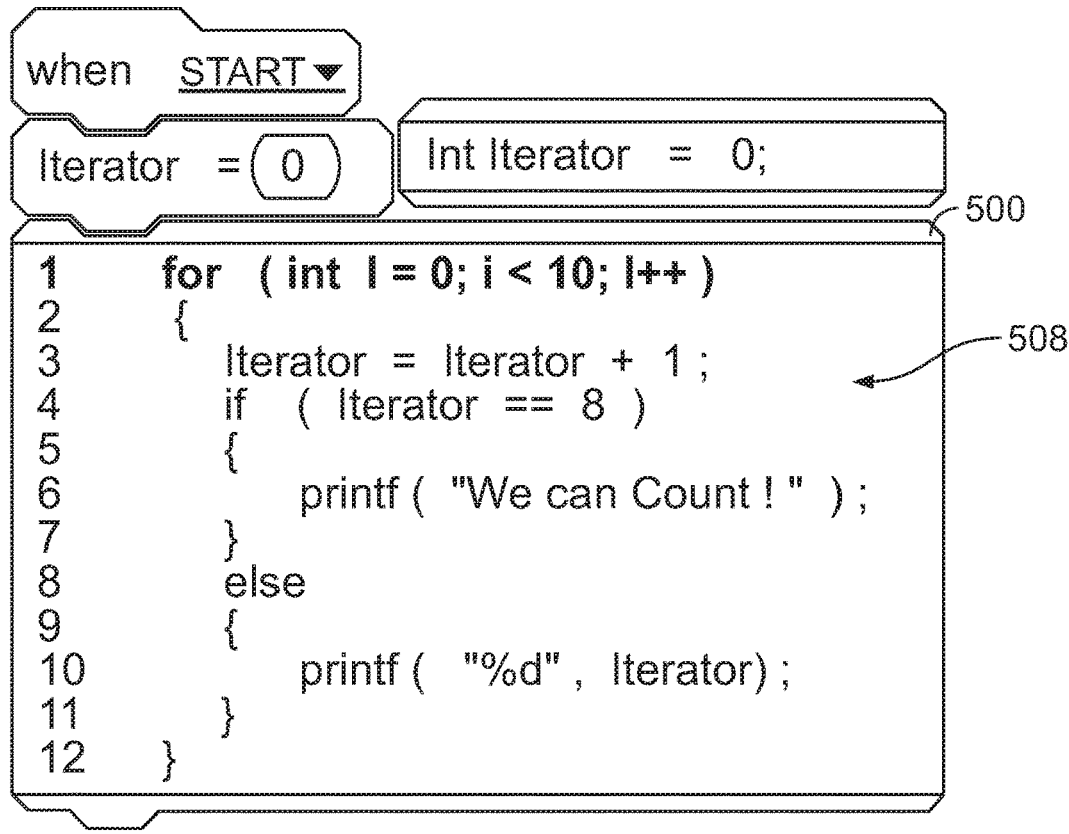

Error Indication: It is also an aspect of the invention to provide Code Block colorization for "errors" to allow the user to easily identify issues. Other methods could also be implemented to identify errors. FIG. 19A shows a Code Block 500 that uses line numbers to assist users in identifying a specific lines. In this case line 10 has an error. The incorrect specifier "% s" for an integer in the printf statement. The application can indicate errors by making the background of the block red. These issues can be identified immediately after typing as opposed to waiting until the user attempts to compile and download. FIG. 19B shows the line 502 that contain the error highlighted. The specific part of the line could also be highlighted or indicated. FIG. 19C should further user help where the user has clicked on the highlighted line and a pop-up window 504 provides hints on how to fix the issue. FIG. 19D shows the program with the error corrected. FIG. 19E shows that the application can optionally indicate errors exist by making the background of the error red 506. FIG. 19F shows that the application can optionally indicate that no errors exist by making the background 508 of the entire Code Block green.

Figure 20A:
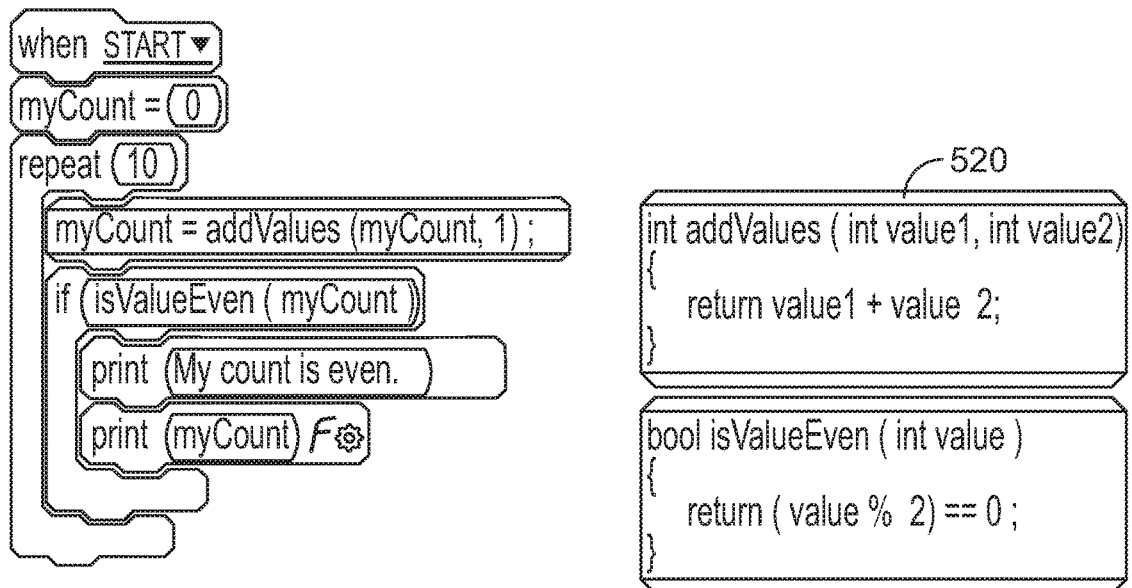
FIGS. 20A-20B shows advance function in accordance with one or more of the embodiments of the invention.

Advanced Functions: FIG. 20A discloses the ability to create blocks with functions 520 and 522 (these are the two stand alone blocks on the right starting with int and also starting with bool) to assist users to learn how to break code up into reusable units. The function blocks do not have "connectors" because they are stand alone units of code (524). The function block shape can correspond with the enclosed function's return type. Calls to the function blocks can be embedded in normal blocks, and they will only fit what their return type allows. This also has the unique advantage of being able to arrange your code vertically or horizontally. FIG. 20A shows two function blocks positioned alongside of block code that calls the functions.

Figure 20B:
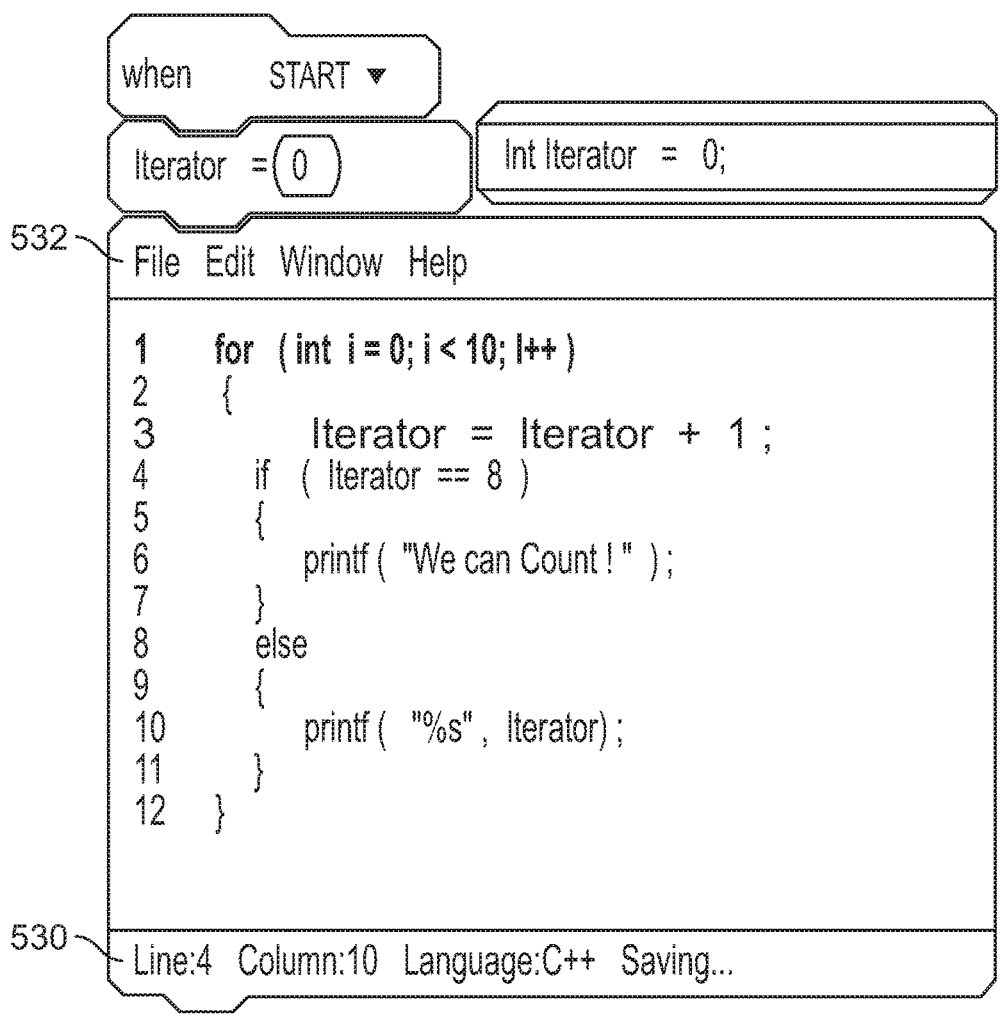

FIG. 20B shows additional features of a text editor that can be added to the Code Blocks, such as but not limited to Line numbers, a status bar 530 can be added to the bottom to indicate the line number, code type, etc., and a top bar 532 can be added with pull down menus such as file, edit, etc. All this can be contained within the Code Block. Alternately this can be done with buttons and icons. Alternately this can be done within the main programs menu structure.

Figure 21:
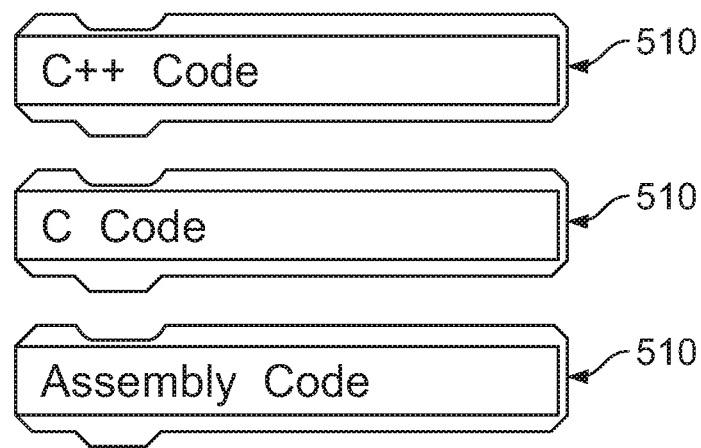
FIG. 21 illustrates various coding languages the user may utilize in the application programming.

Different types of Code: The Code Block discussed previously could have several types. One example is shown in FIG. 21 where the user can select the type of code 510 he/she wants to add. This allows the editor inside the block to make adjustments on syntax suggestions and error checking based on the code type. Examples that work well with normal blocks are C++, C, and Assembly. However, any language could be used such as javascript and python.

Figure 22A:
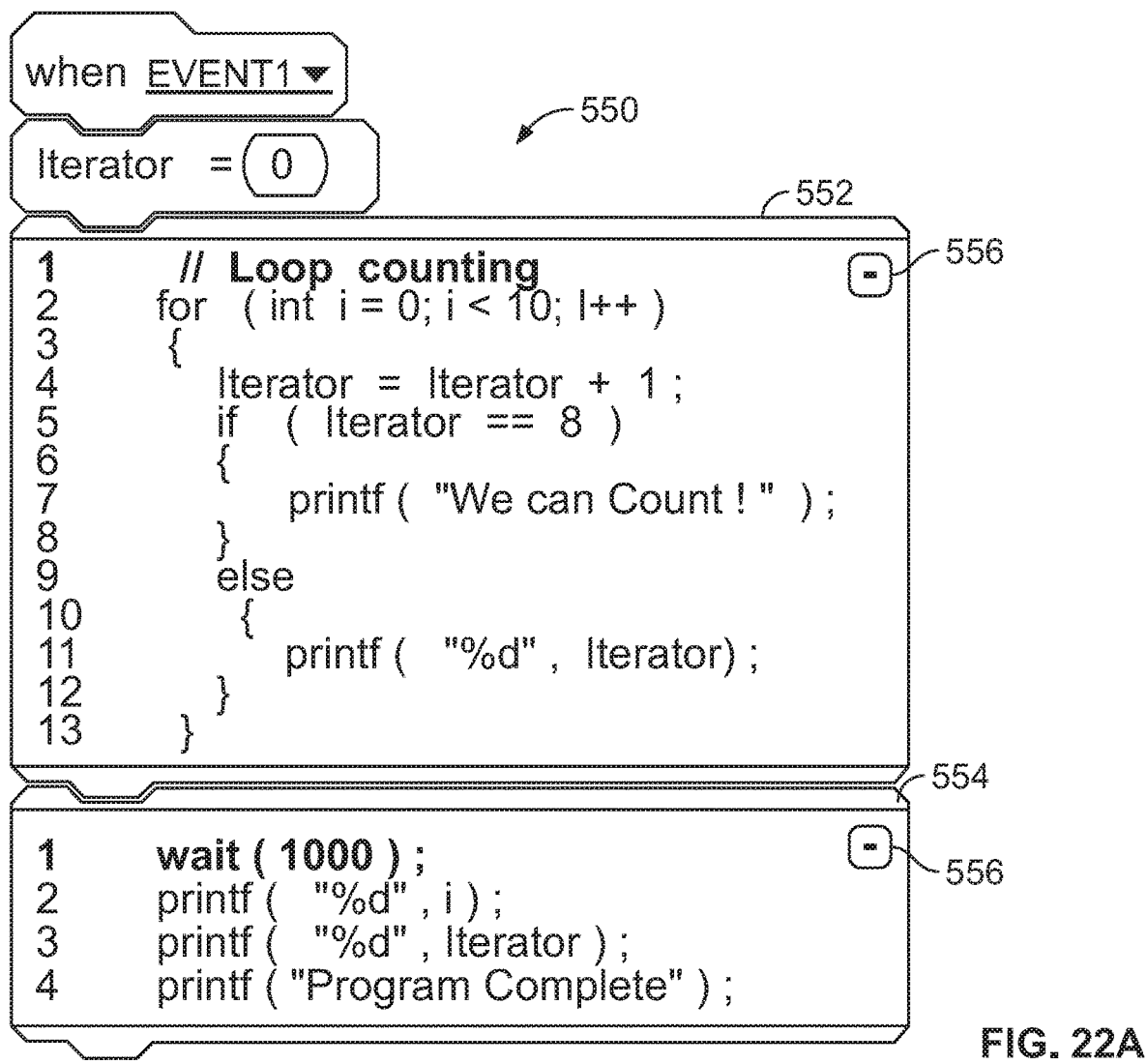
FIGS. 22A-22C illustrates the ability to collapsible and expand code blocks in the programming environment.
Figure 22B:
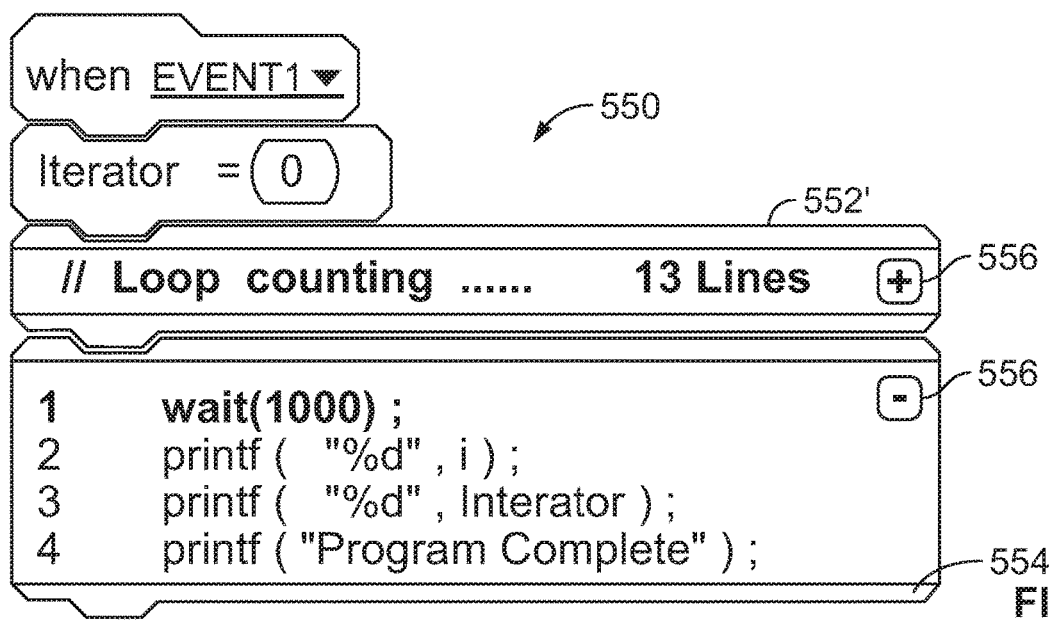
Figure 22C:
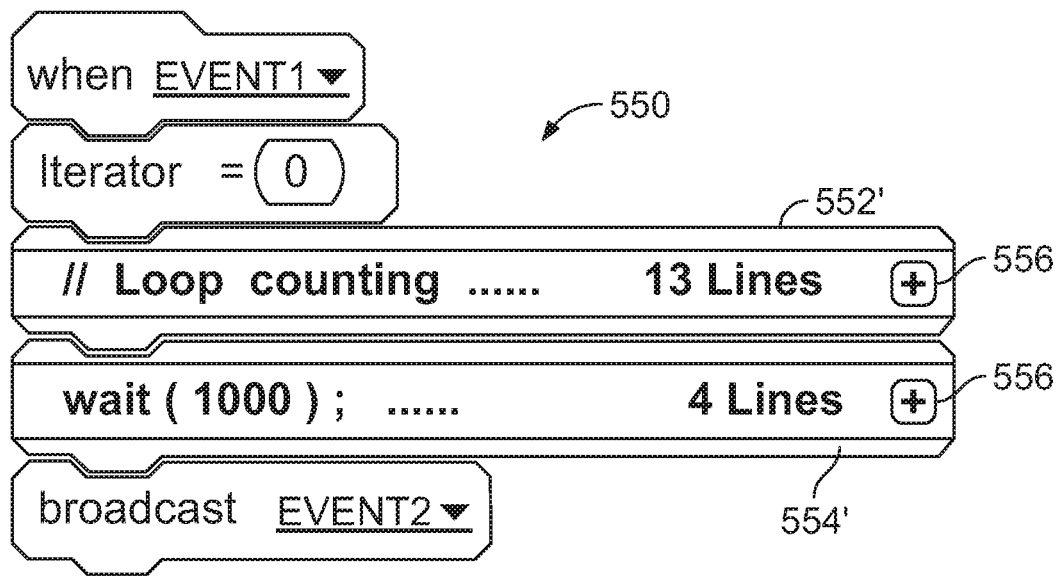
Figures 24A, 24B:
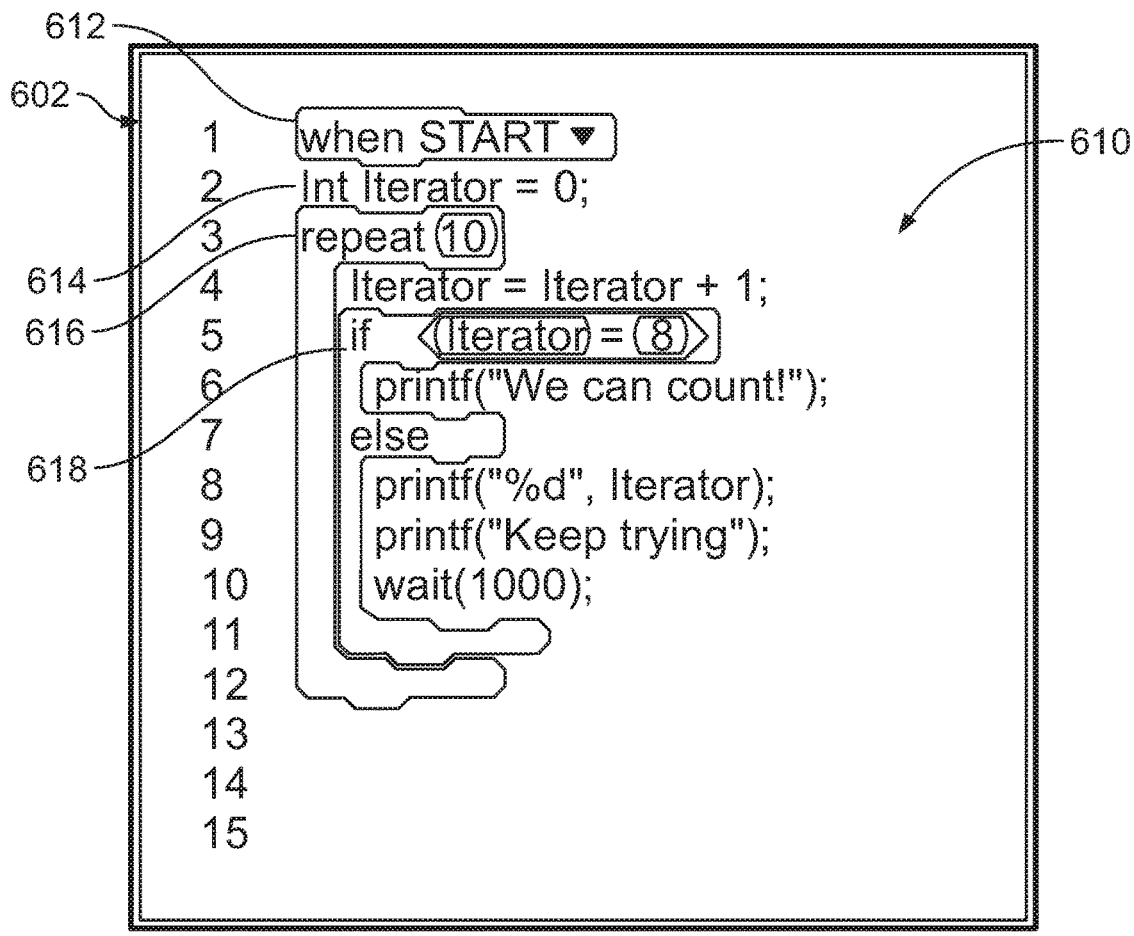
FIG. 24A shows code as an example of an all textual program.
FIG. 24B illustrates an alternative embodiment of the mixed mode programming using a mixed textual programming environment that includes a program that is identical to the all textual program of FIG. 24A.

Collapsible Code Blocks: FIG. 22A shows a Mixed Mode program 550 with two Code Blocks 552 and 554. Each Code Block has a collapse icon 556 as shown that allows the user to collapse the code block down to a smaller size. FIG. 22B shows the same Mixed Mode program 550 after the user has clicked on the collapse icon 556 for the first Code Block 552. A portion of the C statements within Code Block 552 are shown on the one line of the Collapsed Code Block 552' along with the number of lines of code. FIG. 22C shows the same Mixed Mode program 550 after the user has clicked on both collapse icons 556 for Code Blocks 552 and 554. A portion of the C statements within Code Block are shown on the one line of the Collapsed Code Blocks 552' and 554' along with the number of lines of code. There are many other ways to show a glimpse of the code within the Collapsed Code Block Alternate Method: FIG. 24A shows code as an example of an all textual program 600. As further illustrated in FIG. 24B, there is provided as an alternative embodiment of the mixed mode programming a new mixed textual programming environment 602 that includes a program 610 that is identical to the all textual program 600 of FIG. 24A. This method uses a textual programming environment that is more like a word processor. This alternate method has many of the same advantages of the mixed mode programming using Code Blocks. This method may have advantages to more experienced users who already prefer a text editor for programming and who want the advantages of using Graphical Blocks for some functions. Graphical Blocks can be dropped into the text area 602. The example working area in FIG. 24B shows line numbers on the left of each row. Line 1 shows a When block 612, identical to the Graphical Block When blocks provided in the previous embodiments but is now appearing in a text area. Line 2 shows a text code statement 614 in between two blocks on line 1 and 3. Line 3 is the beginning of a Repeat block 616 that extends to line 12. Repeat block 616 contains textual code on lines 4, 6, 8, 9 and 10 as well as the If statement 618 that starts on line 5.

Figure 24C:
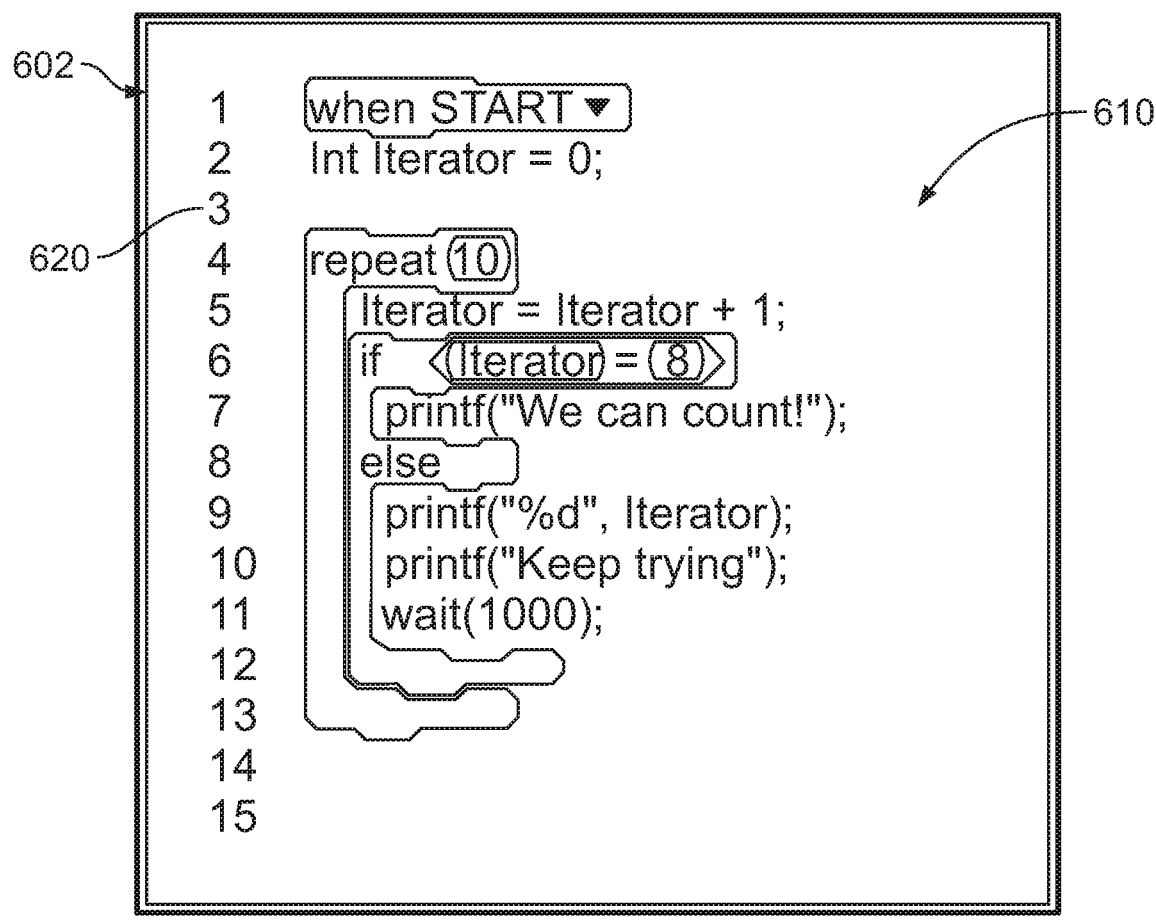
FIG. 24C shows the same program as in FIG. 24B, except that the user has clicked in the text to insert a new empty line.
Figure 24D:
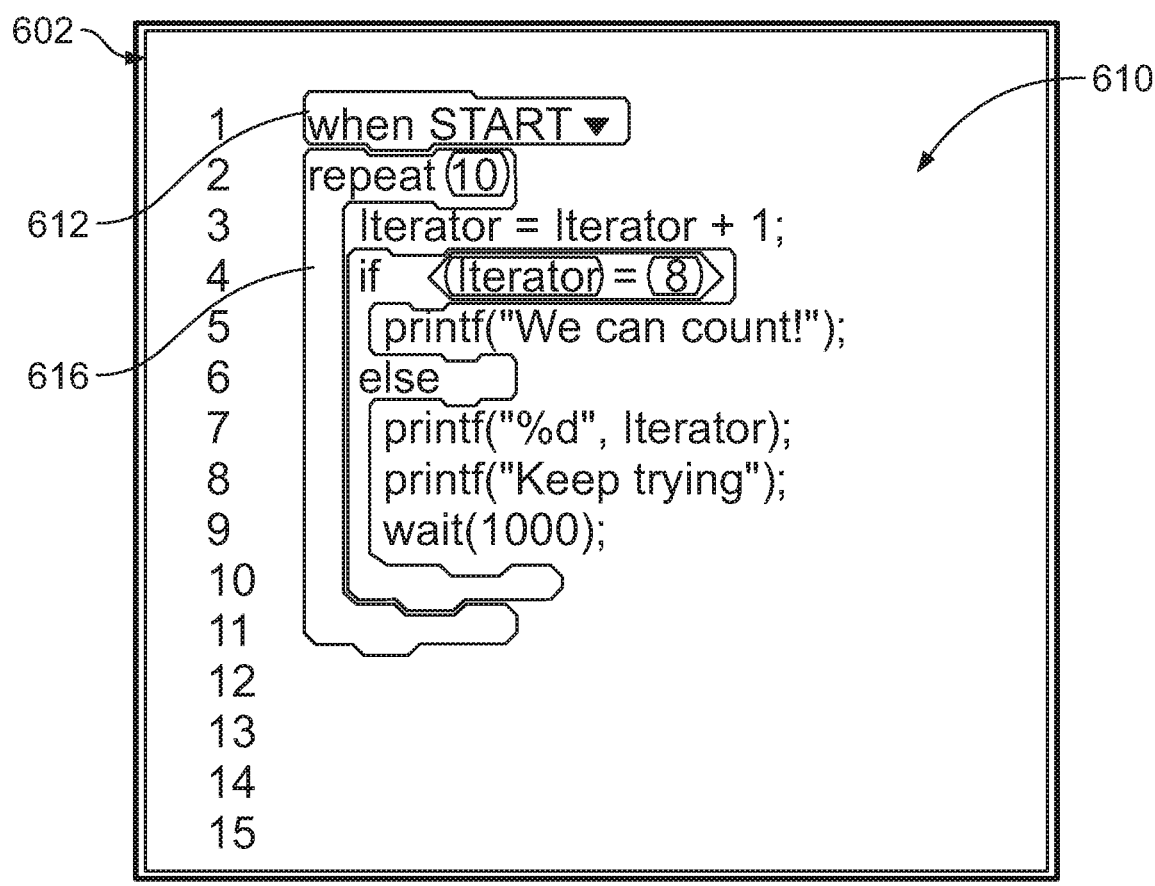
FIG. 24D shows the user deleting a line of text.

FIG. 24C shows the same program as in FIG. 24B, except that the users has clicked in the text to insert their cursor at the end of line 2, and pressed return to get a new empty line number on line 3 (Ref#620). All the subsequent Graphical Blocks and text lines have flowed down one row similar to a text editor. Referring now also to FIG. 24D, the same program 610 is shown, except that the user has deleted line 2 of text. All the Graphical Blocks and text lines have flowed up one row. Additionally the When block 612 and the Repeat block 616 have now joined together.

Figure 24E:
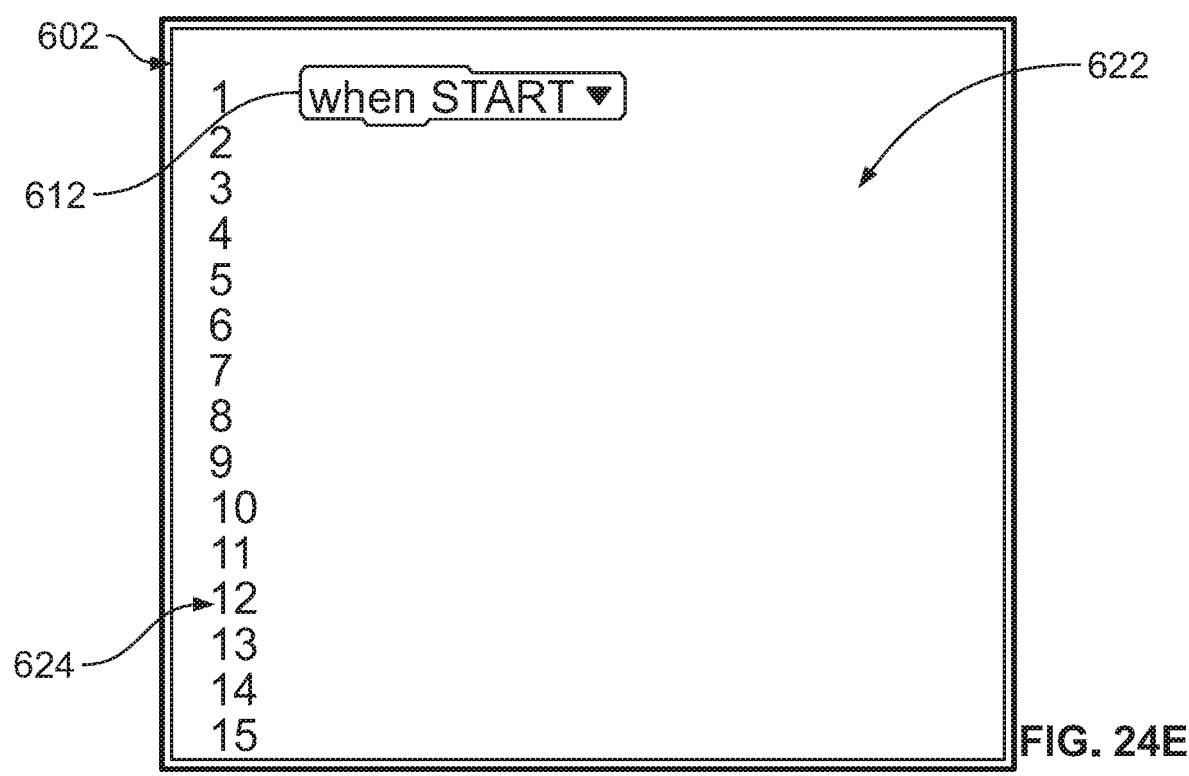
FIG. 24E shows a new program being developed in the mixed textual programming environment.

FIG. 24E shows a new program being developed in the mixed textual programming environment 602 where the user has started by dragging a When block 612 into a working area 622. The working area in this example has line numbers 624.

Advantages of the New Method

Research states that a clear advantage of block modality is that it allows students to quickly write and compile a program, and then immediately get feedback as to what that program accomplishes. By allowing students, beginning with one line at a time, to directly manipulate a programming block with text, the benefits of the tight edit-execution cycle are maintained. Research, also tells us that using block modality doesn't teach students a conceptual understanding of variables, since students do not have to do anything with the data types associated with variables. By being able to directly manipulate a block, students can be asked to identify data types for variables and thus begin to build that conceptual understanding. Since the rest of the program can still be blocks, students still experience the benefits of the tight edit-execution cycle.

In block modality, the structure of the block defines the scope. When students program in text modality, they must use syntax to provide that scope. The research states that this is one of the most prevalent errors that students make when transitioning from block to text. The problem is only compounded when students are using multiple IF statements and nesting statements. With this new methods, students can click on a block, convert it to text, and the syntax that determines scope is provided for them. This new method scaffolds the process for the students and lightens the cognitive load that students experience as they are attempting to focus on the logic of their program. Students can also incrementally move to adding their own symbols to scope as they transition to full text modality. This new method will help students to build an understanding of scope in a scaffolded way. Once again, the research is clear that students currently have a difficult time understanding scope when they create purely block programs and when they have to create purely text programs.

This new method allows students to combine block and text programming. A benefit of using block modality is that students are not tasked with memorizing the names of commands. As a result, students experience less cognitive load as they attempt to focus on their programming task. This new methods scaffolds this process as students will not go straight from block to text, but instead be able to type new commands as they begin to become familiar with them, while still relying on blocks for those commands that are not memorized.

Students are able to quickly recognize what a block command does because the names of the block are often in a language that is more familiar to students that the names used in text modality. This new method allows students to drop a graphical block into a text code block, thus allowing the students to see the text equivalent of a block. This also allows students to see other information (e.g. data types, identifiers) that is normally abstracted out by the block. This introduces the students to these concepts in a more scaffolded way, and allows the students to still experience the benefits of the tight edit-execution cycle.

Research also tells us that students have difficulty writing expressions when transitioning to text modality. This new method allows student to drop a new Code Block into the argument of a graphical block. Students can now practice writing expressions with limited cognitive load, as the rest of the program is still utilizing block modality. Once again, this new method allows users to transition in a more scaffolded way, and allows the students to still experience the benefits of the tight edit-execution cycle.

One of the disadvantages of students using block modality; is that students rely on bottom-up programming, whereas they identify low-level tools (e.g. graphical blocks) to compose programs. With this new method, students have the ability to create blocks that can be used as functions. This ability allows students to begin to employ top-down programming, whereas they are ability to break a programming challenges into smaller chunks and use functions to program those smaller chunks.

A principle of good instructional design is that the content presented to students is targeted, precise, and narrow. In a programming context, research tells us that there are many pain points that students experience when they are novice programmers and when they attempt to transition from block to text modality. This new method will help to foreground the targeted concepts that are presented to students, because the one programming environment will push other concepts, which are not the learning targets, in the background. For example, if students were transitioning from block modality, like Scratch, to text modality, like Python, the learning would not be precise because the students would have to learn a new programming environment in addition to learning Python. With this new method, when students transition from a block to text modality, they will not have to learn a new programming environment. As a result, the learning content for students can be targeted, precise and narrow and thus cognitive load can be avoided. Allowing students to stay in one programming environment and thus avoiding cognitive load is not a trivial achievement. Research tells us that novice learners become "experts" when students are able to store knowledge within a schema. Expertise then develops when students combine ideas and concepts into a schemata. This expertise cannot be developed when a learner's working memory is overloaded with new information. If students are changing programming environments, while also trying to learn the transition between the text modality and block modality, it is likely that the students working memory will be overloaded with new and additional information. Moreover, it takes time for learners to develop a schema, therefore, it is unrealistic to think that students will master a new programming environment with a quick tutorial and then be able to begin with the real learning targets of learning a text-based language.

Additionally, another benefit of block modality is that sequencing within a program is also determined by the blocks. For example, if a block does not "fit" in a particular spot, the user knows it cannot place it there. This helps novice programmers place commands in the correct sequence. If there is an error in sequence, the user can quickly see that feedback because of, once again, the tight edit-execute cycle. By placing text modality within block modality, the new method allows the user to use the advantages of defined scope and sequence of the program, while introducing students to the things that users normally struggle with when they begin text based programming, such as variable assignments, expressions, etc. This allows the teacher to scaffold these concepts while maintaining the advantages of block modality.

Implementation in a Visual Programming Editor

Figure 23A:
FIGS. 23A-23B shows a visual programming editor in accordance with an embodiment of the invention
Figure 23B:
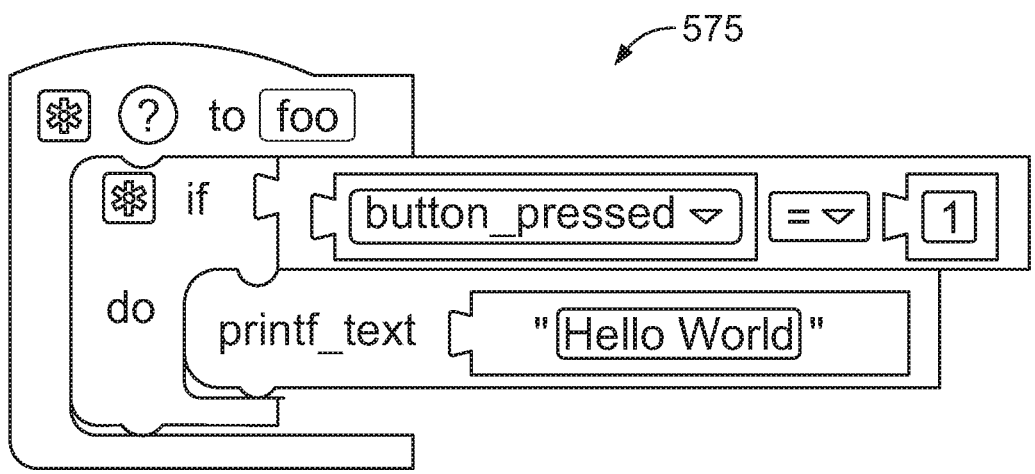

Blocks that are used in the user interface have two associated definition files. The first contains information that describes the graphical appearance of the block, this includes any input or output fields it may have. The second file describes how a block is converted to text. For example, in FIGS. 23A through 23B, a block 570 that implements the standard C library function called printf may appear. The appearance of the block is controlled by this structure contained in the definition file.

```
Blockly.Blocks['printf_block'] = {
init: function( ) {
    this.appendValueInput("TEXT")
    .setCheck(null)
    .appendField("printf_text");
    this.setInputsInline(true);
    this.setPreviousStatement(true, null);
    this.setNextStatement(true, null);
    this.setColour(Blockly.Blocks.console.HUE);
    this.setTooltip('');
}
};
```

The code generation function for this block takes the following form.

```
Blockly.JavaScript['printf_block'] = function(block) {
var value_text =
    Blockly.JavaScript.valueToCode(block,'TEXT',
    Blockly.JavaScript.ORDER_ATOMIC );
// format for C code output
value_text = value_text.replace(/'/g,'"');
// return code
var code = 'printf(' + value_text + ');\n';
return code;
};
```

This function retrieves the parameters that have been supplied to the block, in this example there is only a single input field, and then creates the program text for the appropriate programming language, in this case C.

Blocks that enclose other nested blocks 575 (FIG. 236) will recursively call the necessary functions to build an entire section of code. For example, the following group of blocks contains an "if" statement that would retrieve the code for nested blocks to be executed when the condition is true.

```
Blockly.JavaScript['controls_if'] = function(block) {
// If/elseif/else condition.
var n = 0;
var argument = Blockly.JavaScript.valueToCode(block, 'IF' + n,
    Blockly.JavaScript.ORDER_NONE) || 'false';
var branch = Blockly.JavaScript.statementToCode(block, 'DO' + n);
var code = 'if (' + argument + ') {\n' + branch + '}';
for (n = 1; n <= block.elseifCount_; n++) {
    argument = Blockly.JavaScript.valueToCode(block, 'IF' + n,
    Blockly.JavaScript.ORDER_NONE) || 'false';
    branch = Blockly.JavaScript.statementToCode(block, 'DO' +
n);
    code += ' else if (' + argument + ') {\n' + branch + '}';
}
if (block.elseCount_) {
    branch = Blockly.JavaScript.statementToCode(block, 'ELSE');
    code += ' else {\n' + branch + '}';
}
return code + '\n' ;
};
```

The final code that is generated for the example function would be as follows.

```
/**
 * Test function
 */
void foo( ) {
    if (button_pressed == 1) {
        printf("Hello World");
    }
}
```

In these examples Javascript is used as the language for the block definition and code generation files, other languages and formats for these definitions could also be used.

In existing implementations, the entire collection of blocks is converted to code in the background. Once the complete final code is generated it can be passed to a compiler to then on to the target platform for execution. All of this happens behind the scenes allowing the student to be shielded from the actual code. In some implementations, the complete final code is made available to the user. In the new implementation normal blocks are converted to textual code in the background as before, then they are combined with the Code Blocks textual code in the order prescribed by the blocks order, thus making a complete final code. Again the complete final code is generated it can be passed to a compiler to then on to the target platform for execution. Thus the tight edit-execution cycle is maintained.

The new implementation allows students to command a single block or group of blocks to generate their code. A new "text editor" block replaces the original block or blocks, the text editor block is described in the same way as other graphical blocks with a definition for how it is to be displayed and also how it should generate code to present to the compiler. The single input field that this block contains could have many of the features of a traditional programmers' text editor, for example, syntax coloring, code folding, automatic indentation and keyword completion. The original graphical blocks can be linked to the new block and hidden from view, in the situation the student wishes to abandon text editing they can be restored, this would be in addition to the usual undo capability of the application.

Blocks surrounding the text editor block can be merged as necessary, for example, if the code block is surrounded by a conditional statement block, the two may be merged so the text editor contains the original code statements inside the conditional statement. A student may increase the complexity of their program by dragging new graphical blocks to the program and merging into the text block after their functionality has been tested. Graphical blocks may also be dragged directly inside the text block, the corresponding code would be directly inserted without the necessity to type it in.

Now a user is allowed to work in both block modality and text modality. When it is time to compile, the blocks are parsed as before and the code blocks generate their output in a similar way to all other graphical blocks to complete the final program passed to the compiler.

While the instant invention has been shown and described in accordance with a preferred and practical embodiment thereof, it is recognized that departures from the instant disclosure are contemplated within the spirit and scope of the present invention.

The invention claimed is:

1. A system, comprising:
  a processor;
  a memory medium, coupled to the processor, wherein the memory medium stores program instructions executable by a computer system, and wherein the program instructions being configured to:
    create a single graphical coding environment,
      wherein the single graphical coding environment defines a plurality of graphical programming blocks, each graphical programming block, of the plurality of graphical programming blocks, is configured to represent a predefined programming element; and
      wherein the single graphical coding environment further defines a coding programming block, the coding programming block is configured to represent a programming block for use in the single graphical coding environment and further configured to use standard textual coding language within the programming block, and
    convert and replace, when selected, one or more graphical programming blocks entirely to at least one new coding programming block within the single graphical coding environment, and wherein an equivalent code in the at least one coding programming block identically represents the selected graphical programming blocks in a textual code language;
    create a graphical program within the single graphical coding environment in response to user input, wherein the graphical program comprises, in response to the user input, at least one graphical programming block and at least one coding programming block visually represented together within the single graphical coding environment and, wherein the at least one graphical programming block and the at least one coding programming block are further connected to each other in the single graphical coding environment in a manner that visually indicates and physically creates functionality of the graphical program in accordance with the user input and all being maintained within the single graphical coding environment; and
    generate an output program based on the graphical program created within the single graphical coding environment, wherein the output program implements the functionality of the graphical program, and wherein the output program when executed, controls either a virtual object or a physical object in accordance with the user defined functionality of the graphical program.

2. The system of claim 1, wherein the program instructions configured to create the graphical coding environment, further define a set of instructions, stored on the memory, to define a variable edit mode, and wherein one or more of the graphical programming blocks, of the plurality of graphical programming blocks, is configured to include a variable element set by a user activating the variable edit mode.

3. The system of claim 2, wherein the set of instructions for the peek mode is further configured to create a coding programming block equivalent to the selected graphical programming block, and wherein the coding programming block being accessible to edit with standard textual coding language within the single graphical coding environment.

4. The system of claim 2, wherein the program instructions configured to create the graphical coding environment, further define a set of instructions, stored on the memory, to color code two or more graphical programming blocks with different predefined colors within the single graphical coding environment.

5. The system of claim 4, wherein the color code set of instructions are further configured to color code the textual programming language in the display window adjacent to the one or more graphical programming blocks such that the color of the textual programming language matches the color of the graphical programming block.

6. The system of claim 1, wherein the program instructions configured to create the single graphical coding environment, further define a set of instructions, stored on the memory, to define a graphical programming argument block for use in creation of the graphical program, and wherein the graphical programming argument block is configured as a graphical block with an argument segment embedded within the graphical block, and the set of instructions further configured to accept standard textual coding language in the argument segment.

7. The system of claim 1, wherein the program instructions configured to create the single graphical coding environment, further define a set of instructions, stored on the memory, to merge blocks, and wherein the set of instructions to merge blocks being configured to:
automatically add a second coding programming block to a first coding programming block within the single graphical coding environment, defining a merged coding programming block comprising: both a second standard textual coding language defined by the second coding programming block; and a first standard textual coding language defined by the first coding programing block.

8. The system of claim 7, wherein the set of instructions to merge blocks being further configured to inset the second standard textual coding language at a positioned within the first standard textual coding language selected by a user.

9. The system of claim 1, wherein the program instructions configured to create the single graphical coding environment, further define a set of instructions, stored on the memory, to identify errors in the coding programming block, and wherein the set of instructions to identify errors being configured to:
check an user defined standard textual coding language within the coding programming block to determine if the output program can properly execute to control either the virtual object or a physical object in accordance with the user defined functionality; and
automatically change the color of the user defined standard textual coding language within the single graphical coding environment when the output program fails to properly execute.

10. The system of claim 9, wherein the set of instructions to identify errors is further configured to change the color of the user defined standard textual coding language prior to the output program being generated.

11. The system of claim 1, wherein the single graphical coding environment further includes set of instructions to define a mixed programming mode, and wherein the mixed programming mode is configured to:
create a text programming environment within the single graphical coding environment, wherein the text programming environment defines coding text lines,
receive graphical programming blocks, and
receive standard textual coding language on the coding text lines; and
create the graphical program in response to user input, wherein the graphical program comprises, in response to the user input, at least one graphical programming block and standard textual coding language interconnected in the single graphical coding environment that visually indicates functionality of the graphical program in accordance with the user input.

12. A system, comprising:
a processor;
a memory medium, coupled to the processor, wherein the memory medium stores program instructions executable by a computer system, and wherein the program instructions being configured to:
create a single mixed programming coding environment,
wherein the single mixed programming coding environment defines a plurality of graphical programming blocks, each graphical programming block, of the plurality of graphical programming blocks, is configured to represent a predefined programming element; and
wherein the single mixed programming coding environment includes coding text lines configured to receive standard textual coding language; and
convert and replace, when selected, one or more graphical programming blocks entirely to at least one new coding programming block within the single graphical coding environment, and wherein an equivalent code in the at least one coding programming block identically represents the selected graphical programming blocks in a textual code language;
create a graphical program within the single mixed programming coding environment in response to user input, wherein the graphical program comprises, in response to the user input, at least one graphical programming block and standard textual coding language being visually represented together within the single mixed programming coding environment and being further connected to each other in a manner that visually indicates and physically creates functionality of the graphical program in accordance with the user input and maintained all within the single mixed programming coding environment; and
generate an output program based on the graphical program created within the single mixed programming coding environment, wherein the output program implements the functionality of the graphical program, and
wherein the output program when executed, controls either a virtual object or a physical object in accordance with the user defined functionality of the graphical program.

13. An enhanced graphical user interface coding environment, comprising:
a single graphical user interface ("GUI") window;
at least one or more graphical blocks, representing at least one or more first set of programming instructions visually positioned within the single GUI window;
at least one coding block, representing at least a second set of programming instructions, and visually positioned within the single GUI window and connected to the at least one or more graphical blocks, and wherein the at least second set of programming instructions is different than the one or more first set of programming instructions;
wherein the at least one graphical block and the at least one coding block being visually represented at the same time and at least both together within the single GUI window;

a coding environment function configured to convert and replace one of the one or more graphical blocks entirely to at least one new coding block within the single GUI window, when the one or more graphical blocks are selected and wherein an equivalent code in the at least one new coding block is identical to the selected one or more graphical blocks in a textual code language;

wherein all of the graphical and coding blocks within the single GUI window being further connected to each other at the same time within the single GUI window in a manner to form a set of programming instructions, and wherein the set of programming instructions being configured to compile into a source code program for running by a computer.

14. The enhanced graphical coding environment of claim 13, wherein the at least one coding block is defined to accept textual coding language and wherein the textual coding language within the coding block is interpreted and/or compiled into the source code program.

15. The enhanced graphical coding environment of claim 14, wherein the at least one coding block is compiled is interpreted and/or compiled into the source code program such that a graphical block or coding block before and/or after the at least one coding block and insert the coding block in the proper order.

16. A method of operating an enhanced graphical coding environment for the creation of a source code program comprising:

providing a single graphical user interface coding environment with at least one graphical block, representing at least a first set of programming instructions, providing a code block, representing at least a second set of programming instructions, wherein the at least second set of programming instructions is different than the at least first set of programming instructions, and visually representing the at least one graphical block and the coding block together within the single graphical user interface coding environment, and connecting the code block to the at least one graphical block at the same time and both within the single graphical user interface coding environment to create a source code program made out of the first and second set of programming instructions, wherein the code block is further defined as being accessible for textual code language editing within the single graphical user interface coding environment;

selecting a graphical block, of the at least one graphical block, and replacing the selected graphical block entirely with a new code block, and visually representing the new code block within the single graphical user interface coding environment, and wherein an equivalent code in the at least one new code block is identical to the selected graphical blocks in a textual code language; and compiling the source code program.

17. The method of operating an enhanced graphical coding environment of claim 16, wherein the one code block is defined to accept textual coding language and wherein the textual coding language within the coding block is interpreted and/or compiled into the source code program.

18. The method of operating an enhanced graphical coding environment of claim 16 further comprising:

selecting one or more graphical blocks, of the at least one graphical block; and peeking at the selected one or more graphical blocks as a visual representation of a code block without converting the selected one or more graphical into a code block.

19. The method of operating an enhanced graphical coding environment of claim 18 further comprising converting the selected one or more graphical blocks into a code block.

20. The method of operating an enhanced graphical coding environment of claim 19 further comprising:

expressing in different colors different graphical blocks, of the at least one graphical block; and expressing the text statements defined by the code block of the converted and selected one or more graphical blocks in colors matching the different colors of the different graphical blocks, such that a single text statement, of the text statements, is expressed in one color matching the color of a single graphical block, of the converted and selected one or more graphical blocks.

21. The method of operating an enhanced graphical coding environment of claim 20 further comprising:

dragging and dropping a graphical block into a code block; and automatically converting the graphical block into text statements to create a new code block that incorporates the dragged and dropped graphical block.

22. The method of operating an enhanced graphical coding environment of claim 16 further comprising:

providing a tool bar area defined within the single enhanced graphical coding environment, the tool bar area having defined graphical blocks and code blocks;

providing a working area defined within the single enhanced graphical coding environment, the working area permitting the connection of one more graphical blocks and code blocks together to form the program; and dragging from the toolbar area one or more graphical blocks and code blocks to add the one or more graphical blocks and code blocks to an existing program.

23. The method of operating an enhanced graphical coding environment of claim 22, wherein the enhanced graphical coding environment:

automatically detecting work in text statements in a code block and automatically changing the toolbar area to a tool text creation and editing toolbar.

24. The method of operating an enhanced graphical coding environment of claim 23, wherein the enhanced graphical coding environment automatically detecting work in text statements in a code block and automatically changing the toolbar area to a textual drag and drop toolbar.

25. The method of operating an enhanced graphical coding environment of claim 16 further comprising:

providing graphical blocks and code blocks with an individual toggle feature for collapsing and expanding the contents of the graphical block and code blocks.

26. The method of operating an enhanced graphical coding environment of claim 16 further comprising automatically indenting textual statement based on a text coding environment.

27. The method of operating an enhanced graphical coding environment of claim 22 further comprising:

dragging and dropping a second code block into a first code block, wherein the first code block is situated in the working area; and merging the second code block with the first code block to create a new code block in the working area, wherein the new code block is equivalent in text programming statements to the first and second code blocks.

28. The method of operating an enhanced graphical coding environment of claim 16 further comprising providing an error indicator to specify a coding error in text statements defined in a code block.

29. The method of operating an enhanced graphical coding environment of claim 28, wherein the error indicator is a color coding of the coding error.

* * * * *